(12) United States Patent
Peinado et al.

(10) Patent No.: US 7,757,077 B2
(45) Date of Patent: *Jul. 13, 2010

(54) SPECIFYING SECURITY FOR AN ELEMENT BY ASSIGNING A SCALED VALUE REPRESENTATIVE OF THE RELATIVE SECURITY THEREOF

(75) Inventors: Marcus Peinado, Bellevue, WA (US); Rajasekhar Abburi, Medina, WA (US); Jeffrey R. C. Bell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

This patent is subject to a terminal disclaimer.

(21) Appl. No.: 10/983,040

(22) Filed: Nov. 5, 2004

(65) Prior Publication Data
US 2005/0097368 A1    May 5, 2005

Related U.S. Application Data

(63) Continuation of application No. 09/526,291, filed on Mar. 15, 2000, now Pat. No. 6,829,708.

(60) Provisional application No. 60/176,425, filed on Jan. 14, 2000.

(51) Int. Cl.
*H04L 29/06* (2006.01)

(52) U.S. Cl. ........................ 713/156; 713/168; 713/176; 713/193; 711/100; 725/146; 380/201; 726/5; 726/26

(58) Field of Classification Search .................. 713/156
See application file for complete search history.

(56) References Cited

U.S. PATENT DOCUMENTS 3,718,906 A   2/1973   Lightner
4,323,921 A   4/1982   Guillou (Continued)

FOREIGN PATENT DOCUMENTS

EP          0 613 073          8/1994

(Continued)

OTHER PUBLICATIONS

"Aladdin Knowledge Systems Partners with Rights Exchange, Inc. to Develop a Comprehensive Solution for Electronic Software Distribution," *Business Wire*, Aug. 3, 1998, 4 pages.

(Continued)

*Primary Examiner*—Emmanuel L Moise
*Assistant Examiner*—Shewaye Gelagay
(74) *Attorney, Agent, or Firm*—Woodcock Washburn LLP

(57) ABSTRACT

To determine whether digital content can be released to an element such as a computer application or module, a scaled value representative of the relative security of the element is associated therewith, and the digital content has a corresponding digital license setting forth a security requirement. The security requirement is obtained from the digital license and the scaled value is obtained from the element, and the scaled value of the element is compared to the security requirement of the digital license to determine whether the scaled value satisfies the security requirement. The digital content is not released to the element if the scaled value does not satisfy the security requirement.

16 Claims, 21 Drawing Sheets

U.S. PATENT DOCUMENTS

| | | | |
|---|---|---|---|
| 4,528,643 A | 7/1985 | Freeny, Jr. |
| 4,658,093 A | 4/1987 | Hellman |
| 4,683,553 A | 7/1987 | Mollier |
| 4,827,508 A | 5/1989 | Shear |
| 4,916,738 A | 4/1990 | Chandra et al. |
| 4,926,479 A | 5/1990 | Goldwasser et al. |
| 4,953,209 A | 8/1990 | Ryder, Sr. et al. |
| 4,977,594 A | 12/1990 | Shear |
| 5,047,928 A | 9/1991 | Wiedemer |
| 5,050,213 A | 9/1991 | Shear |
| 5,103,392 A | 4/1992 | Mori |
| 5,103,476 A | 4/1992 | Waite et al. |
| 5,109,413 A | 4/1992 | Comerford et al. |
| 5,117,457 A | 5/1992 | Comerford et al. |
| 5,193,573 A | 3/1993 | Chronister |
| 5,222,134 A | 6/1993 | Waite et al. |
| 5,261,002 A | 11/1993 | Perlman et al. |
| 5,319,705 A | 6/1994 | Halter et al. |
| 5,410,598 A | 4/1995 | Shear |
| 5,485,577 A | 1/1996 | Eyer et al. |
| 5,509,070 A | 4/1996 | Schull |
| 5,553,143 A | 9/1996 | Ross et al. |
| 5,570,465 A | 10/1996 | Tsakanikas |
| 5,629,980 A | 5/1997 | Stefik et al. |
| 5,634,012 A | 5/1997 | Stefik et al. |
| 5,638,443 A * | 6/1997 | Stefik et al. ............ 705/54 |
| 5,673,316 A | 9/1997 | Auerbach et al. |
| 5,708,709 A | 1/1998 | Rose |
| 5,710,887 A | 1/1998 | Chelliah et al. |
| 5,715,403 A | 2/1998 | Stefik |
| 5,757,908 A | 5/1998 | Cooper et al. |
| 5,765,152 A | 6/1998 | Erickson |
| 5,809,144 A | 9/1998 | Sirbu et al. |
| 5,845,281 A | 12/1998 | Benson et al. |
| 5,852,665 A | 12/1998 | Gressel et al. |
| 5,872,846 A | 2/1999 | Ichikawa |
| 5,883,955 A | 3/1999 | Ronning |
| 5,883,958 A | 3/1999 | Ishiguro et al. |
| 5,892,900 A | 4/1999 | Ginter et al. |
| 5,910,987 A | 6/1999 | Ginter et al. |
| 5,915,025 A | 6/1999 | Taguchi et al. |
| 5,917,912 A | 6/1999 | Ginter et al. |
| 5,935,248 A * | 8/1999 | Kuroda .................. 726/14 |
| 5,949,879 A | 9/1999 | Berson et al. |
| 5,958,050 A | 9/1999 | Griffin et al. |
| 5,982,891 A | 11/1999 | Ginter et al. |
| 5,983,350 A | 11/1999 | Minear et al. |
| 5,999,629 A | 12/1999 | Heer et al. |
| 6,058,476 A | 5/2000 | Matsuzaki et al. |
| 6,061,451 A | 5/2000 | Muratani et al. |
| 6,069,647 A | 5/2000 | Sullivan et al. |
| 6,072,874 A | 6/2000 | Shin et al. |
| 6,073,124 A | 6/2000 | Krishman et al. |
| 6,141,754 A | 10/2000 | Choy |
| 6,157,721 A | 12/2000 | Shear et al. |
| 6,158,011 A | 12/2000 | Chen et al. |
| 6,167,358 A | 12/2000 | Othmer et al. |
| 6,170,060 B1 | 1/2001 | Mott et al. |
| 6,189,146 B1 | 2/2001 | Misra et al. |
| 6,202,151 B1 | 3/2001 | Musgrave et al. |
| 6,226,618 B1 | 5/2001 | Downs et al. |
| 6,230,272 B1 | 5/2001 | Lockhart et al. |
| 6,233,684 B1 | 5/2001 | Stefik et al. |
| 6,237,098 B1 | 5/2001 | Libicki |
| 6,266,420 B1 | 7/2001 | Langford et al. |
| 6,301,660 B1 | 10/2001 | Benson |
| 6,304,973 B1 | 10/2001 | Williams |
| 6,327,652 B1 | 12/2001 | England et al. |
| 6,332,025 B2 | 12/2001 | Takahashi et al. |
| 6,343,280 B2 | 1/2002 | Clark |
| 6,353,888 B1 | 3/2002 | Kakehi et al. |
| 6,360,320 B1 | 3/2002 | Ishiguro et al. |
| 6,374,354 B1 | 4/2002 | Walmsley et al. |
| 6,374,355 B1 | 4/2002 | Patel |
| 6,374,357 B1 | 4/2002 | Mohammed et al. |
| 6,424,715 B1 | 7/2002 | Saito |
| 6,425,081 B1 | 7/2002 | Iwamura |
| 6,539,364 B2 | 3/2003 | Moribatake et al. |
| 6,574,609 B1 * | 6/2003 | Downs et al. ............ 705/50 |
| 6,574,612 B1 | 6/2003 | Baratti et al. |
| 6,581,331 B1 | 6/2003 | Kral |
| 6,640,304 B2 | 10/2003 | Ginter et al. |
| 6,684,198 B1 | 1/2004 | Shimizu et al. |
| 6,684,332 B1 | 1/2004 | Douglas |
| 6,697,945 B2 | 2/2004 | Ishiguro et al. |
| 6,741,851 B1 | 5/2004 | Lee et al. |
| 6,772,340 B1 | 8/2004 | Peinado et al. |
| 6,799,270 B1 | 9/2004 | Bull et al. |
| 6,816,596 B1 | 11/2004 | Peinado et al. |
| 6,829,708 B1 | 12/2004 | Peinado et al. |
| 6,959,288 B1 | 10/2005 | Medina et al. |
| 6,978,367 B1 | 12/2005 | Hind et al. |
| 7,016,498 B2 | 3/2006 | Peinado et al. |
| 7,127,513 B2 | 10/2006 | Karger et al. |
| 7,275,159 B2 | 9/2007 | Hull et al. |
| 7,287,280 B2 | 10/2007 | Young |
| 7,319,759 B1 * | 1/2008 | Peinado et al. ............ 380/277 |
| 7,475,137 B2 | 1/2009 | Holden et al. |
| 7,529,927 B2 | 5/2009 | Peinado et al. |
| 2002/0044654 A1 | 4/2002 | Maeda et al. |
| 2002/0063933 A1 | 5/2002 | Maeda et al. |
| 2003/0037261 A1 | 2/2003 | Meffert et al. |
| 2005/0091169 A1 | 4/2005 | Peinado et al. |
| 2005/0265548 A1 | 12/2005 | Tsuchimura |
| 2007/0157322 A1 | 7/2007 | Onno |
| 2008/0141339 A1 | 6/2008 | Gomez et al. |

FOREIGN PATENT DOCUMENTS

| | | |
|---|---|---|
| EP | 0 387 599 | 9/1995 |
| EP | 0 679 980 | 11/1995 |
| EP | 0 715 246 | 6/1996 |
| EP | 0 715 247 | 6/1996 |
| EP | 0 735 719 | 10/1996 |
| EP | 0 752 663 | 1/1997 |
| EP | 0 768 774 | 4/1997 |
| EP | 0 778 512 | 6/1997 |
| EP | 0 843 249 | 5/1998 |
| EP | 0 843 449 | 5/1998 |
| EP | 0 849 658 | 6/1998 |
| EP | 0 874 300 | 10/1998 |
| EP | 0 725 512 | 9/2003 |
| EP | 0 798 892 | 7/2006 |
| JP | 3421950 | 4/2003 |
| WO | WO 93/01550 | 1/1993 |
| WO | WO 96/13013 | 5/1996 |
| WO | WO 96/24092 | 8/1996 |
| WO | WO 96/27155 | 9/1996 |
| WO | WO 97/25798 | 7/1997 |
| WO | WO 97/43761 | 11/1997 |
| WO | WO 98/02793 | 1/1998 |
| WO | WO 98/09209 | 3/1998 |
| WO | WO 98/10381 | 3/1998 |
| WO | WO 98/21679 | 5/1998 |
| WO | WO 98/21683 | 5/1998 |
| WO | WO 98/24037 | 6/1998 |
| WO | WO 98/33106 | 7/1998 |
| WO | WO 98/37481 | 8/1998 |
| WO | WO 98/42098 | 9/1998 |
| WO | WO 98/47259 | 10/1998 |
| WO | WO 98/58306 | 12/1998 |
| WO | WO 99/04328 | 1/1999 |
| WO | WO 99/15970 | 4/1999 |
| WO | WO 99/53689 | 10/1999 |

| | | |
|---|---|---|
| WO | WO 00/59150 | 10/2000 |
| WO | WO 01/52018 | 7/2001 |

OTHER PUBLICATIONS

Amdur, D., "Metering Online Copyright," Jan. 16, 1996, 2 pages.
Amdur, D. (ed.), "InterTrust Challenges IBM Digital Content Metering," *Report on Electronic Commerce*, Jul. 23, 1996, 3(15), 1-2 and 16-18.
Armati, D., "Tools and standards for protection, control and presentation of data," Apr. 3, 1996, 17 pages.
Benjamin, R. et al., "Electronic markets and virtual value chains on the information superhighway," *Sloan Management Rev.*, Winter, 1995, 62-72.
"Boxing Up Bytes," 2 pages.
Cassidy, "A Web developers guide to content encapsulation technology," Apr. 1997, 5 pages.
Clark, T., "Software Secures Digital Content on Web," *Interactive Week*, Sep. 25, 1995, 1 page.
Cox, B., "Superdistribution," *Idees Fortes*, Sep. 1994, 2 pages.
Cox, B., "What if There Is A Silver Bullet," *J. Object Oriented Programm.*, Jun. 1992, 8-9 and 76.
Griswold, G.N., "A Method for Protecting Copyright on Networks," *IMA Intell. Property Project Proceedings*, Jan. 1994, 1(1), 169-178.
Hauser, R.C., "Does licensing require new access control techniques?" Aug. 1993, 9 pages.
Hudgins-Bonafield, C. "Selling Knowledge on the Net," *Network Computing*, Jun. 1, 1995, 102-109.
IBM Corporation, "IBM spearheading intellectual property protection technology for information on the Internet," May 1996, 3 pages.
Kaplan, M.A., "IBM Cryptolopes_, Super-Distribution and Digital Rights Management," Dec. 1996, 7 pages.
Kent, S.T., "Protecting externally supplied software in small computers," Sep. 1980, 1-42 and 250-252.
Kohl, U. et al., "Safeguarding Digital Library Contents and Users; Protecting Documents Rather Than Channels," *D-Lib Magazine*, Sep. 1997, 9 pages.
Linn, R.J., "Copyright and Information Services in the Context of the National Research and Education Network," *IMA Intell. Property Project Proceedings*, Jan. 1994, 1(1), 1 and 10-20.
McNab, L., "Super-distribution works better in practical applications," Mar. 2, 1998, 2 pages.
Moeller, M., "NetTrust lets Cyberspace Merchants Take Account," *PC Week*, Nov. 20, 1995, 12(48), 1 page.
Moeller, M., "IBM takes charge of E-commerce; Plans client, server apps based on SET," Apr. 1996, 4 pages.
NetRights, "LicensIt: kinder, gentler copyright? Copyright management system links content, authorship information," *Seybold Report on Desktop Publishing*, 1996, 10(11), 2 pages.
Pemberton, J., "An ONLINE Interview with Jeff Crigler at IBM InfoMarket," Jul. 1996, 6 pages.
Ramanujapuram, A. et al., "Digital Content & Intellectual Property Rights: A specification language and tools for rights management," Dec. 1998, 20-23 and 26.
Sibert, O. et al., "The DigiBox: A Self-protecting Container for Information Commerce," *First USENIX Workshop on Electronic Commerce*, Jul. 11-12, 1995, 171-183.
Sibert, O. et al., "Securing the Content, Not the Wire, for Information Commerce," Jul. 1995, 1-11.
Smith, M.G. et al., "A New Set of Rules for Information Commerce," *Electronic Commerce*, Nov. 6, 1995, 34-35.
Stefik, M., "Trusted Systems," *Scientific American*, Mar. 1997, 8 pages.
Stefik, M., "Technical Perspective—Shifting the Possible: How Trusted Systems and Digital Property Rights Challenge Us to Rethink Digital Publishing," *Berkeley Technology Law Journal*, 1997, 12(1), 137-159.
Tarter, J. (ed.), "The Superdistribution Model," *Soft Trends*, Nov. 15, 1996, 13(6), 1-9.
"Technological Solutions Rise to Complement Law's Small Stick Guarding Electronic Works," *Information Law Alert*, Jun. 16, 1995, 3-4 and 7.
Weber, R., "Digital Rights Management Technologies," Oct. 1995, 55 pages.
White, S.R. et al., "ABYSS: An Architecture for Software Protection," *IEEE Transactions on Software Engineering*, Jun. 1990, 16(6), 619-629.
White, S.R. et al., "ABYSS: A trusted architecture for software protection," I*IEEE Symposium on Security and Privacy*, Apr. 27-29, 1987, 38-51.
YBP Inc., "Rights Management in the Digital Age: Trading in Bits, Not Atoms," *TRIALOGUE*, Spring, 1997, 4, 3 pages.
PCT International Search Report mailed Nov. 27, 2000, in corresponding International Application No. PCT/US00/22972.
United States Patent and Trademark Office: Non-Final Office Action dated Apr. 11, 2008, U.S. Appl. No. 10/980,743, filed Nov. 3, 2004.
United States Patent and Trademark Office: Notice of Allowance dated Oct. 24, 2008, U.S. Appl. No. 10/980,743, filed Nov. 3, 2004.
United States Patent and Trademark Office: Notice of Allowance dated Mar. 10, 2009, U.S. Appl. No. 10/980,743, filed Nov. 3, 2005.
United States Patent and Trademark Office: Non-Final Office Action dated Nov. 25, 2003, U.S. Appl. No. 09/526,291, filed Mar. 15, 2000.
United States Patent and Trademark Office: Notice of Allowance dated Jul. 13, 2004, U.S. Appl. No. 09/526,291, filed Mar. 15, 2000.
United States Patent and Trademark Office: Non-Final Office Action dated May 13, 2008, U.S. Appl. No. 10/982,578, filed Nov. 5, 2004.
United States Patent and Trademark Office: Final Office Action dated Nov. 25, 2008, U.S. Appl. No. 10/982,578, filed Nov. 5, 2004.
United States Patent and Trademark Office: Non-Final Office Action dated Apr. 23, 2009, U.S. Appl. No. 10/982,578, filed Nov. 5, 2004.
United States Patent and Trademark Office: Final Office Action dated Nov. 24, 2009, U.S. Appl. No. 10/982,578, filed Nov. 5, 2004.

* cited by examiner

| License 16 | Content ID | DRL 48 or KD (DRL 48) | PU-BB (KD) | S (PR-LS) | CERT (PU-LS) S (PR-CS) | Security Requirement 68 | Trusted Security Value Cert. Auth. 74 |

Fig. 8

| Digital Content Package 12p | KD (Digital Content 12) | Content ID | Key ID | [Seed ID] | License Acquisition Info | KD (PU-CS) S (PR-CS) |

Fig. 3

SPECIFYING SECURITY FOR AN ELEMENT BY ASSIGNING A SCALED VALUE REPRESENTATIVE OF THE RELATIVE SECURITY THEREOF

CROSS-REFERENCE TO RELATED APPLICATIONS

This application is a continuation of U.S. patent application Ser. No. 09/526,291 filed Mar. 15, 2000, entitled "SPECIFYING SECURITY FOR AN ELEMENT BY ASSIGNING A SCALED VALUE REPRESENTATIVE OF THE RELATIVE SECURITY THEREOF", which is related to U.S. patent application Ser. No. 09/290,363, filed Apr. 12, 1999 and entitled "ENFORCEMENT ARCHITECTURE AND METHOD FOR DIGITAL RIGHTS MANAGEMENT", and U.S. Provisional Application No. 60/126,614, filed Mar. 27, 1999 and entitled "ENFORCEMENT ARCHITECTURE AND METHOD FOR DIGITAL RIGHTS MANAGEMENT", all of which are hereby incorporated by reference. This application claims the benefit of U.S. Provisional Application No. 60/176,425, filed Jan. 14, 2000 and entitled "ENFORCEMENT ARCHITECTURE AND METHOD FOR DIGITAL RIGHTS MANAGEMENT", hereby incorporated by reference.

This application is related to U.S. patent application Ser. No. 09/525,509, entitled "PRODUCING A NEW BLACK BOX FOR A DIGITAL RIGHTS MANAGEMENT (DRM) SYSTEM"; U.S. patent application Ser. No. 09/526,292, now U.S. Pat. No. 6,816,596, entitled "ENCRYPTING A DIGITAL OBJECT BASED ON A KEY ED SELECTED THEREFOR"; U.S. patent application Ser. No. 09/525,510, entitled "RELEASING DECRYPTED DIGITAL CONTENT TO AN AUTHENTICATED PATH"; and U.S. patent application Ser. No. 09/526,290, now U.S. Pat. No. 6,772,340, entitled "DIGITAL RIGHTS MANAGEMENT SYSTEM OPERATING ON COMPUTING DEVICE AND HAVING BLACK BOX TIED TO COMPUTING DEVICE", each of which is hereby incorporated by reference.

TECHNICAL FIELD

The present invention relates to an architecture for enforcing rights in digital content. More specifically, the present invention relates to such an enforcement architecture that allows access to encrypted digital content only in accordance with parameters specified by license rights acquired by a user of the digital content.

BACKGROUND OF THE INVENTION

Digital rights management and enforcement is highly desirable in connection with digital content such as digital audio, digital video, digital text, digital data, digital multimedia, etc., where such digital content is to be distributed to users. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders or 'plays' the digital content with the aid of an appropriate rendering device such as a media player on a personal computer or the like.

Typically, a content owner or rights-owner, such as an author, a publisher, a broadcaster, etc. (hereinafter "content owner"), wishes to distribute such digital content to a user or recipient in exchange for a license fee or some other consideration. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be played only a limited number of times, only for a certain total time, only on a certain type of machine, only on a certain type of media player, only by a certain type of user, etc.

However, after distribution has occurred, such content owner has very little if any control over the digital content. This is especially problematic in view of the fact that practically every new or recent personal computer includes the software and hardware necessary to make an exact digital copy of such digital content, and to download such exact digital copy to a write-able magnetic or optical disk, or to send such exact digital copy over a network such as the Internet to any destination.

Of course, as part of the legitimate transaction where the license fee was obtained, the content owner may require the user of the digital content to promise not to re-distribute such digital content. However, such a promise is easily made and easily broken. A content owner may attempt to prevent such re-distribution through any of several known security devices, usually involving encryption and decryption. However, there is likely very little that prevents a mildly determined user from decrypting encrypted digital content, saving such digital content in an un-encrypted form, and then re-distributing same.

A need exists, then, for providing an enforcement architecture and method that allows the controlled rendering or playing of arbitrary forms of digital content, where such control is flexible and definable by the content owner of such digital content. A need also exists for providing a controlled rendering environment on a computing device such as a personal computer, where the rendering environment includes at least a portion of such enforcement architecture. Such controlled rendering environment allows that the digital content will only be rendered as specified by the content owner, even though the digital content is to be rendered on a computing device which is not under the control of the content owner.

Further, a need exists for a trusted component running on the computing device, where the trusted component enforces the rights of the content owner on such computing device in connection with a piece of digital content, even against attempts by the user of such computing device to access such digital content in ways not permitted by the content owner. As but one example, such a trusted software component prevents a user of the computing device from making a copy of such digital content, except as otherwise allowed for by the content owner thereof.

SUMMARY OF THE INVENTION

The aforementioned needs are satisfied at least in part by an enforcement architecture and method for digital rights management, where the architecture and method enforce rights in protected (secure) digital content available on a medium such as the Internet, an optical disk, etc. For purposes of making content available, the architecture includes a content server from which the digital content is accessible over the Internet or the like in an encrypted form. The content server may also supply the encrypted digital content for recording on an optical disk or the like, wherein the encrypted digital content may be distributed on the optical disk itself. At the content server, the digital content is encrypted using an encryption key, and public/private key techniques are employed to bind the digital content with a digital license at the user's computing device or client machine.

When a user attempts to render the digital content on a computing device, the rendering application invokes a Digital Rights Management (DRM) system on such user's computing device. If the user is attempting to render the digital content for the first time, the DRM system either directs the user to a license server to obtain a license to render such digital content in the manner sought, or transparently obtains such license from such license server without any action necessary on the part of the user. The license includes:

a decryption key (KD) that decrypts the encrypted digital content;

a description of the rights (play, copy, etc.) conferred by the license and related conditions (begin date, expiration date, number of plays, etc.), where such description is in a digitally readable form; and a digital signature that ensures the integrity of the license.

The user cannot decrypt and render the encrypted digital content without obtaining such a license from the license server. The obtained license is stored in a license store in the user's computing device.

Importantly, the license server only issues a license to a DRM system that is 'trusted' (i.e., that can authenticate itself). To implement 'trust', the DRM system is equipped with a 'black box' that performs decryption and encryption functions for such DRM system. The black box includes a public/private key pair, a version number and a unique signature, all as provided by an approved certifying authority. The public key is made available to the license server for purposes of encrypting portions of the issued license, thereby binding such license to such black box. The private key is available to the black box only, and not to the user or anyone else, for purposes of decrypting information encrypted with the corresponding public key. The DRM system is initially provided with a black box with a public/private key pair, and the user is prompted to download from a black box server an updated secure black box when the user first requests a license. The black box server provides the updated black box, along with a unique public/private key pair. Such updated black box is written in unique executable code that will run only on the user's computing device, and is re-updated on a regular basis.

When a user requests a license, the client machine sends the black box public key, version number, and signature to the license server, and such license server issues a license only if the version number is current and the signature is valid. A license request also includes an identification of the digital content for which a license is requested and a key ID that identifies the decryption key associated with the requested digital content. The license server uses the black box public key to encrypt the decryption key, and the decryption key to encrypt the license terms, then downloads the encrypted decryption key and encrypted license terms to the user's computing device along with a license signature.

Once the downloaded license has been stored in the DRM system license store, the user can render the digital content according to the rights conferred by the license and specified in the license terms. When a request is made to render the digital content, the black box is caused to decrypt the decryption key and license terms, and a DRM system license evaluator evaluates such license terms. The black box decrypts the encrypted digital content only if the license evaluation results in a decision that the requester is allowed to play such content. The decrypted content is provided to the rendering application for rendering.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 3 is a block diagram of a digital content package having digital content for use in connection with the architecture of FIG. 1 in accordance with one embodiment of the present invention;

FIG. 8 is a block diagram of a digital license for use in connection with the architecture of FIG. 1 in accordance with one embodiment of the present invention;

DETAILED DESCRIPTION OF THE INVENTION

Figure 1:
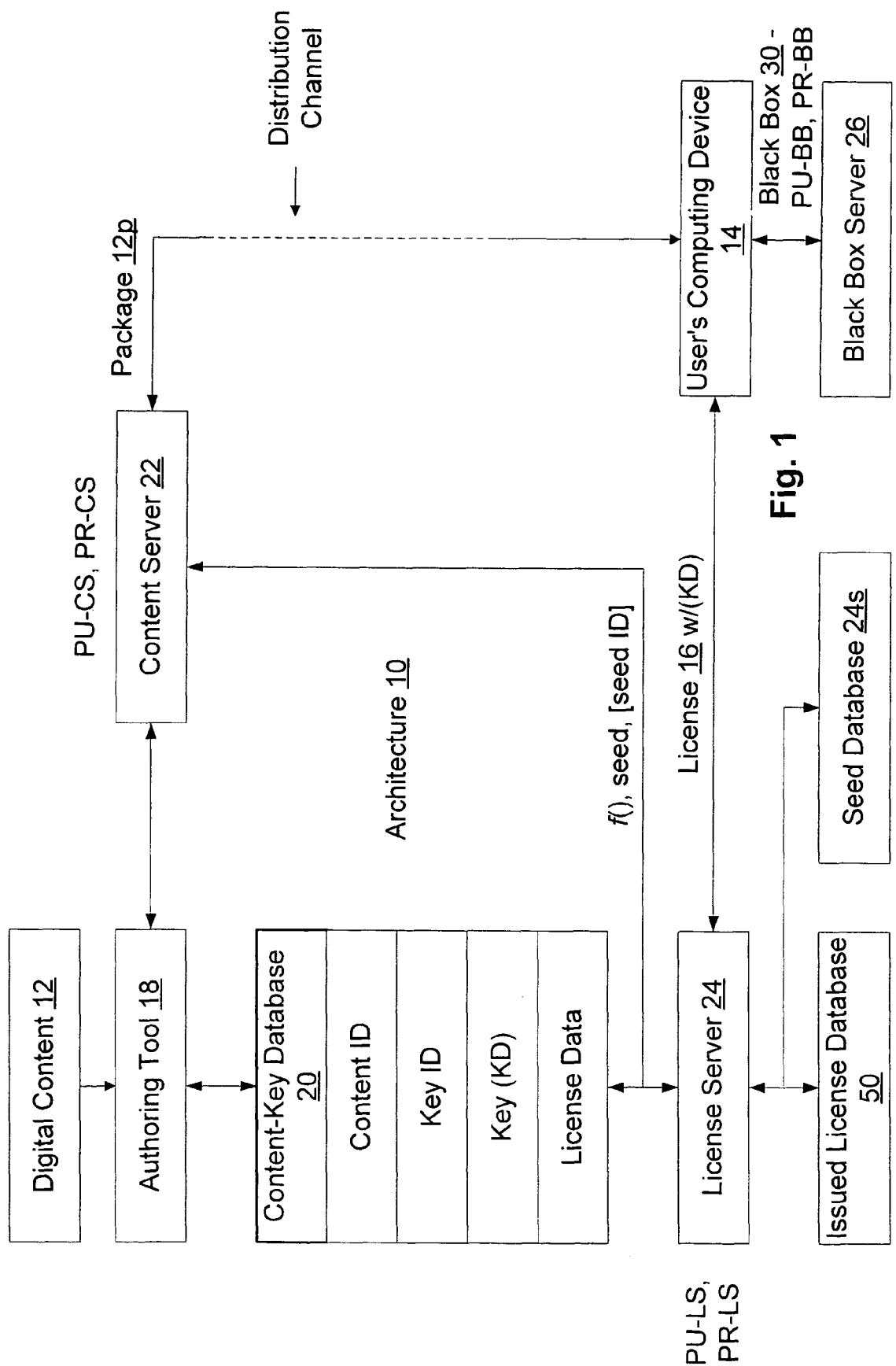
FIG. 1 is a block diagram showing an enforcement architecture in accordance with one embodiment of the present invention.

Referring to the drawings in details, wherein like numerals are used to indicate like elements throughout, there is shown in FIG. 1 an enforcement architecture 10 in accordance with one embodiment of the present invention. Overall, the enforcement architecture 10 allows an owner of digital content 12 to specify license rules that must be satisfied before such digital content 12 is allowed to be rendered on a user's computing device 14. Such license rules are embodied within a digital license 16 that the user/user's computing device 14 (hereinafter, such terms are interchangeable unless circumstances require otherwise) must obtain from the content owner or an agent thereof. The digital content 12 is distributed in an encrypted form, and may be distributed freely and widely. Preferably, the decrypting key (KD) for decrypting the digital content 12 is included with the license 16.

Computer Environment

Figure 12:
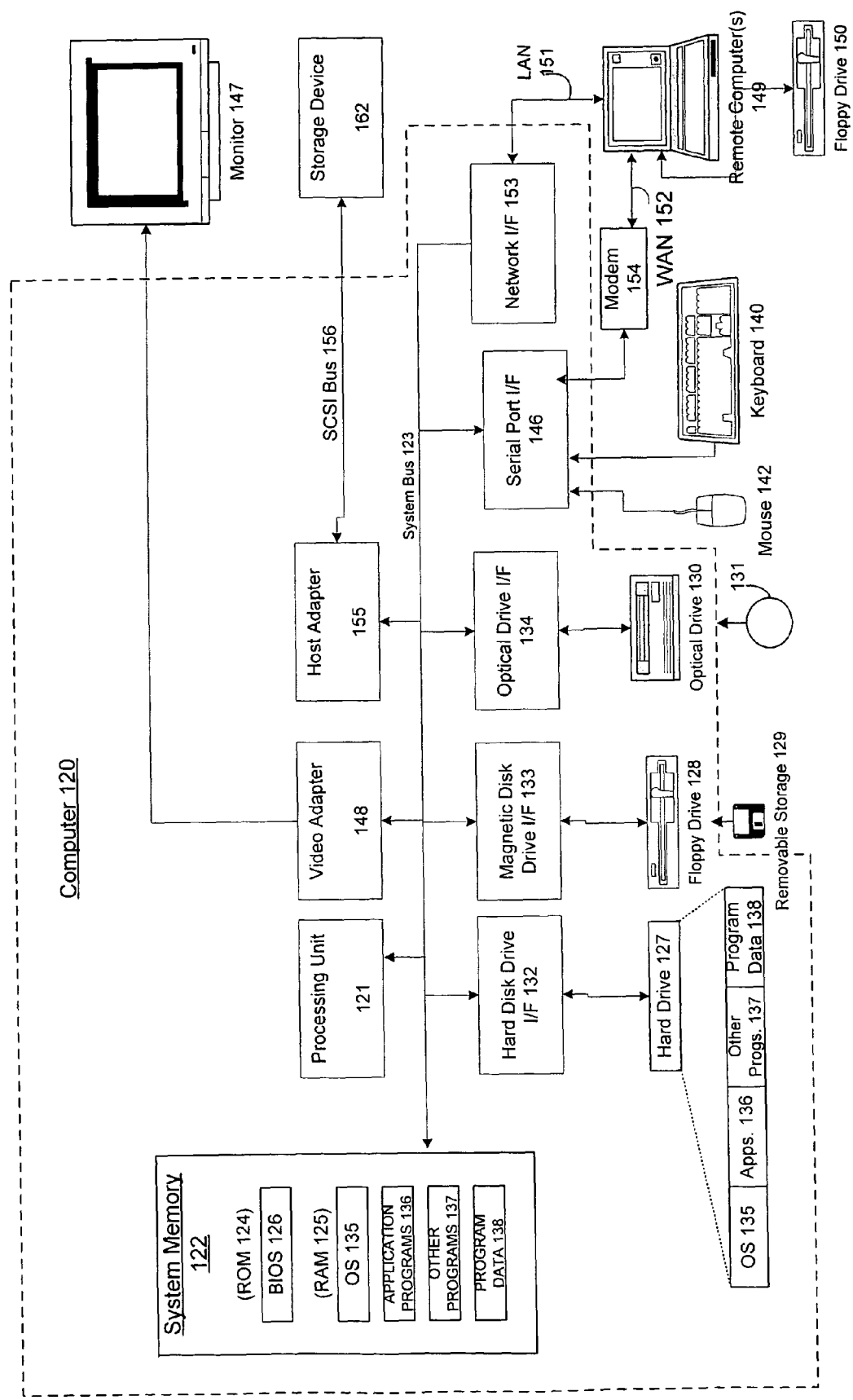
FIG. 12 is a block diagram representing a general purpose computer system in which aspects of the present invention and/or portions thereof may be incorporated.

FIG. 12 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 12, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable storage media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 12 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 12. The logical connections depicted in FIG. 12 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Architecture

Referring again to FIG. 1, in one embodiment of the present invention, the architecture 10 includes an authoring tool 18, a content-key database 20, a content server 22, a license server 24, and a black box server 26, as well as the aforementioned user's computing device 14.

Architecture—Authoring Tool 18

The authoring tool 18 is employed by a content owner to package a piece of digital content 12 into a form that is amenable for use in connection with the architecture 10 of the present invention. In particular, the content owner provides the authoring tool 18 with the digital content 12, instructions and/or rules that are to accompany the digital content 12, and instructions and/or rules as to how the digital content 12 is to be packaged. The authoring tool 18 then produces a digital content package 12p having the digital content 12 encrypted according to an encryption/decryption key, and the instructions and/or rules that accompany the digital content 12.

In one embodiment of the present invention, the authoring tool 18 is instructed to serially produce several different digital content 12 packages 12p, each having the same digital content 12 encrypted according to a different encryption/decryption key. As should be understood, having several different packages 12p with the same digital content 12 may be useful for tracking the distribution of such packages 12p/content 12 (hereinafter simply "digital content 12", unless circumstances require otherwise). Such distribution tracking is not ordinarily necessary, but may be used by an investigative authority in cases where the digital content 12 has been illegally sold or broadcast.

In one embodiment of the present invention, the encryption/decryption key that encrypts the digital content 12 is a symmetric key, in that the encryption key is also the decryption key (KD). As will be discussed below in more detail, such decryption key (KD) is delivered to a user's computing device 14 in a hidden form as part of a license 16 for such digital content 12. Preferably, each piece of digital content 12 is provided with a content ID (or each package 12p is provided with a package ID), each decryption key (KD) has a key ID, and the authoring tool 18 causes the decryption key (KD), key ID, and content ID (or package ID) for each piece of digital content 12 (or each package 12p) to be stored in the content-key database 20. In addition, license data regarding the types of licenses 16 to be issued for the digital content 12 and the terms and conditions for each type of license 16 may be stored in the content-key database 20, or else in another database (not shown). Preferably, the license data can be modified by the content owner at a later time as circumstances and market conditions may require.

In use, the authoring tool 18 is supplied with information including, among other things:
the digital content 12 to be packaged;
the type and parameters of watermarking and/or fingerprinting to be employed, if any;
the type and parameters of data compression to be employed, if any;
the type and parameters of encryption to be employed;
the type and parameters of serialization to be employed, if any; and
the instructions and/or rules that are to accompany the digital content 12.

As is known, a watermark is a hidden, computer-readable signal that is added to the digital content 12 as an identifier. A fingerprint is a watermark that is different for each instance. As should be understood, an instance is a version of the digital content 12 that is unique. Multiple copies of any instance may be made, and any copy is of a particular instance. When a specific instance of digital content 12 is illegally sold or broadcast, an investigative authority can perhaps identify suspects according to the watermark/fingerprint added to such digital content 12.

Data compression may be performed according to any appropriate compression algorithm without departing from the spirit and scope of the present invention. For example, the .mp3 or .wav compression algorithm may be employed. Of course, the digital content 12 may already be in a compressed state, in which case no additional compression is necessary.

The instructions and/or rules that are to accompany the digital content 12 may include practically any appropriate instructions, rules, or other information without departing from the spirit and scope of the present invention. As will be discussed below, such accompanying instructions/rules/information are primarily employed by the user and the user's computing device 14 to obtain a license 16 to render the digital content 12. Accordingly, such accompanying instructions/rules/information may include an appropriately formatted license acquisition script or the like, as will be described in more detail below. In addition, or in the alternative, such accompanying instructions/rules/information may include 'preview' information designed to provide a user with a preview of the digital content 12.

With the supplied information, the authoring tool 18 then produces one or more packages 12p corresponding to the digital content 12. Each package 12p may then be stored on the content server 22 for distribution to the world.

Figure 2:
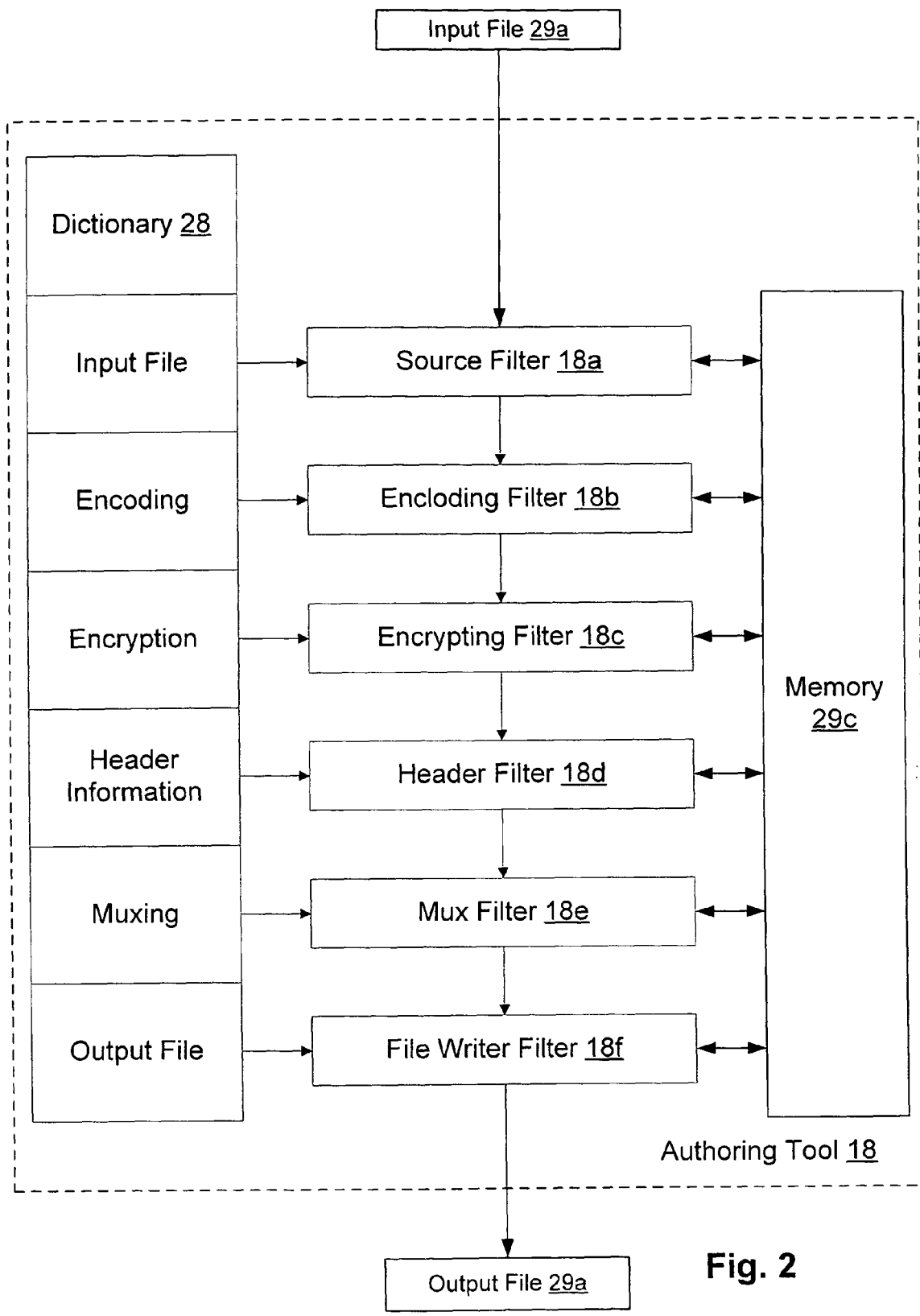
FIG. 2 is a block diagram of the authoring tool of the architecture of FIG. 1 in accordance with one embodiment of the present invention.

In one embodiment of the present invention, and referring now to FIG. 2, the authoring tool 18 is a dynamic authoring tool 18 that receives input parameters which can be specified and operated on. Accordingly, such authoring tool 18 can rapidly produce multiple variations of package 12p for multiple pieces of digital content 12. Preferably, the input parameters are embodied in the form of a dictionary 28, as shown, where the dictionary 28 includes such parameters as:
the name of the input file 29a having the digital content 12;
the type of encoding that is to take place
the encryption/decryption key (KD) to be employed,
the accompanying instructions/rules/information ('header information') to be packaged with the digital content 12 in the package 12p.
the type of muxing that is to occur; and
the name of the output file 29b to which the package 12p based on the digital content 12 is to be written.

As should be understood, such dictionary 28 is easily and quickly modifiable by an operator of the authoring tool 18 (human or machine), and therefore the type of authoring performed by the authoring tool 18 is likewise easily and quickly modifiable in a dynamic manner. In one embodiment of the present invention, the authoring tool 18 includes an operator interface (not shown) displayable on a computer screen to a human operator. Accordingly, such operator may modify the dictionary 28 by way of the interface, and further may be appropriately aided and/or restricted in modifying the dictionary 28 by way of the interface.

In the authoring tool 18, and as seen in FIG. 2, a source filter 18a receives the name of the input file 29a having the digital content 12 from the dictionary 28, and retrieves such digital content 12 from such input file and places the digital content 12 into a memory 29c such as a RAM or the like. An encoding filter 18b then performs encoding on the digital content 12 in the memory 29c to transfer the file from the input format to the output format according to the type of encoding specified in the dictionary 28 (i.e., .wav to .asp, .mp3 to asp, etc.), and places the encoded digital content 12 in the memory 29c. As shown, the digital content 12 to be packaged (music, e.g.) is received in a compressed format such as the .wav or .mp3 format, and is transformed into a format such as the asp (active streaming protocol) format. Of course, other input and output formats may be employed without departing from the spirit and scope of the present invention.

Thereafter, an encryption filter 18c encrypts the encoded digital content 12 in the memory 29c according to the encryption/decryption key (KD) specified in the dictionary 28, and places the encrypted digital content 12 in the memory 29c. A header filter 18d then adds the header information specified in the dictionary 28 to the encrypted digital content 12 in the memory 29c.

As should be understood, depending on the situation, the package 12p may include multiple streams of temporally aligned digital content 12 (one stream being shown in FIG. 2), where such multiple streams are multiplexed (i.e., 'muxed'). Accordingly, a mux filter 18e performs muxing on the header information and encrypted digital content 12 in the memory 29c according to the type of muxing specified in the dictionary 28, and places the result in the memory 29c. A file writer filter 18f then retrieves the result from the memory 29c and writes such result to the output file 29b specified in the dictionary 28 as the package 12p.

It should be noted that in certain circumstances, the type of encoding to be performed will not normally change. Since the type of muxing typically is based on the type of encoding, it is likewise the case that the type of muxing will not normally change, either. If this is in fact the case, the dictionary 28 need not include parameters on the type of encoding and/or the type of muxing. Instead, it is only necessary that the type of encoding be 'hardwired' into the encoding filter and/or that the type of muxing be 'hardwired' into the mux filter. Of course, as circumstance require, the authoring tool 18 may not include all of the aforementioned filters, or may include other filters, and any included filter may be hardwired or may perform its function according to parameters specified in the dictionary 28, all without departing from the spirit and scope of the present invention.

Preferably, the authoring tool 18 is implemented on an appropriate computer, processor, or other computing machine by way of appropriate software. The structure and operation of such machine and such software should be apparent based on the disclosure herein and therefore do not require any detailed discussion in the present disclosure.

Architecture—Content Server 22

Referring again to FIG. 1, in one embodiment of the present invention, the content server 22 distributes or otherwise makes available for retrieval the packages 12p produced by the authoring tool 18. Such packages 12p may be distributed as requested by the content server 22 by way of any appropriate distribution channel without departing from the spirit and scope of the present invention. For example, such distribution channel may be the Internet or another network, an electronic bulletin board, electronic mail, or the like. In addition, the content server 22 may be employed to copy the packages 12p onto magnetic or optical disks or other storage devices, and such storage devices may then be distributed.

It will be appreciated that the content server 22 distributes packages 12p without regard to any trust or security issues. As discussed below, such issues are dealt with in connection with the license server 24 and the relationship between such license server 24 and the user's computing device 14. In one embodiment of the present invention, the content server 22 freely releases and distributes packages 12p having digital content 12 to any distributee requesting same. However, the content server 22 may also release and distribute such packages 12p in a restricted manner without departing from the spirit and scope of the present invention. For example, the content server 22 may first require payment of a pre-determined distribution fee prior to distribution, or may require that a distributee identify itself, or may indeed make a determination of whether distribution is to occur based on an identification of the distributee.

In addition, the content server 22 may be employed to perform inventory management by controlling the authoring tool 18 to generate a number of different packages 12p in advance to meet an anticipated demand. For example, the server could generate 100 packages 12p based on the same digital content 12, and serve each package 12p 10 times. As supplies of packages 12p dwindle to 20, for example, the content server 22 may then direct the authoring tool 18 to generate 80 additional packages 12p, again for example.

Preferably, the content server 22 in the architecture 10 has a unique public/private key pair (PU-CS, PR-CS) that is employed as part of the process of evaluating a license 16 and obtaining a decryption key (KD) for decrypting corresponding digital content 12, as will be explained in more detail below. As is known, a public/private key pair is an asymmetric key, in that what is encrypted in one of the keys in the key pair can only be decrypted by the other of the keys in the key pair. In a public/private key pair encryption system, the public key may be made known to the world, but the private key should always be held in confidence by the owner of such private key. Accordingly, if the content server 22 encrypts data with its private key (PR-CS), it can send the encrypted data out into the world with its public key (PU-CS) for decryption purposes. Correspondingly, if an external device wants to send data to the content server 22 so that only such content server 22 can decrypt such data, such external device must first obtain the public key of the content server 22 (PU-CS) and then must encrypt the data with such public key. Accordingly, the content server 22 (and only the content server 22) can then employ its private key (PR-CS) to decrypt such encrypted data.

As with the authoring tool 18, the content server 22 is implemented on an appropriate computer, processor, or other computing machine by way of appropriate software. The structure and operation of such machine and such software should be apparent based on the disclosure herein and therefore do not require any detailed discussion in the present disclosure. Moreover, in one embodiment of the present invention, the authoring tool 18 and the content server 22 may reside on a single computer, processor, or other computing machine, each in a separate work space. It should be recognized, moreover, that the content server 22 may in certain circumstances include the authoring tool 18 and/or perform the functions of the authoring tool 18, as discussed above.

Structure of Digital Content Package 12p

Referring now to FIG. 3, in one embodiment of the present invention, the digital content package 12p as distributed by the content server 22 includes:

the digital content 12 encrypted with the encryption/decryption key (KD), as was discussed above (i.e., (KD (CONTENT)));

the content ID (or package ID) of such digital content 12 (or package 12*p*);

the key ID of the decryption key (KD);

license acquisition information, preferably in an un-encrypted form; and the key KD encrypting the content server 22 public key (PU-CS), signed by the content server 22 private key (PR-CS) (i.e., (KD (PU-CS) S (PR-CS))).

With regard to (KD (PU-CS) S (PR-CS)), it is to be understood that such item is to be used in connection with validating the digital content 12 and/or package 12*p*, as will be explained below. Unlike a certificate with a digital signature (see below), the key (PU-CS) is not necessary to get at (KD (PU-CS)). Instead, the key (PU-CS) is obtained merely by applying the decryption key (KD). Once so obtained, such key (PU-CS) may be employed to test the validity of the signature (S (PR-CS)).

It should also be understood that for such package 12*p* to be constructed by the authoring tool 18, such authoring tool 18 must already possess the license acquisition information and (KD (PU-CS) S (PR-CS)), presumably as header information supplied by the dictionary 28. Moreover, the authoring tool 18 and the content server 22 must presumably interact to construct (KD (PU-CS) S (PR-CS)). Such interaction may for example include the steps of:

the content server 22 sending (PU-CS) to the authoring tool 18;

the authoring tool 18 encrypting (PU-CS) with (KD) to produce (KD (PU-CS));

the authoring tool 18 sending (KD (PU-CS)) to the content server 22;

the content server 22 signing (KD (PU-CS)) with (PR-CS) to produce (KD (PU-CS) S (PR-CS)); and the content server 22 sending (KD (PU-CS) S (PR-CS)) to the authoring tool 18.

Architecture—License Server 24

Referring again to FIG. 1, in one embodiment of the present invention, the license server 24 performs the functions of receiving a request for a license 16 from a user's computing device 14 in connection with a piece of digital content 12, determining whether the user's computing device 14 can be trusted to honor an issued license 16, negotiating such a license 16, constructing such license 16, and transmitting such license 16 to the user's computing device 14. Preferably, such transmitted license 16 includes the decryption key (KD) for decrypting the digital content 12. Such license server 24 and such functions will be explained in more detail below. Preferably, and like the content server 22, the license server 24 in the architecture 10 has a unique public/private key pair (PU-LS, PR-LS) that is employed as part of the process of evaluating a license 16 and obtaining a decryption key (KD) for decrypting corresponding digital content 12, as will be explained in more detail below.

As with the authoring tool 18 and the content server 22, the license server 24 is implemented on an appropriate computer, processor, or other computing machine by way of appropriate software. The structure and operation of such machine and such software should be apparent based on the disclosure herein and therefore do not require any detailed discussion in the present disclosure. Moreover, in one embodiment of the present invention the authoring tool 18 and/or the content server 22 may reside on a single computer, processor, or other computing machine together with the license server 24, each in a separate work space.

In one embodiment of the present invention, prior to issuance of a license 16, the license server 24 and the content server 22 enter into an agency agreement or the like, wherein the license server 24 in effect agrees to be the licensing authority for at least a portion of the digital content 12 distributed by the content server 22. As should be understood, one content server 22 may enter into an agency agreement or the like with several license servers 24, and/or one license server 24 may enter into an agency agreement or the like with several content servers 22, all without departing from the spirit and scope of the present invention.

Preferably, the license server 24 can show to the world that it does in fact have the authority to issue a license 16 for digital content 12 distributed by the content server 22. To do so, it is preferable that the license server 24 send to the content server 22 the license server 24 public key (PU-LS), and that the content server 22 then send to the license server 24 a digital certificate containing PU-LS as the contents signed by the content server 22 private key (CERT (PU-LS) S (PR-CS)). As should be understood, the contents (PU-LS) in such certificate can only be accessed with the content server 22 public key (PU-CS). As should also be understood, in general, a digital signature of underlying data is an encrypted form of such data, and will not match such data when decrypted if such data has been adulterated or otherwise modified.

As a licensing authority in connection with a piece of digital content 12, and as part of the licensing function, the license server 24 must have access to the decryption key (KD) for such digital content 12. Accordingly, it is preferable that license server 24 have access to the content-key database 20 that has the decryption key (KD), key ID, and content ID (or package ID) for such digital content 12 (or package 12*p*).

Architecture—Black Box Server 26

Still referring to FIG. 1, in one embodiment of the present invention, the black box server 26 performs the functions of installing and/or upgrading a new black box 30 in a user's computing device 14. As will be explained in more detail below, the black box 30 performs encryption and decryption functions for the user's computing device 14. As will also be explained in more detail below, the black box 30 is intended to be secure and protected from attack. Such security and protection is provided, at least in part, by upgrading the black box 30 to a new version as necessary by way of the black box server 26, as will be explained in more detail below.

As with the authoring tool 18, the content server 22, and the license server 24, the black box server 26 is implemented on an appropriate computer, processor, or other computing machine by way of appropriate software. The structure and operation of such machine and such software should be apparent based on the disclosure herein and therefore do not require any detailed discussion in the present disclosure. Moreover, in one embodiment of the present invention the license server 24, the authoring tool 18, and/or the content server 22 may reside on a single computer, processor, or other computing machine together with the black box server 26, each in a separate work space. Note, though, that for security purposes, it may be wise to have the black box server 26 on a separate machine.

Architecture—User's Computing Device 14

Figure 4:
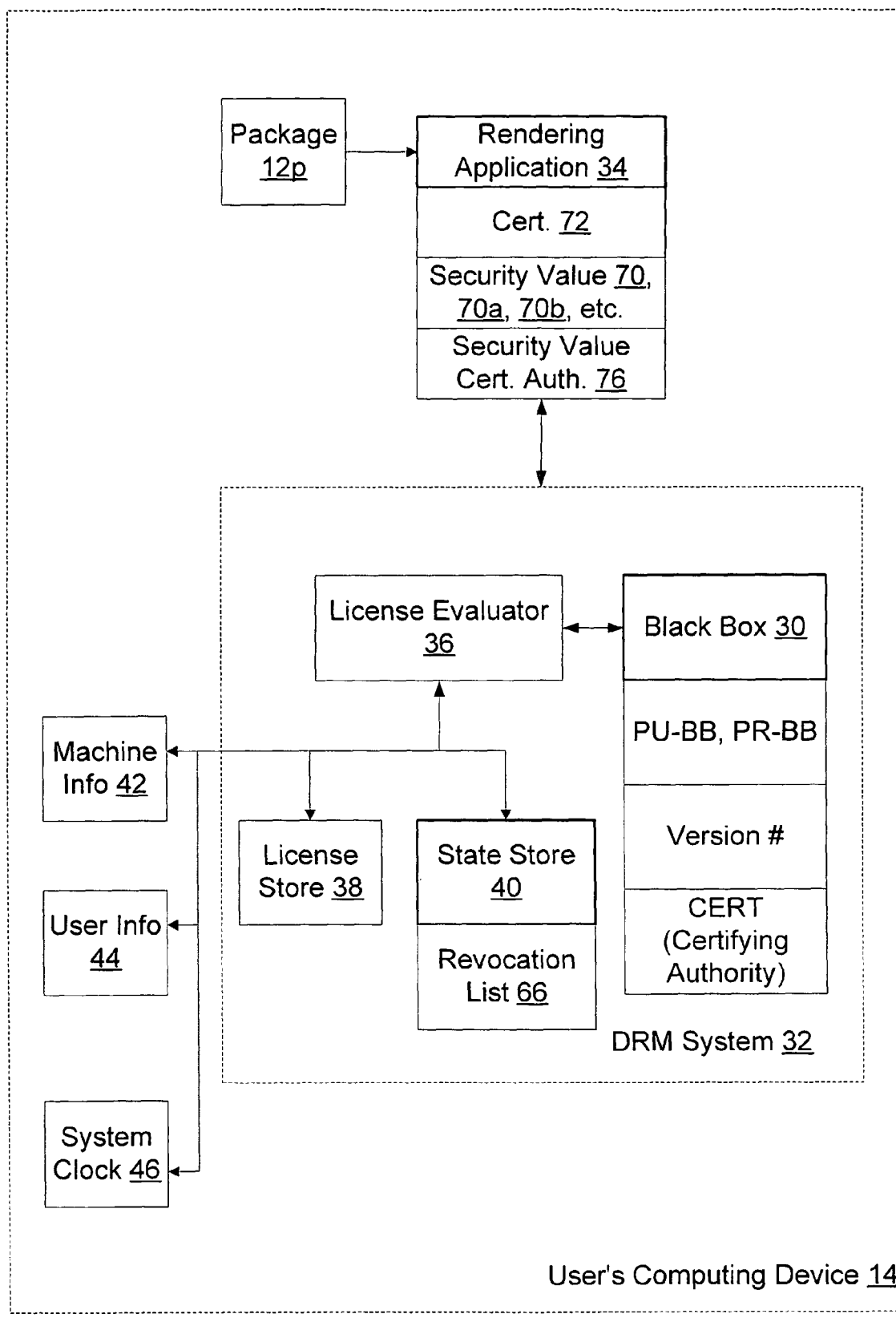
FIG. 4 is a block diagram of the user's computing device of FIG. 1 in accordance with one embodiment of the present invention.

Referring now to FIG. 4, in one embodiment of the present invention, the user's computing device 14 is a personal computer or the like, having elements including a keyboard, a mouse, a screen, a processor, RAM, ROM, a hard drive, a floppy drive, a CD player, and/or the like. However, the user's computing device 14 may also be a dedicated viewing device such as a television or monitor, a dedicated audio device such as a stereo or other music player, a dedicated printer, or the like, among other things, all without departing from the spirit and scope of the present invention.

The content owner for a piece of digital content 12 must trust that the user's computing device 14 will abide by the rules specified by such content owner, i.e. that the digital content 12 will not be rendered unless the user obtains a license 16 that permits the rendering in the manner sought. Preferably, then, the user's computing device 14 must provide a trusted component or mechanism 32 that can satisfy to the content owner that such computing device 14 will not render the digital content 12 except according to the license rules embodied in the license 16 associated with the digital content 12 and obtained by the user.

Here, the trusted mechanism 32 is a Digital Rights Management (DRM) system 32 that is enabled when a user requests that a piece of digital content 12 be rendered, that determines whether the user has a license 16 to render the digital content 12 in the manner sought, that effectuates obtaining such a license 16 if necessary, that determines whether the user has the right to play the digital content 12 according to the license 16, and that decrypts the digital content 12 for rendering purposes if in fact the user has such right according to such license 16. The contents and function of the DRM system 32 on the user's computing device 14 and in connection with the architecture 10 are described below.

DRM System 32

The DRM system 32 performs four main functions with the architecture 10 disclosed herein: (1) content acquisition, (2) license acquisition, (3) content rendering, and (4) black box 30 installation/update. Preferably, any of the functions can be performed at any time, although it is recognized that some of the functions already require that digital content 12 be acquired.

DRM System 32—Content Acquisition

Acquisition of digital content 12 by a user and/or the user's computing device 14 is typically a relatively straight-forward matter and generally involves placing a file having encrypted digital content 12 on the user's computing device 14. Of course, to work with the architecture 10 and the DRM system 32 disclosed herein, it is necessary that the encrypted digital content 12 be in a form that is amenable to such architecture 10 and DRM system 32, such as the digital package 12$p$ as will be described below.

As should be understood, the digital content 12 may be obtained in any manner from a content server 22, either directly or indirectly, without departing from the spirit and scope of the present invention. For example, such digital content 12 may be downloaded from a network such as the Internet, located on an obtained optical or magnetic disk or the like, received as part of an E-mail message or the like, or downloaded from an electronic bulletin board or the like.

Such digital content 12, once obtained, is preferably stored in a manner such that the obtained digital content 12 is accessible by a rendering application 34 (to be described below) running on the computing device 14, and by the DRM system 32. For example, the digital content 12 may be placed as a file on a hard drive (not shown) of the user's computing device 14, or on a network server (not shown) accessible to the computing device 14. In the case where the digital content 12 is obtained on an optical or magnetic disk or the like, it may only be necessary that such disk be present in an appropriate drive (not shown) coupled to the user's computing device 14.

In the present invention, it is not envisioned that any special tools are necessary to acquire digital content 12, either from the content server 22 as a direct distribution source or from some intermediary as an indirect distribution source. That is, it is preferable that digital content 12 be as easily acquired as any other data file. However, the DRM system 32 and/or the rendering application 34 may include an interface (not shown) designed to assist the user in obtaining digital content 12. For example, the interface may include a web browser especially designed to search for digital content 12, links to pre-defined Internet web sites that are known to be sources of digital content 12, and the like.

DRM System 32—Content Rendering, Part 1

Figure 5A:
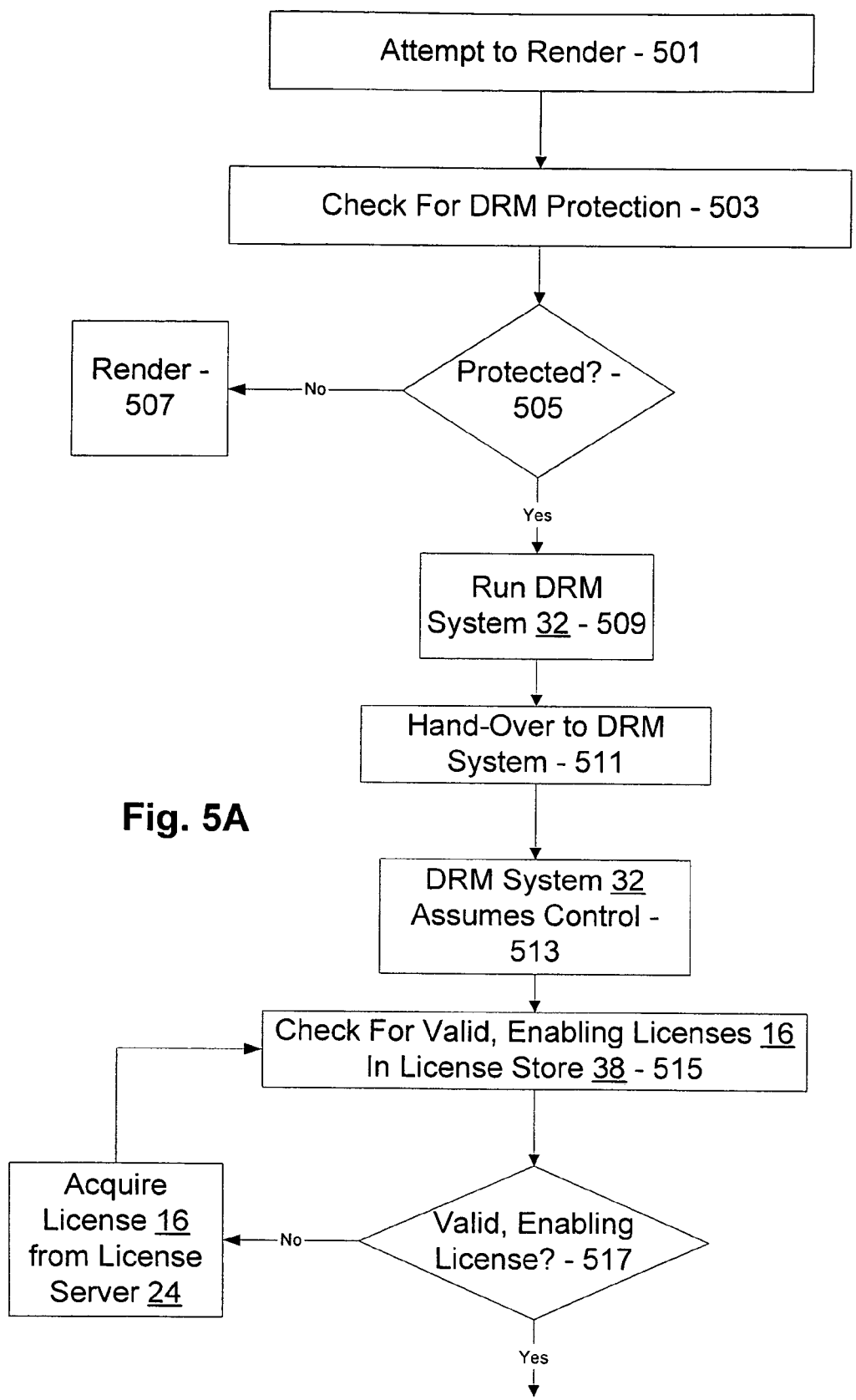
FIGS. 5A and 5B are flow diagrams showing the steps performed in connection with the Digital Rights Management (DRM) system of the computing device of FIG. 4 to render content in accordance with one embodiment of the present invention.

Referring now to FIG. 5A, in one embodiment of the present invention, assuming the encrypted digital content 12 has been distributed to and received by a user and placed by the user on the computing device 14 in the form of a stored file, the user will attempt to render the digital content 12 by executing some variation on a render command (step 501). For example, such render command may be embodied as a request to 'play' or 'open' the digital content 12. In some computing environments, such as for example the "MICROSOFT WINDOWS" operating system, distributed by MICROSOFT Corporation of Redmond, Wash., such play or open command may be as simple as 'clicking' on an icon representative of the digital content 12. Of course, other embodiments of such render command may be employed without departing from the spirit and scope of the present invention. In general, such render command may be considered to be executed whenever a user directs that a file having digital content 12 be opened, run, executed, and/or the like.

Importantly, and in addition, such render command may be embodied as a request to copy the digital content 12 to another form, such as to a printed form, a visual form, an audio form, etc. As should be understood, the same digital content 12 may be rendered in one form, such as on a computer screen, and then in another form, such as a printed document. In the present invention, each type of rendering is performed only if the user has the right to do so, as will be explained below.

In one embodiment of the present invention, the digital content 12 is in the form of a digital file having a file name ending with an extension, and the computing device 14 can determine based on such extension to start a particular kind of rendering application 34. For example, if the file name extension indicates that the digital content 12 is a text file, the rendering application 34 is some form of word processor such as the "MICROSOFT WORD", distributed by MICROSOFT Corporation of Redmond, Wash. Likewise, if the file name extension indicates that the digital content 12 is an audio, video, and/or multimedia file, the rendering application 34 is some form of multimedia player, such as "MICROSOFT MEDIA PLAYER", also distributed by MICROSOFT Corporation of Redmond, Wash.

Of course, other methods of determining a rendering application may be employed without departing from the spirit and scope of the present invention. As but one example, the digital content 12 may contain meta-data in an un-encrypted form (i.e., the aforementioned header information), where the meta-data includes information on the type of rendering application 34 necessary to render such digital content 12.

Preferably, such rendering application 34 examines the digital content 12 associated with the file name and determines whether such digital content 12 is encrypted in a rights-protected form (steps 503, 505). If not protected, the digital content 12 may be rendered without further ado (step 507). If protected, the rendering application 34 determines from the encrypted digital content 12 that the DRM system 32 is necessary to play such digital content 12. Accordingly, such rendering application 34 directs the user's computing device 14 to run the DRM system 32 thereon (step 509). Such rendering application 34 then calls such DRM system 32 to decrypt the digital content 12 (step 511). As will be discussed in more detail below, the DRM system 32 in fact decrypts the digital content 12 only if the user has a valid license 16 for such digital content 12 and the right to play the digital content 12 according to the license rules in the valid license 16. Preferably, once the DRM system 32 has been called by the rendering application 34, such DRM system 32 assumes control from the rendering application 34, at least for purposes of determining whether the user has a right to play such digital content 12 (step 513).

DRM System 32 Components

In one embodiment of the present invention, and referring again to FIG. 4, the DRM system 32 includes a license evaluator 36, the black box 30, a license store 38, and a state store 40.

DRM System 32 Components—License Evaluator 36

The license evaluator 36 locates one or more licenses 16 that correspond to the requested digital content 12, determines whether such licenses 16 are valid, reviews the license rules in such valid licenses 16, and determines based on the reviewed license rules whether the requesting user has the right to render the requested digital content 12 in the manner sought, among other things. As should be understood, the license evaluator 36 is a trusted component in the DRM system 32. In the present disclosure, to be 'trusted' means that the license server 24 (or any other trusting element) is satisfied that the trusted element will carry out the wishes of the owner of the digital content 12 according to the rights description in the license 16, and that a user cannot easily alter such trusted element for any purpose, nefarious or otherwise.

The license evaluator 36 has to be trusted in order to ensure that such license evaluator 36 will in fact evaluate a license 16 properly, and to ensure that such license evaluator 36 has not been adulterated or otherwise modified by a user for the purpose of bypassing actual evaluation of a license 16. Accordingly, the license evaluator 36 is run in a protected or shrouded environment such that the user is denied access to such license evaluator 36. Other protective measures may of course be employed in connection with the license evaluator 36 without departing from the spirit and scope of the present invention.

DRM System 32 Components—Black Box 30

Primarily, and as was discussed above, the black box 30 performs encryption and decryption functions in the DRM system 32. In particular, the black box 30 works in conjunction with the license evaluator 36 to decrypt and encrypt certain information as part of the license evaluation function. In addition, once the license evaluator 36 determines that a user does in fact have the right to render the requested digital content 12 in the manner sought, the black box 30 is provided with a decryption key (KD) for such digital content 12, and performs the function of decrypting such digital content 12 based on such decryption key (KD).

The black box 30 is also a trusted component in the DRM system 32. In particular, the license server 24 must trust that the black box 30 will perform the decryption function only in accordance with the license rules in the license 16, and also trust that such black box 30 will not operate should it become adulterated or otherwise modified by a user for the nefarious purpose of bypassing actual evaluation of a license 16. Accordingly, the black box 30 is also run in a protected or shrouded environment such that the user is denied access to such black box 30. Again, other protective measures may be employed in connection with the black box 30 without departing from the spirit and scope of the present invention. Preferably, and like the content server 22 and license server 24, the black box 30 in the DRM system 32 has a unique public/private key pair (PU-BB, PR-BB) that is employed as part of the process of evaluating the license 16 and obtaining a decryption key (KD) for decrypting the digital content 12, as will be described in more detail below.

DRM System 32 Components—License Store 38

The license store 38 stores licenses 16 received by the DRM system 32 for corresponding digital content 12. The license store 38 itself need not be trusted since the license store 38 merely stores licenses 16, each of which already has trust components built thereinto, as will be described below. In one embodiment of the present invention, the license store 38 is merely a sub-directory of a drive such as a hard disk drive or a network drive. However, the license store 38 may be embodied in any other form without departing from the spirit and scope of the present invention, so long as such license store 38 performs the function of storing licenses 16 in a location relatively convenient to the DRM system 32.

DRM System 32 Components—State Store 40

The state store 40 performs the function of maintaining state information corresponding to licenses 16 presently or formerly in the license store 38. Such state information is created by the DRM system 32 and stored in the state store 40 as necessary. For example, if a particular license 16 only allows a pre-determined number of renderings of a piece of corresponding digital content 12, the state store 40 maintains state information on how many renderings have in fact taken place in connection with such license 16. The state store 40 continues to maintain state information on licenses 16 that are no longer in the license store 38 to avoid the situation where it would otherwise be advantageous to delete a license 16 from the license store 38 and then obtain an identical license 16 in an attempt to delete the corresponding state information from the state store 40.

The state store 40 also has to be trusted in order to ensure that the information stored therein is not reset to a state more favorable to a user. Accordingly, the state store 40 is likewise run in a protected or shrouded environment such that the user is denied access to such state store 40. Once again, other protective measures may of course be employed in connection with the state store 40 without departing from the spirit and scope of the present invention. For example, the state store 40 may be stored by the DRM system 32 on the computing device 14 in an encrypted form.

DRM System 32—Content Rendering, Part 2

Figure 7:
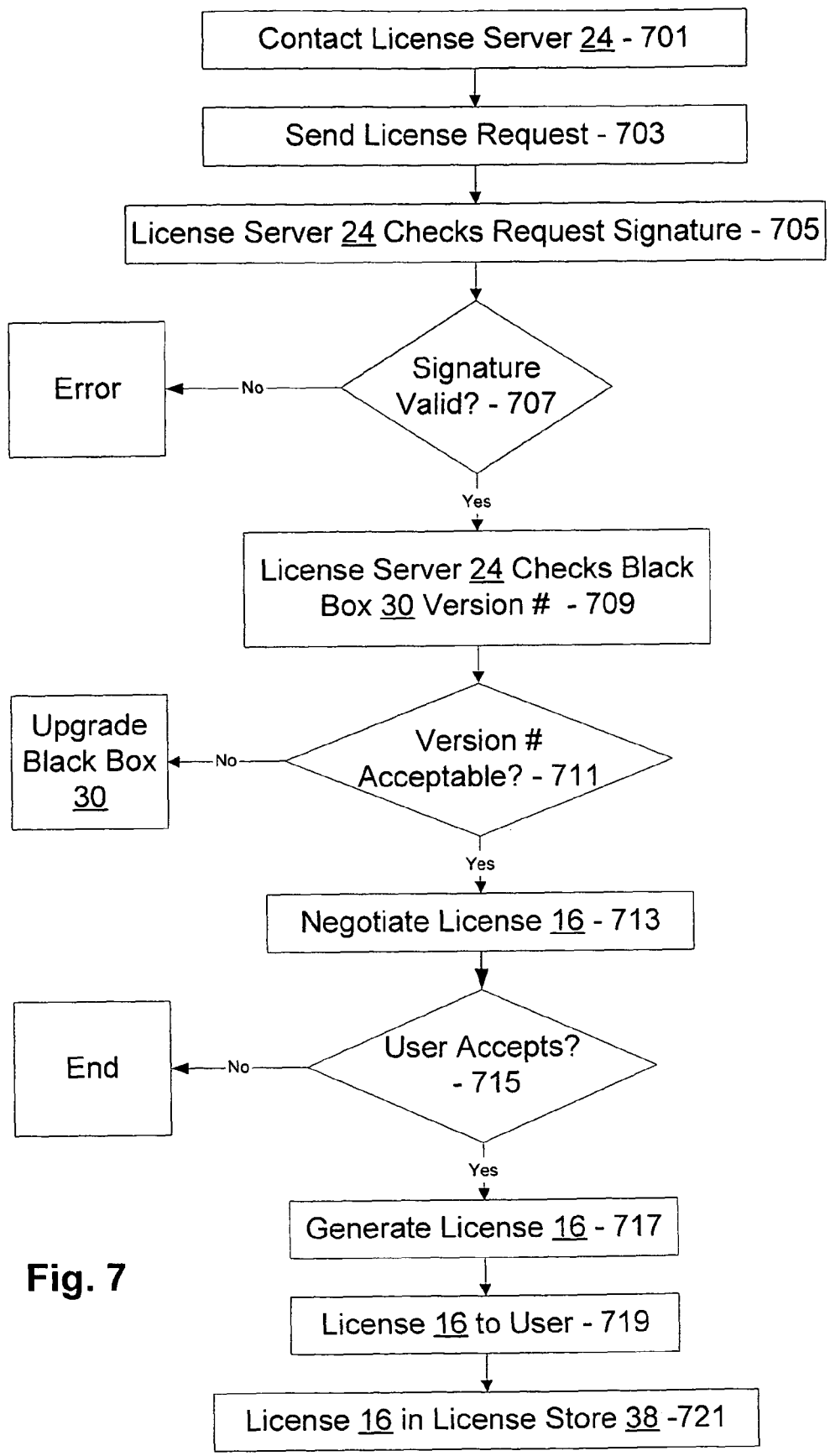
FIG. 7 is a flow diagram showing the steps performed in connection with the DRM system of FIG. 4 to obtain a license in accordance with one embodiment of the present invention.

Referring again to FIG. 5A, and again discussing content rendering in one embodiment of the present invention, once the DRM system 32 has assumed control from the calling rendering application 34, such DRM system 32 then begins the process of determining whether the user has a right to render the requested digital content 12 in the manner sought. In particular, the DRM system 32 either locates a valid, enabling license 16 in the license store (steps 515, 517) or attempts to acquire a valid, enabling license 16 from the license server 24 (i.e. performs the license acquisition function as discussed below and as shown in FIG. 7).

Figure 6:
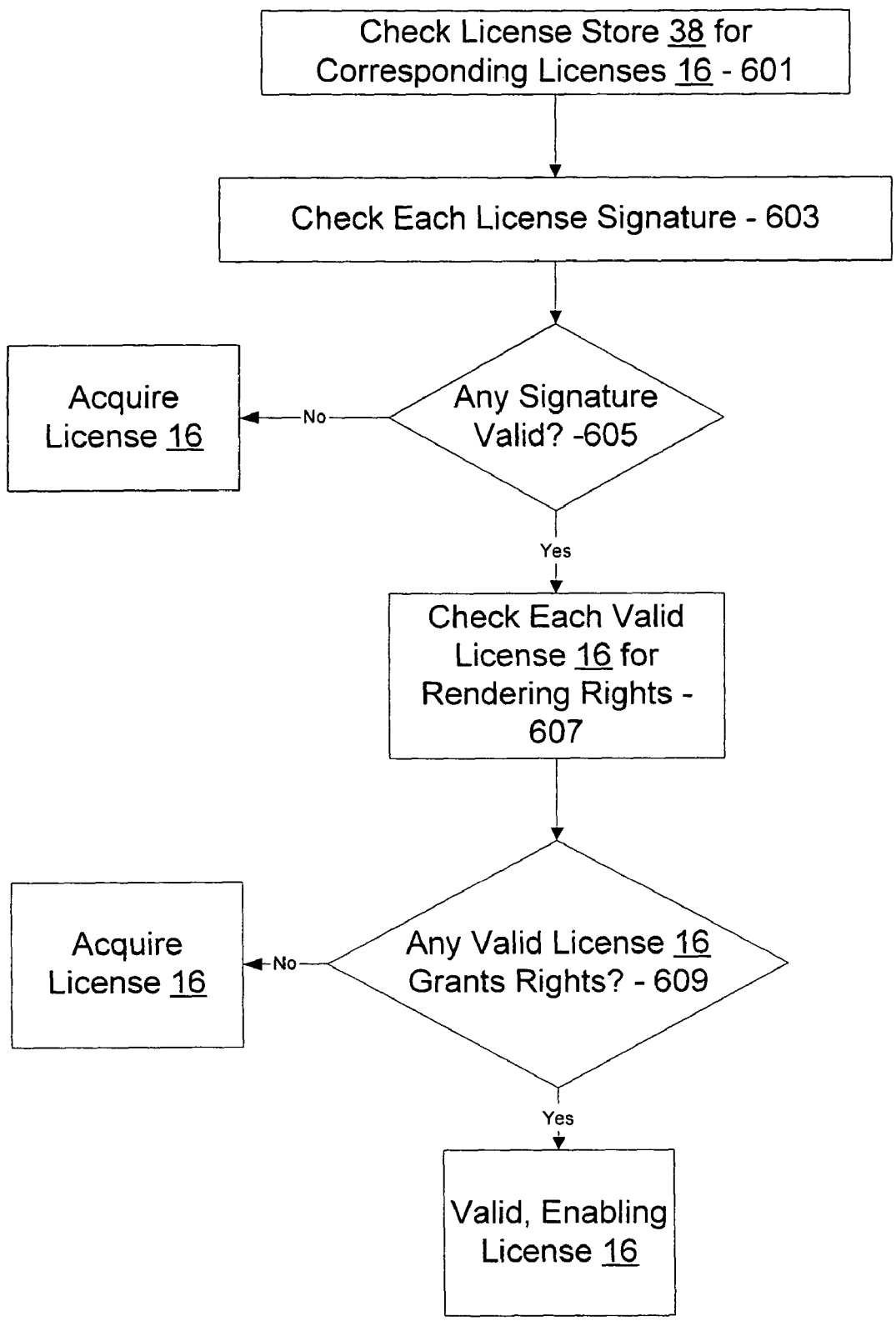
FIG. 6 is a flow diagram showing the steps performed in connection with the DRM system of FIG. 4 to determine whether any valid, enabling licenses are present in accordance with one embodiment of the present invention.

As a first step, and referring now to FIG. 6, the license evaluator 36 of such DRM system 32 checks the license store 38 for the presence of one or more received licenses 16 that correspond to the digital content 12 (step 601). Typically, the license 16 is in the form of a digital file, as will be discussed below, although it will be recognized that the license 16 may also be in other forms without departing from the spirit and scope of the present invention. Typically, the user will receive the digital content 12 without such license 16, although it will likewise be recognized that the digital content 12 may be received with a corresponding license 16 without departing from the spirit and scope of the present invention.

As was discussed above in connection with FIG. 3, each piece of digital content 12 is in a package 12p with a content ID (or package ID) identifying such digital content 12 (or package 12p), and a key ID identifying the decryption key (KD) that will decrypt the encrypted digital content 12. Preferably, the content ID (or package ID) and the key ID are in an un-encrypted form. Accordingly, and in particular, based on the content ID of the digital content 12, the license evaluator 36 looks for any license 16 in the license store 38 that contains an identification of applicability to such content ID. Note that multiple such licenses 16 may be found, especially if the owner of the digital content 12 has specified several different kinds of licenses 16 for such digital content 12, and the user has obtained multiple ones of such licenses 16. If in fact the license evaluator 36 does not find in the license store 38 any license 16 corresponding to the requested digital content 12, the DRM system 32 may then perform the function of license acquisition (step 519 of FIG. 5), to be described below.

Assume now that the DRM system 32 has been requested to render a piece of digital content 12, and one or more licenses 16 corresponding thereto are present in the license store 38. In one embodiment of the present invention, then, the license evaluator 36 of the DRM system 32 proceeds to determine for each such license 16 whether such license 16 itself is valid (steps 603 and 605 of FIG. 6). Preferably, and in particular, each license 16 includes a digital signature 26 based on the content 28 of the license 16. As should be understood, the digital signature 26 will not match the license 16 if the content 28 has been adulterated or otherwise modified. Thus, the license evaluator 36 can determine based on the digital signature 26 whether the content 28 is in the form that it was received from the license server 24 (i.e., is valid). If no valid license 16 is found in the license store 38, the DRM system 32 may then perform the license acquisition function described below to obtain such a valid license 16.

Assuming that one or more valid licenses 16 are found, for each valid license 16, the license evaluator 36 of the DRM system 32 next determines whether such valid license 16 gives the user the right to render the corresponding digital content 12 in the manner desired (i.e., is enabling) (steps 607 and 609). In particular, the license evaluator 36 determines whether the requesting user has the right to play the requested digital content 12 based on the rights description in each license 16 and based on what the user is attempting to do with the digital content 12. For example, such rights description may allow the user to render the digital content 12 into a sound, but not into a decrypted digital copy.

As should be understood, the rights description in each license 16 specifies whether the user has rights to play the digital content 12 based on any of several factors, including who the user is, where the user is located, what type of computing device 14 the user is using, what rendering application 34 is calling the DRM system 32, the date, the time, etc. In addition, the rights description may limit the license 16 to a pre-determined number of plays, or pre-determined play time, for example. In such case, the DRM system 32 must refer to any state information with regard to the license 16, (i.e., how many times the digital content 12 has been rendered, the total amount of time the digital content 12 has been rendered, etc.), where such state information is stored in the state store 40 of the DRM system 32 on the user's computing device 14.

Accordingly, the license evaluator 36 of the DRM system 32 reviews the rights description of each valid license 16 to determine whether such valid license 16 confers the rights sought to the user. In doing so, the license evaluator 36 may have to refer to other data local to the user's computing device 14 to perform a determination of whether the user has the rights sought. As seen in FIG. 4, such data may include an identification 42 of the user's computing device (machine) 14 and particular aspects thereof, an identification 44 of the user and particular aspects thereof, an identification of the rendering application 34 and particular aspects thereof, a system clock 46, and the like. If no valid license 16 is found that provides the user with the right to render the digital content 12 in the manner sought, the DRM system 32 may then perform the license acquisition function described below to obtain such a license 16, if in fact such a license 16 is obtainable.

Of course, in some instances the user cannot obtain the right to render the digital content 12 in the manner requested, because the content owner of such digital content 12 has in effect directed that such right not be granted. For example, the content owner of such digital content 12 may have directed that no license 16 be granted to allow a user to print a text document, or to copy a multimedia presentation into an un-encrypted form. In one embodiment of the present invention, the digital content 12 includes data on what rights are available upon purchase of a license 16, and types of licenses 16 available. However, it will be recognized that the content owner of a piece of digital content 12 may at any time change the rights currently available for such digital content 12 by changing the licenses 16 available for such digital content 12.

DRM System 32—License Acquisition

Referring now to FIG. 7, if in fact the license evaluator 36 does not find in the license store 38 any valid, enabling license 16 corresponding to the requested digital content 12, the DRM system 32 may then perform the function of license acquisition. As shown in FIG. 3, each piece of digital content 12 is packaged with information in an un-encrypted form regarding how to obtain a license 16 for rendering such digital content 12 (i.e., license acquisition information).

In one embodiment of the present invention, such license acquisition information may include (among other things) types of licenses 16 available, and one or more Internet web sites or other site information at which one or more appropriate license servers 24 may be accessed, where each such license server 24 is in fact capable of issuing a license 16 corresponding to the digital content 12. Of course, the license 16 may be obtained in other manners without departing from the spirit and scope of the present invention. For example, the license 16 may be obtained from a license server 24 at an electronic bulletin board, or even in person or via regular mail in the form of a file on a magnetic or optical disk or the like.

Assuming that the location for obtaining a license 16 is in fact a license server 24 on a network, the license evaluator 36 then establishes a network connection to such license server 24 based on the web site or other site information, and then sends a request for a license 16 from such connected license server 24 (steps 701, 703). In particular, once the DRM system 32 has contacted the license server 24, such DRM system 32 transmits appropriate license request information 36 to such license server 24. In one embodiment of the present invention, such license 16 request information 36 may include:

the public key of the black box 30 of the DRM system 32 (PU-BB);

the version number of the black box 30 of the DRM system 32;

a certificate with a digital signature from a certifying authority certifying the black box 30 (where the certificate may in fact include the aforementioned public key and version number of the black box 30);

the content ID (or package ID) that identifies the digital content 12 (or package 12p);

the key ID that identifies the decryption key (KD) for decrypting the digital content 12;

the type of license 16 requested (if in fact multiple types are available);

the type of rendering application 34 that requested rendering of the digital content 12;

and/or the like, among other things. Of course, greater or lessor amounts of license 16 request information 36 may be transmitted to the license server 24 by the DRM system 32 without departing from the spirit and scope of the present invention. For example, information on the type of rendering application 34 may not be necessary, while additional information about the user and/or the user's computing device 14 may be necessary.

Once the license server 24 has received the license 16 request information 36 from the DRM system 32, the license server 24 may then perform several checks for trust/authentication and for other purposes. In one embodiment of the present invention, such license server 24 checks the certificate with the digital signature of the certifying authority to determine whether such has been adulterated or otherwise modified (steps 705, 707). If so, the license server 24 refuses to grant any license 16 based on the request information 36. The license server 24 may also maintain a list of known 'bad' users and/or user's computing devices 14, and may refuse to grant any license 16 based on a request from any such bad user and/or bad user's computing device 14 on the list. Such 'bad' list may be compiled in any appropriate manner without departing from the spirit and scope of the present invention.

Based on the received request and the information associated therewith, and particularly based on the content ID (or package ID) in the license request information, the license server 24 can interrogate the content-key database 20 (FIG. 1) and locate a record corresponding to the digital content 12 (or package 12p) that is the basis of the request. As was discussed above, such record contains the decryption key (KD), key ID, and content ID for such digital content 12. In addition, such record may contain license data regarding the types of licenses 16 to be issued for the digital content 12 and the terms and conditions for each type of license 16. Alternatively, such record may include a pointer, link, or reference to a location having such additional information.

As mentioned above, multiple types of licenses 16 may be available. For example, for a relatively small license fee, a license 16 allowing a limited number of renderings may be available. For a relatively greater license fee, a license 16 allowing unlimited renderings until an expiration date may be available. For a still greater license fee, a license 16 allowing unlimited renderings without any expiration date may be available. Practically any type of license 16 having any kind of license terms may be devised and issued by the license server 24 without departing from the spirit and scope of the present invention.

In one embodiment of the present invention, the request for a license 16 is accomplished with the aid of a web page or the like as transmitted from the license server 24 to the user's computing device 14. Preferably, such web page includes information on all types of licenses 16 available from the license server 24 for the digital content 12 that is the basis of the license 16 request.

In one embodiment of the present invention, prior to issuing a license 16, the license server 24 checks the version number of the black box 30 to determine whether such black box 30 is relatively current (steps 709, 711). As should be understood, the black box 30 is intended to be secure and protected from attacks from a user with nefarious purposes (i.e., to improperly render digital content 12 without a license 16, or outside the terms of a corresponding license 16). However, it is to be recognized that no system and no software device is in fact totally secure from such an attack.

As should also be understood, if the black box 30 is relatively current, i.e., has been obtained or updated relatively recently, it is less likely that such black box 30 has been successfully attacked by such a nefarious user. Preferably, and as a matter of trust, if the license server 24 receives a license request with request information 36 including a black box 30 version number that is not relatively current, such license server 24 refuses to issue the requested license 16 until the corresponding black box 30 is upgraded to a current version, as will be described below. Put simply, the license server 24 will not trust such black box 30 unless such black box 30 is relatively current.

In the context of the black box 30 of the present invention, the term 'current' or 'relatively current' may have any appropriate meaning without departing from the spirit and scope of the present invention, consistent with the function of providing trust in the black box 30 based on the age or use thereof. For example, 'current' may be defined according to age (i.e., less than one month old). As an alternative example, 'current' may be defined based on a number of times that the black box 30 has decrypted digital content 12 (i.e., less than 200 instances of decryption). Moreover, 'current' may be based on policy as set by each license server 24, where one license server 24 may define 'current' differently from another license server 24, and a license server 24 may further define 'current' differently depending on the digital content 12 for which a license 16 is requested, or depending on the type of license 16 requested, among other things.

Assuming that the license server 24 is satisfied from the version number of a black box 30 or other indicia thereof that such black box 30 is current, the license server 24 then proceeds to negotiate terms and conditions for the license 16 with the user (step 713). Alternatively, the license server 24 negotiates the license 16 with the user, then satisfies itself from the version number of the black box 30 that such black box 30 is current (i.e., performs step 713, then step 711). Of course, the amount of negotiation varies depending on the type of license 16 to be issued, and other factors. For example, if the license server 24 is merely issuing a paid-up unlimited use license 16, very little need be negotiated. On the other hand, if the license 16 is to be based on such items as varying values, sliding scales, break points, and other details, such items and details may need to be worked out between the license server 24 and the user before the license 16 can be issued.

As should be understood, depending on the circumstances, the license negotiation may require that the user provide further information to the license server 24 (for example, information on the user, the user's computing device 14, etc.). Importantly, the license negotiation may also require that the user and the license server 24 determine a mutually acceptable payment instrument (a credit account, a debit account, a mailed check, etc.) and/or payment method (paid-up immediately, spread over a period of time, etc.), among other things.

Once all the terms of the license 16 have been negotiated and agreed to by both the license server 24 and user (step 715), a digital license 16 is generated by the license server 24

(step 719), where such generated license 16 is based at least in part on the license request, the black box 30 public key (PU-BB), and the decryption key (KD) for the digital content 12 that is the basis of the request as obtained from the content-key database 20. In one embodiment of the present invention, and as seen in FIG. 8, the generated license 16 includes:

- the content ID of the digital content 12 to which the license 16 applies;
- a Digital Rights License (DRL) 48 (i.e., the rights description or actual terms and conditions of the license 16 written in a predetermined form that the license evaluator 36 can interrogate), perhaps encrypted with the decryption key (KD) (i.e., KD (DRL));
- the decryption key (KD) for the digital content 12 encrypted with the black box 30 public key (PU-BB) as receive in the license request (i.e., (PU-BB (KD));
- a digital signature from the license server 24 (without any attached certificate) based on (KD (DRL)) and (PU-BB (KD)) and encrypted with the license server 24 private key (i.e., (S (PR-LS))); and
- the certificate that the license server 24 obtained previously from the content server 22, such certificate indicating that the license server 24 has the authority from the content server 22 to issue the license 16 (i.e., (CERT (PU-LS) S (PR-CS))).

As should be understood, the aforementioned elements and perhaps others are packaged into a digital file or some other appropriate form. As should also be understood, if the DRL 48 or (PU-BB (KD)) in the license 16 should become adulterated or otherwise modified, the digital signature (S (PR-LS)) in the license 16 will not match and therefore will not validate such license 16. For this reason, the DRL 48 need not necessarily be in an encrypted form (i.e., (KD(DRL)) as mentioned above), although such encrypted form may in some instances be desirable and therefore may be employed without departing from the spirit and scope of the present invention.

Once the digital license 16 has been prepared, such license 16 is then issued to the requester (i.e., the DRM system 32 on the user's computing device 14) (step 719 of FIG. 7). Preferably, the license 16 is transmitted over the same path through which the request therefor was made (i.e., the Internet or another network), although another path may be employed without departing from the spirit and scope of the present invention. Upon receipt, the requesting DRM system 32 preferably automatically places the received digital license 16 in the license store 38 (step 721).

It is to be understood that a user's computing device 14 may on occasion malfunction, and licenses 16 stored in the license store 38 of the DRM system 32 on such user's computing device 14 may become irretrievably lost. Accordingly, it is preferable that the license server 24 maintain a database 50 of issued licenses 16 (FIG. 1), and that such license server 24 provide a user with a copy or re-issue (hereinafter 're-issue') of an issued license 16 if the user is in fact entitled to such re-issue. In the aforementioned case where licenses 16 are irretrievably lost, it is also likely the case that state information stored in the state store 40 and corresponding to such licenses 16 is also lost. Such lost state information should be taken into account when re-issuing a license 16. For example, a fixed number of renderings license 16 might legitimately be re-issued in a pro-rated form after a relatively short period of time, and not re-issued at all after a relatively longer period of time.

DRM System 32—Installation/Upgrade of Black Box 30

As was discussed above, as part of the function of acquiring a license 16, the license server 24 may deny a request for a license 16 from a user if the user's computing device 14 has a DRM system 32 with a black box 30 that is not relatively current, i.e., has a relatively old version number. In such case, it is preferable that the black box 30 of such DRM system 32 be upgraded so that the license acquisition function can then proceed. Of course, the black box 30 may be upgraded at other times without departing from the spirit and scope of the present invention.

Preferably, as part of the process of installing the DRM system 32 on a user's computing device 14, a non-unique 'lite' version of a black box 30 is provided. Such 'lite' black box 30 is then upgraded to a unique regular version prior to rendering a piece of digital content 12. As should be understood, if each black box 30 in each DRM system 32 is unique, a security breach into one black box 30 cannot easily be replicated with any other black box 30.

Figure 9:
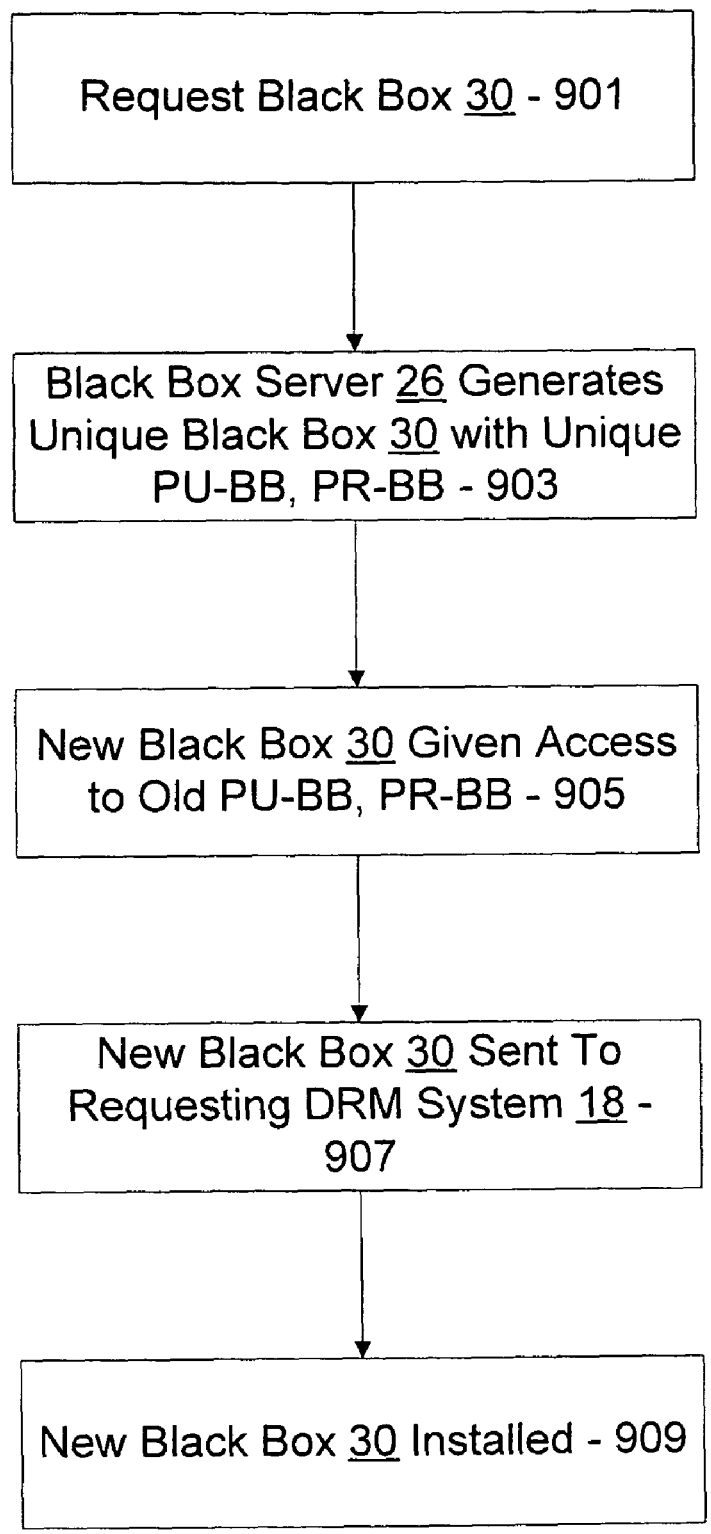
FIG. 9 is a flow diagram showing the steps performed in connection with the DRM system of FIG. 4 to obtain a new black box in accordance with one embodiment of the present invention.

Referring now to FIG. 9, the DRM system 32 obtains the unique black box 30 by requesting same from a black box server 26 or the like (as was discussed above and as shown in FIG. 1) (step 901). Typically, such request is made by way of the Internet, although other means of access may be employed without departing from the spirit and scope of the present invention. For example, the connection to a black box server 26 may be a direct connection, either locally or remotely. An upgrade from one unique non-lite black box 30 to another unique non-lite black box 30 may also be requested by the DRM system 32 at any time, such as for example a time when a license server 24 deems the black box 30 not current, as was discussed above.

Thereafter, the black box server 26 generates a new unique black box 30 (step 903). As seen in FIG. 3, each new black box 30 is provided with a version number and a certificate with a digital signature from a certifying authority. As was discussed above in connection with the license acquisition function, the version number of the black box 30 indicates the relative age and/or use thereof. The certificate with the digital signature from the certifying authority, also discussed above in connection with the license acquisition function, is a proffer or vouching mechanism from the certifying authority that a license server 24 should trust the black box 30. Of course, the license server 24 must trust the certifying authority to issue such a certificate for a black box 30 that is in fact trustworthy. It may be the case, in fact, that the license server 24 does not trust a particular certifying authority, and refuses to honor any certificate issued by such certifying authority. Trust may not occur, for example, if a particular certifying authority is found to be engaging in a pattern of improperly issuing certificates.

Preferably, and as was discussed above, the black box server 26 includes a new unique public/private key pair (PU-BB, PR-BB) with the newly generated unique black box 30 (step 903 of FIG. 9). Preferably, the private key for the black box 30 (PR-BB) is accessible only to such black box 30, and is hidden from and inaccessible by the remainder of the world, including the computing device 14 having the DRM system 32 with such black box 30, and the user thereof.

Most any hiding scheme may be employed without departing from the spirit and scope of the present invention, so long as such hiding scheme in fact performs the function of hiding the private key (PR-BB) from the world. As but one example, the private key (PR-BB) may be split into several sub-components, and each sub-component may be encrypted uniquely and stored in a different location. In such a situation, it is preferable that such sub-components are never assembled in full to produce the entire private key (PR-BB).

In one embodiment of the present invention, such private key (PR-BB) is encrypted according to code-based encryption techniques. In particular, in such embodiment, the actual software code of the black box 30 (or other software code) is employed as encrypting key(s). Accordingly, if the code of the black box 30 (or the other software code) becomes adulterated or otherwise modified, for example by a user with nefarious purposes, such private key (PR-BB) cannot be decrypted.

Although each new black box 30 is delivered with a new public/private key pair (PU-BB, PR-BB), such new black box 30 is also preferably given access to old public/private key pairs from old black boxes 30 previously delivered to the DRM system 32 on the user's computing device 14 (step 905). Accordingly, the upgraded black box 30 can still employ the old key pairs to access older digital content 12 and older corresponding licenses 16 that were generated according to such old key pairs, as will be discussed in more detail below.

Preferably, the upgraded black box 30 delivered by the black box server 26 is tightly tied to or associated with the user's computing device 14. Accordingly, the upgraded black box 30 cannot be operably transferred among multiple computing devices 14 for nefarious purposes or otherwise. In one embodiment of the present invention, as part of the request for the black box 30 (step 901) the DRM system 32 provides hardware information unique to such DRM system 32 and/or unique to the user's computing device 14 to the black box server 26, and the black box server 26 generates a black box 30 for the DRM system 32 based in part on such provided hardware information. Such generated upgraded black box 30 is then delivered to and installed in the DRM system 32 on the user's computing device 14 (steps 907, 909). If the upgraded black box 30 is then somehow transferred to another computing device 14, the transferred black box 30 recognizes that it is not intended for such other computing device 14, and does not allow any requested rendering to proceed on such other computing device 14.

Once the new black box 30 is installed in the DRM system 32, such DRM system 32 can proceed with a license acquisition function or with any other function.

DRM System 32—Content Rendering, Part 3

Figure 5B:
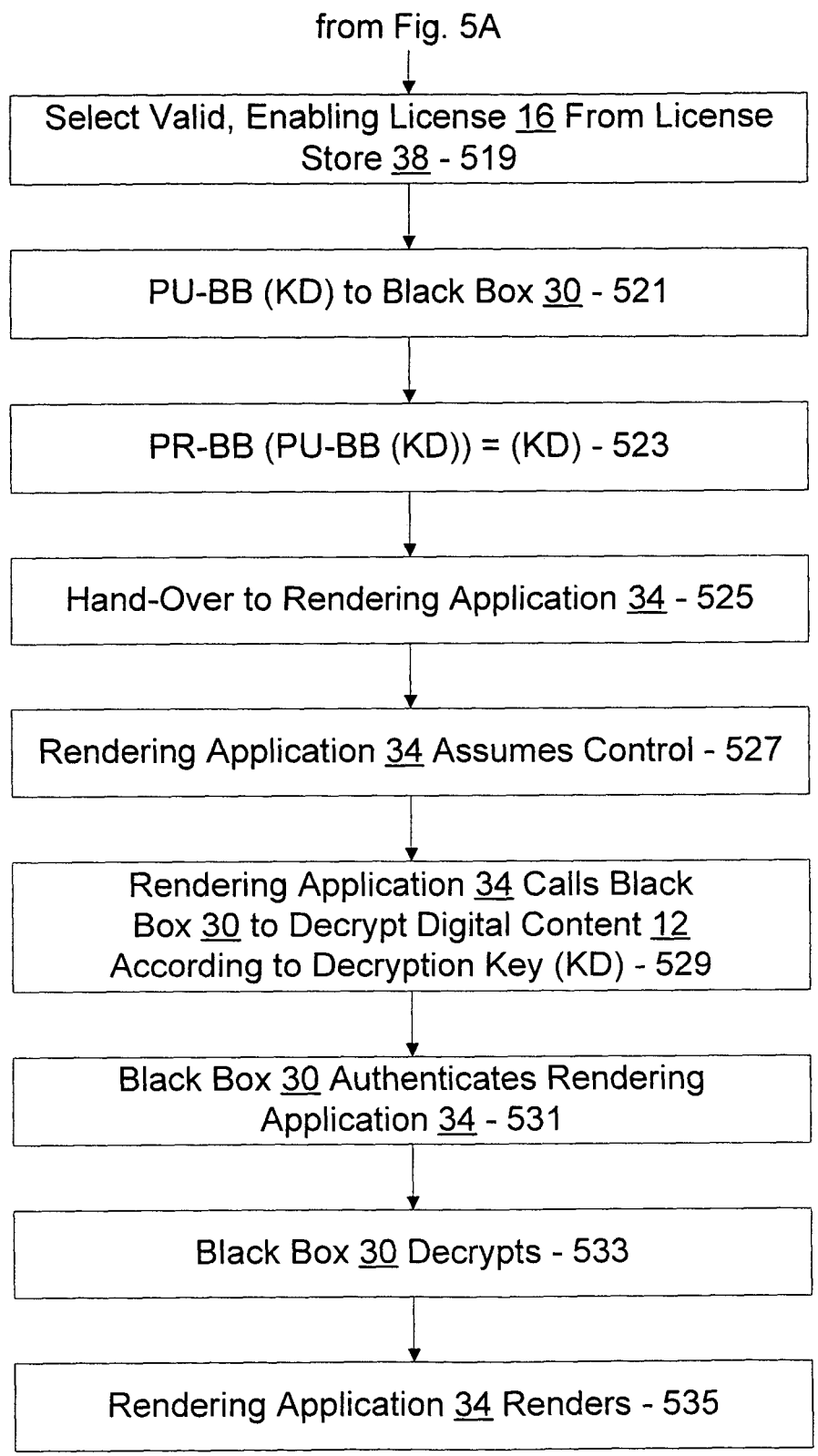

Referring now to FIG. 5B, and assuming, now, that the license evaluator 36 has found at least one valid license 16 and that at least one of such valid licenses 16 provides the user with the rights necessary to render the corresponding digital content 12 in the manner sought (i.e., is enabling), the license evaluator 36 then selects one of such licenses 16 for further use (step 519). Specifically, to render the requested digital content 12, the license evaluator 36 and the black box 30 in combination obtain the decryption key (KD) from such license 16, and the black box 30 employs such decryption key (KD) to decrypt the digital content 12. In one embodiment of the present invention, and as was discussed above, the decryption key (KD) as obtained from the license 16 is encrypted with the black box 30 public key (PU-BB(KD)), and the black box 30 decrypts such encrypted decryption key with its private key (PR-BB) to produce the decryption key (KD) (steps 521, 523). However, other methods of obtaining the decryption key (KD) for the digital content 12 may be employed without departing from the spirit and scope of the present invention.

Once the black box 30 has the decryption key (KD) for the digital content 12 and permission from the license evaluator 36 to render the digital content 12, control may be returned to the rendering application 34 (steps 525, 527). In one embodiment of the present invention, the rendering application 34 then calls the DRM system 32/black box 30 and directs at least a portion of the encrypted digital content 12 to the black box 30 for decryption according to the decryption key (KD) (step 529). The black box 30 decrypts the digital content 12 based upon the decryption key (KD) for the digital content 12, and then the black box 30 returns the decrypted digital content 12 to the rendering application 34 for actual rendering (steps 533, 535). The rendering application 34 may either send a portion of the encrypted digital content 12 or the entire digital content 12 to the black box 30 for decryption based on the decryption key (KD) for such digital content 12 without departing from the spirit and scope of the present invention.

Preferably, when the rendering application 34 sends digital content 12 to the black box 30 for decryption, the black box 30 and/or the DRM system 32 authenticates such rendering application 34 to ensure that it is in fact the same rendering application 34 that initially requested the DRM system 32 to run (step 531). Otherwise, the potential exists that rendering approval may be obtained improperly by basing the rendering request on one type of rendering application 34 and in fact rendering with another type of rendering application 34. Assuming the authentication is successful and the digital content 12 is decrypted by the black box 30, the rendering application 34 may then render the decrypted digital content 12 (steps 533, 535).

Sequence of Key Transactions

Figure 10:
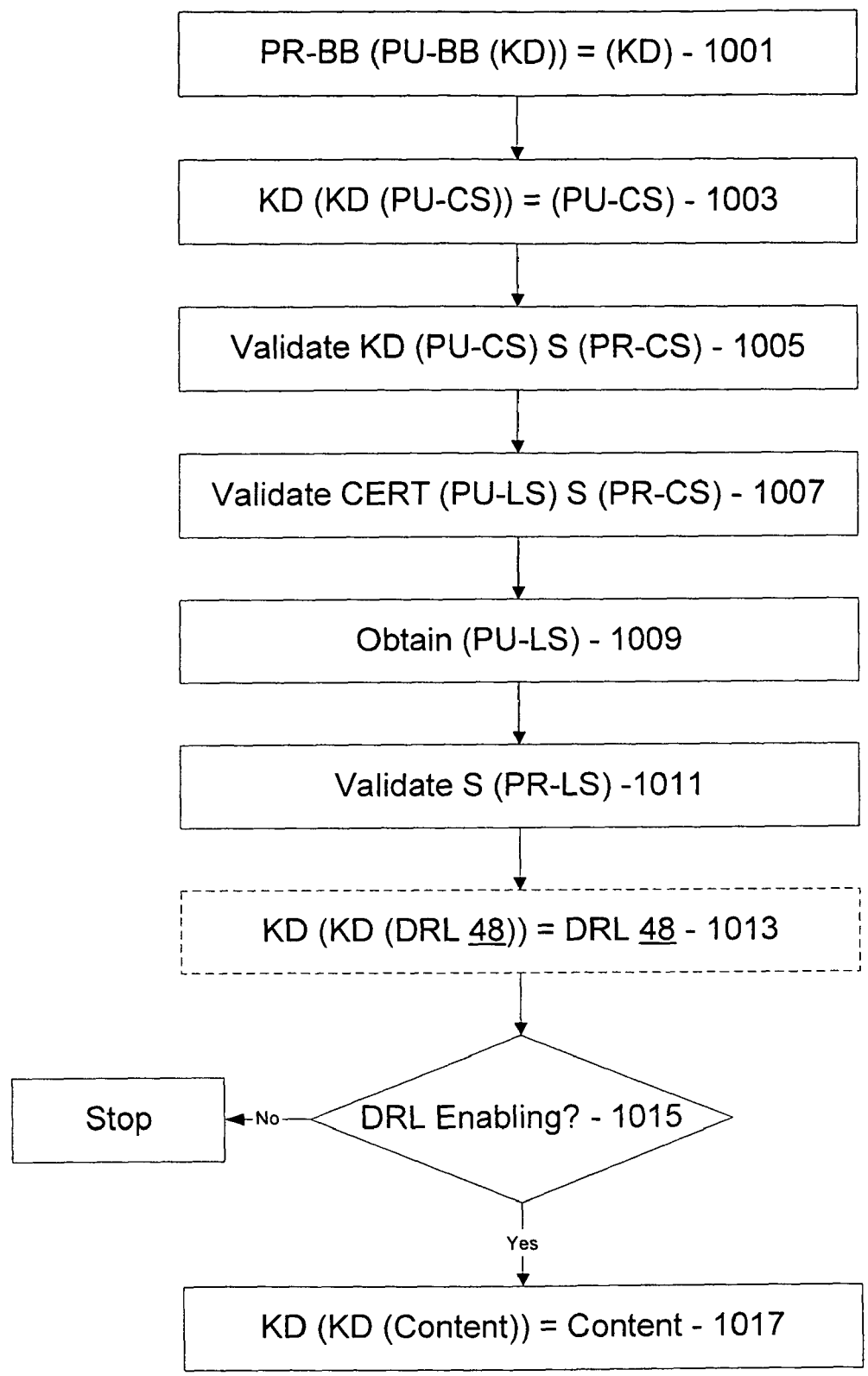
FIG. 10 is a flow diagram showing the key transaction steps performed in connection with the DRM system of FIG. 4 to validate a license and a piece of digital content and render the content in accordance with one embodiment of the present invention.

Referring now to FIG. 10, in one embodiment of the present invention, a sequence of key transactions is performed to obtain the decryption key (KD) and evaluate a license 16 for a requested piece of digital content 12 (i.e., to perform steps 515-523 of FIGS. 5A and 5B). Mainly, in such sequence, the DRM system 32 obtains the decryption key (KD) from the license 16, uses information obtained from the license 16 and the digital content 12 to authenticate or ensure the validity of both, and then determines whether the license 16 in fact provides the right to render the digital content 12 in the manner sought. If so, the digital content 12 may be rendered.

Bearing in mind that each license 16 for the digital content 12, as seen in FIG. 8, includes:

the content ID of the digital content 12 to which the license 16 applies;

the Digital Rights License (DRL) 48, perhaps encrypted with the decryption key (KD) (i.e., KD (DRL));

the decryption key (KD) for the digital content 12 encrypted with the black box 30 public key (PU-BB) (i.e., (PU-BB (KD));

the digital signature from the license server 24 based on (KD (DRL)) and (PU-BB (KD)) and encrypted with the license server 24 private key (i.e., (S (PR-L S))); and the certificate that the license server 24 obtained previously from the content server 22 (i.e., (CERT (PU-LS) S (PR-CS))), and also bearing in mind that the package 12p having the digital content 12, as seen in FIG. 3, includes:

the content ID of such digital content 12;

the digital content 12 encrypted by KD (i.e., (KD(CONTENT)));

a license acquisition script that is not encrypted; and the key KD encrypting the content server 22 public key (PU-CS), signed by the content server 22 private key (PR-CS) (i.e., (KD (PU-CS) S (PR-CS))), in one embodiment of the present invention, the specific sequence of key transactions that are performed with regard to a specific one of the licenses 16 for the digital content 12 is as follows:

1. Based on (PU-BB (KD)) from the license 16, the black box 30 of the DRM system 32 on the user's computing device 14 applies its private key (PR-BB) to obtain (KD) (step 1001). (PR-BB (PU-BB (KD))=(KD)). Note, importantly, that the black box 30 could then proceed to employ KD to decrypt the digital content 12 without any further ado. However, and also importantly, the license server 24 trusts the black box 30 not to do so. Such trust was established at the time such license server 24 issued the license 16 based on the certificate from the certifying authority vouching for the trustworthiness of such black box 30. Accordingly, despite the black box 30 obtaining the decryption key (KD) as an initial step rather than a final step, the DRM system 32 continues to perform all license 16 validation and evaluation functions, as described below.

2. Based on (KD (PU-CS) S (PR-CS)) from the digital content 12, the black box 30 applies the newly obtained decryption key (KD) to obtain (PU-CS) (step 1003). (KD (KD (PU-CS))=(PU-CS)). Additionally, the black box 30 can apply (PU-CS) as against the signature (S (PR-CS)) to satisfy itself that such signature and such digital content 12/package 12p is valid (step 1005). If not valid, the process is halted and access to the digital content 12 is denied.

3. Based on (CERT (PU-LS) S (PR-CS)) from the license 16, the black box 30 applies the newly obtained content server 22 public key (PU-CS) to satisfy itself that the certificate is valid (step 1007), signifying that the license server 24 that issued the license 16 had the authority from the content server 22 to do so, and then examines the certificate contents to obtain (PU-LS) (step 1009). If not valid, the process is halted and access to the digital content 12 based on the license 16 is denied.

4. Based on (S (PR-LS)) from the license 16, the black box 30 applies the newly obtained license server 24 public key (PU-LS) to satisfy itself that the license 16 is valid (step 1011). If not valid, the process is halted and access to the digital content 12 based on the license 16 is denied.

5. Assuming all validation steps are successful, and that the DRL 48 in the license 16 is in fact encrypted with the decryption key (KD), the license evaluator 36 then applies the already-obtained decryption key (KD) to (KD(DRL)) as obtained from the license 16 to obtain the license terms from the license 16 (i.e., the DRL 48) (step 1013). Of course, if the DRL 48 in the license 16 is not in fact encrypted with the decryption key (KD), step 1013 may be omitted. The license evaluator 36 then evaluates/interrogates the DRL 48 and determines whether the user's computing device 14 has the right based on the DRL 48 in the license 16 to render the corresponding digital content 12 in the manner sought (i.e., whether the DRL 48 is enabling) (step 1015). If the license evaluator 36 determines that such right does not exist, the process is halted and access to the digital content 12 based on the license 16 is denied.

6. Finally, assuming evaluation of the license 16 results in a positive determination that the user's computing device 14 has the right based on the DRL 48 terms to render the corresponding digital content 12 in the manner sought, the license evaluator 36 informs the black box 30 that such black box 30 can render the corresponding digital content 12 according to the decryption key (KD). The black box 30 thereafter applies the decryption key (KD) to decrypt the digital content 12 from the package 12p (i.e., (KD(KD(CONTENT))=(CONTENT)) (step 1017).

It is important to note that the above-specified series of steps represents an alternating or 'ping-ponging' between the license 16 and the digital content 12. Such ping-ponging ensures that the digital content 12 is tightly bound to the license 16, in that the validation and evaluation process can only occur if both the digital content 12 and license 16 are present in a properly issued and valid form. In addition, since the same decryption key (KD) is needed to get the content server 22 public key (PU-CS) from the license 16 and the digital content 12 from the package 12p in a decrypted form (and perhaps the license terms (DRL 48) from the license 16 in a decrypted form), such items are also tightly bound. Signature validation also ensures that the digital content 12 and the license 16 are in the same form as issued from the content server 22 and the license server 24, respectively. Accordingly, it is difficult if not impossible to decrypt the digital content 12 by bypassing the license server 24, and also difficult if not impossible to alter and then decrypt the digital content 12 or the license 16.

In one embodiment of the present invention, signature verification, and especially signature verification of the license 16, is alternately performed as follows. Rather than having a signature encrypted by the private key of the license server 16 (PR-LS), as is seen in FIG. 8, each license 16 has a signature encrypted by a private root key (PR-R) (not shown), where the black box 30 of each DRM system 32 includes a public root key (PU-R) (also not shown) corresponding to the private root key (PR-R). The private root key (PR-R) is known only to a root entity, and a license server 24 can only issue licenses 16 if such license server 24 has arranged with the root entity to issue licenses 16.

In particular, in such embodiment:
1. the license server 24 provides its public key (PU-LS) to the root entity;
2. the root entity returns the license server public key (PU-LS) to such license server 24 encrypted with the private root key (PR-R) (i.e., (CERT (PU-LS) S (PR-R))); and
3. the license server 24 then issues a license 16 with a signature encrypted with the license server private key (S (PR-LS)), and also attaches to the license the certificate from the root entity (CERT (PU-LS) S (PR-R)).

For a DRM system 18 to validate such issued license 16, then, the DRM system 18:
1. applies the public root key (PU-R) to the attached certificate (CERT (PU-LS) S (PR-R)) to obtain the license server public key (PU-LS); and
2. applies the obtained license server public key (PU-LS) to the signature of the license 16 (S (PR-LS)).

Importantly, it should be recognized that just as the root entity gave the license server 24 permission to issue licenses 16 by providing the certificate (CERT (PU-LS) S (PR-R)) to such license server 24, such license server 24 can provide a similar certificate to a second license server 24 (i.e., (CERT (PU-LS2) S (PR-LS1)), thereby allowing the second license server to also issue licenses 16. As should now be evident, a license 16 issued by the second license server would include a first certificate (CERT (PU-LS 1) S (PR-R)) and a second certificate (CERT (PU-LS2) S (PR-LS1)). Likewise, such license 16 is validated by following the chain through the first and second certificates. Of course, additional links in the chain may be added and traversed.

One advantage of the aforementioned signature verification process is that the root entity may periodically change the private root key (PR-R), thereby likewise periodically requiring each license server 24 to obtain a new certificate (CERT (PU-LS) S (PR-R)). Importantly, as a requirement for obtaining such new certificate, each license server may be required to upgrade itself. As with the black box 30, if a license server 24 is relatively current, i.e., has been upgraded relatively recently, it is less likely that license server 24 has been successfully attacked. Accordingly, as a matter of trust, each license server 24 is preferably required to be upgraded periodically via an appropriate upgrade trigger mechanism such as the signature verification process. Of course, other upgrade mechanisms may be employed without departing from the spirit and scope of the present invention.

Of course, if the private root key (PR-R) is changed, then the public root key (PU-R) in each DRM system 18 must also be changed. Such change may for example take place during a normal black box 30 upgrade, or in fact may require that a black box 30 upgrade take place. Although a changed public root key (PU-R) may potentially interfere with signature validation for an older license 16 issued based on an older private root key (PR-R), such interference may be minimized by requiring that an upgraded black box 30 remember all old public root keys (PU-R). Alternatively, such interference may be minimized by requiring signature verification for a license 16 only once, for example the first time such license 16 is evaluated by the license evaluator 36 of a DRM system 18. In such case, state information on whether signature verification has taken place should be compiled, and such state information should be stored in the state store 40 of the DRM system 18.

Digital Rights License 48

In the present invention, the license evaluator 36 evaluates a Digital Rights License (DRL) 48 as the rights description or terms of a license 16 to determine if such DRL 48 allows rendering of a corresponding piece of digital content 12 in the manner sought. In one embodiment of the present invention, the DRL 48 may be written by a licensor (i.e., the content owner) in any DRL language.

As should be understood, there are a multitude of ways to specify a DRL 48. Accordingly, a high degree of flexibility must be allowed for in any DRL language. However, it is impractical to specify all aspects of a DRL 48 in a particular license language, and it is highly unlikely that the author of such a language can appreciate all possible licensing aspects that a particular digital licensor may desire. Moreover, a highly sophisticated license language may be unnecessary and even a hindrance for a licensor providing a relatively simple DRL 48. Nevertheless, a licensor should not be unnecessarily restricted in how to specify a DRL 48. At the same time, the license evaluator 36 should always be able to get answers from a DRL 48 regarding a number of specific license questions.

Figure 11:
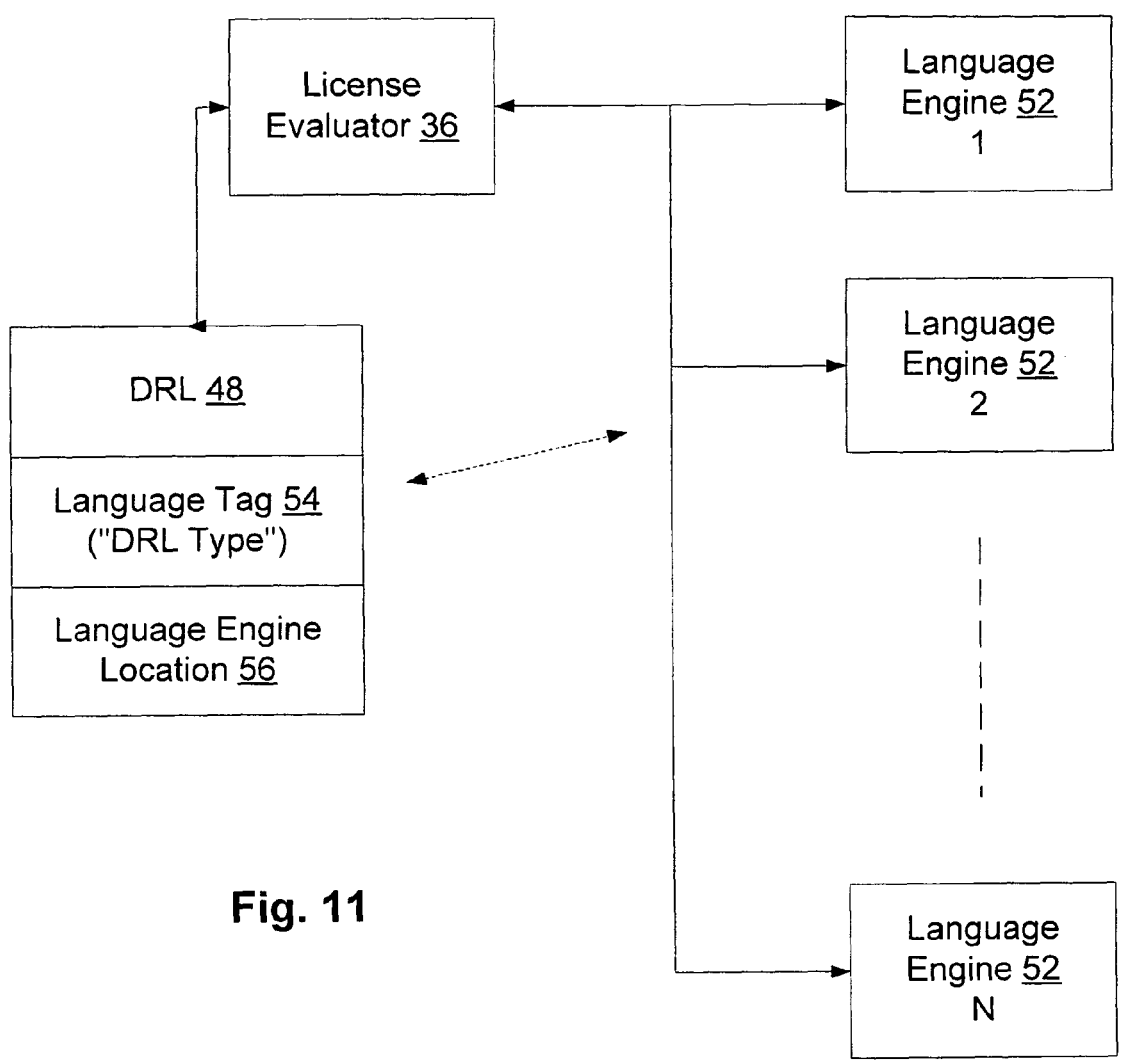
FIG. 11 is a block diagram showing the license evaluator of FIG. 4 along with a Digital Rights License (DRL) of a license and a language engine for interpreting the DRL in accordance with one embodiment of the present invention.

In the present invention, and referring now to FIG. 11, a DRL 48 can be specified in any license language, but includes a language identifier or tag 54. The license evaluator 36 evaluating the license 16, then, performs the preliminary step of reviewing the language tag 54 to identify such language, and then selects an appropriate license language engine 52 for accessing the license 16 in such identified language. As should be understood, such license language engine 52 must be present and accessible to the license evaluator 36. If not present, the language tag 54 and/or the DRL 48 preferably includes a location 56 (typically a web site) for obtaining such language engine 52.

Typically, the language engine 52 is in the form of an executable file or set of files that reside in a memory of the user's computing device 14, such as a hard drive. The language engine 52 assists the license evaluator 36 to directly interrogate the DRL 48, the license evaluator 36 interrogates the DRL 48 indirectly via the language engine 48 acting as an intermediary, or the like. When executed, the language engine 52 runs in a work space in a memory of the user's computing device 14, such as RAM. However, any other form of language engine 52 may be employed without departing from the spirit and scope of the present invention.

Preferably, any language engine 52 and any DRL language supports at least a number of specific license questions that the license evaluator 36 expects to be answered by any DRL 48, as will be discussed below. Accordingly, the license evaluator 36 is not tied to any particular DRL language; a DRL 48 may be written in any appropriate DRL language; and a DRL 48 specified in a new license language can be employed by an existing license evaluator 36 by having such license evaluator 36 obtain a corresponding new language engine 52.

DRL Languages

Two examples of DRL languages, as embodied in respective DRLs 48, are provided below. The first, 'simple' DRL 48 is written in a DRL language that specifies license attributes, while the second 'script' DRL 48 is written in a DRL language that can perform functions according to the script specified in the DRL 48. While written in a DRL language, the meaning of each line of code should be apparent based on the linguistics thereof and/or on the attribute description chart that follows:

Simple DRL 48:

```
<LICENSE>
    <DATA>
        <NAME>Beastie Boy's Play</NAME>
        <ID>39384</ID>
        <DESCRIPTION>Play the song 3 times</DESCRIPTION>
        <TERMS></TERMS>
        <VALIDITY>
            <NOTBEFORE>19980102 23:20:14Z</NOTBEFORE>
            <NOTAFTER>19980102 23:20:14Z</NOTAFTER>
        </VALIDITY>
        <ISSUEDDATE>19980102 23:20:14Z</ISSUEDDATE>
        <LICENSORSITE>http://www.foo.com</LICENSORSITE>
        <CONTENT>
            <NAME>Beastie Boy's</NAME>
            <ID>392</ID>
            <KEYID>39292</KEYID>
            <TYPE>MS Encrypted ASF 2.0</TTYPE>
        </CONTENT>
        <OWNER>
            <ID>939KDKD393KD</ID>
            <NAME>Universal</NAME>
            <PUBLICKEY></PUBLICKEY>
        </OWNER>
        <LICENSEE>
            <NAME>Arnold</NAME>
            <ID>939KDKD393KD</ID>
            <PUBLICKEY></PUBLICKEY>
        </LICENSEE>
        <PRINCIPAL TYPE='AND'>
            <PRINCIPAL TYPE='OR'>
                <PRINCIPAL>
                    <TYPE>x86Computer</TYPE>
                    <ID>3939292939d9e939</ID>
                    <NAME>Personal Computer</NAME>
                    <AUTHTYPE>Intel Authenticated Boot PC SHA-1 DSA512</AUTHTYPE>
                    <AUTHDATA>29293939</AUTHDATA>
                </PRINCIPAL>
                <PRINCIPAL>
                    <TYPE>Application</TYPE>
                    <ID>2939495939292</ID>
                    <NAME>Window's Media Player</NAME>
                    <AUTHTYPE>Authenticode SHA-1</AUTHTYPE>
```

-continued

```
        <AUTHDATA>93939</AUTHDATA>
     </PRINCIPAL>
  </PRINCIPAL>
  <PRINCIPAL>
     <TYPE>Person</TYPE>
     <ID>39299482010</ID>
     <NAME>Arnold Blinn</NAME>
     <AUTHTYPE>Authenticate user</AUTHTYPE>
     <AUTHDATA>\\redmond\arnoldb</AUTHDATA>
  </PRINCIPAL>
  </PRINCIPAL>
  <DRLTYPE>Simple</DRLTYPE> [the language tag 54]
  <DRLDATA>
     <START>19980102 23:20:14Z</START>
     <END>19980102 23:20:14Z</END>
     <COUNT>3</COUNT>
     <ACTION>PLAY</ACTION>
  </DRLDATA>
  <ENABLINGBITS>aaaabbbbccccdddd</ENABLINGBITS>
  </DATA>
  <SIGNATURE>
  <SIGNERNAME>Universal</SIGNERNAME>
  <SIGNERID>9382ABK3939DKD</SIGNERID>
  <HASHALGORITHMID>MD5</HASHALGORITHMID>
  <SIGNALGORITHMID>RSA 128</SIGNALGORITHMID>
  <SIGNATURE>xxxyyyxxxyyyxxxyyy</SIGNATURE>
  <SIGNERPUBLICKEY></SIGNERPUBLICKEY>
  <CONTENTSIGNEDSIGNERPUBLICKEY></
CONTENTSIGNEDSIGNERPUBLICKEY>
  </SIGNATURE>
</LICENSE>
                Script DRL 48:

<LICENSE>
  <DATA>
     <NAME>Beastie Boy's Play</NAME>
     <ID>39384</ID>
     <DESCRIPTION>Play the song unlimited</DESCRIPTION>
     <TERMS></TERMS>
     <VALIDITY>
        <NOTBEFORE>19980102 23:20:14Z</NOTBEFORE>
        <NOTAFTER>19980102 23:20:14Z</NOTAFTER>
     </VALIDITY>
     <ISSUEDDATE>19980102 23:20:14Z</ISSUEDDATE>
     <LICENSORSITE>http://www.foo.com</LICENSORSITE>
     <CONTENT>
        <NAME>Beastie Boy's</NAME
        <ID>392</ID>
        <KEYID>39292</KEYID>
        <TYPE>MS Encrypted ASF 2.0</TTYPE>
     </CONTENT>
     <OWNER>
        <ID>939KDKD393KD</ID>
        <NAME>Universal</NAME>
        <PUBLICKEY></PUBLICKEY>
     </OWNER>
     <LICENSEE>
        <NAME>Arnold</NAME>
        <ID>939KDKD393KD</ID>
        <PUBLICKEY></PUBLICKEY>
     </LICENSEE>
     <DRLTYPE>Script</DRLTYPE> [the language tag 54]
     <DRLDATA>
        function on_enable(action, args) as boolean
           result = False
           if action = "PLAY" then
              result = True
           end if
           on_action = False
        end function
        ...
     </DRLDATA>
  </DATA>
  <SIGNATURE>
     <SIGNERNAME>Universal</SIGNERNAME>
     <SIGNERID>9382</SIGNERID>
     <SIGNERPUBLICKEY></SIGNERPUBLICKEY>
     <HASHID>MD5</HASHID>
     <SIGNID>RSA 128</SIGNID>
     <SIGNATURE>xxxyyyxxxyyyxxxyyy</SIGNATURE>
     <CONTENTSIGNEDSIGNERPUBLICKEY></
CONTENTSIGNEDSIGNERPUBLICKEY>
  </SIGNATURE>
</LICENSE>
```

In the two DRLs 48 specified above, the attributes listed have the following descriptions and data types:

| Attribute | Description | Data Type |
|---|---|---|
| Id | ID of the license | GUID |
| Name | Name of the license | String |
| Content Id | ID of the content | GUID |
| Content Key Id | ID for the encryption key of the content | GUID |
| Content Name | Name of the content | String |
| Content Type | Type of the content | String |
| Owner Id | ID of the owner of the content | GUID |
| Owner Name | Name of the owner of the content | String |
| Owner Public Key | Public key for owner of content. This is a base-64 encoded public key for the owner of the content. | String |
| Licensee Id | Id of the person getting license. It may be null. | GUID |
| Licensee Name | Name of the person getting license. It may be null. | String |
| Licensee Public Key | Public key of the licensee. This is the base-64 encoded public key of the licensee. It may be null. | String |
| Description | Simple human readable description of the license | String |
| Terms | Legal terms of the license. This may be a pointer to a web page containing legal prose. | String |
| Validity Not After | Validity period of license expiration | Date |
| Validity Not Before | Validity period of license start | Date |
| Issued Date | Date the license was issued | Date |
| DRL Type | Type of the DRL. Example include "SIMPLE" or "SCRIPT" | String |
| DRL Data | Data specific to the DRL | String |
| Enabling Bits | These are the bits that enable access to the actual content. The interpretation of these bits is up to the application, but typically this will be the private key for decryption of the content. This data will be base-64 encoded. Note that these bits are encrypted using the public key of the individual machine. | String |
| Signer Id | ID of person signing license | GUID |
| Signer Name | Name of person signing license | String |
| Signer Public Key | Public key for person signing license. This is the base-64 encode public key for the signer. | String |
| Content Signed Signer Public Key | Public key for person signing the license that has been signed by the content server private key. The public key to verify this signature will be encrypted in the content. This is base-64 encoded. | String |
| Hash Alg Id | Algorithm used to generate hash. This is a string, such as "MD5". | String |
| Signature Alg Id | Algorithm used to generate signature. This is a string, such as "RSA 128". | String |
| Signature | Signature of the data. This is base-64 encoded data. | String |

Methods

As was discussed above, it is preferable that any language engine 52 and any DRL language support at least a number of specific license questions that the digital license evaluator 36 expects to be answered by any DRL 48. Recognizing such supported questions may include any questions without departing from the spirit and scope of the present invention, and consistent with the terminology employed in the two DRL 48 examples above, in one embodiment of the present invention, such supported questions or 'methods' include 'access methods', 'DRL methods', and 'enabling use methods', as follows:

Access Methods

Access methods are used to query a DRL 48 for top-level attributes.

Variant QueryAttribute (BSTR key)

Valid keys include License.Name, License.Id, Content.Name, Content.Id, Content.Type, Owner.Name, Owner.Id, Owner.PublicKey, Licensee.Name, Licensee.Id, Licensee.PublicKey, Description, and Terms, each returning a BSTR variant; and Issued, Validity.Start and Validity.End, each returning a Date Variant.

DRL Methods

The implementation of the following DRL methods varies from DRL 48 to DRL 48. Many of the DRL methods contain a variant parameter labeled 'data' which is intended for communicating more advanced information with a DRL 48. It is present largely for future expandability.

Boolean IsActivated(Variant data)

This method returns a Boolean indicating whether the DRL 48/license 16 is activated. An example of an activated license 16 is a limited operation license 16 that upon first play is active for only 48 hours.

Activate(Variant data)

This method is used to activate a license 16. Once a license 16 is activated, it cannot be deactivated.

Variant QueryDRL(Variant data)

This method is used to communicate with a more advanced DRL 48. It is largely about future expandability of the DRL 48 feature set.

Variant GetExpires(BSTR action, Variant data)

This method returns the expiration date of a license 16 with regard to the passed-in action. If the return value is NULL, the license 16 is assumed to never expire or does not yet have an expiration date because it hasn't been activated, or the like.

Variant GetCount(BSTR action, Variant data)

This method returns the number of operations of the passed-in action that are left. If NULL is returned, the operation can be performed an unlimited number of times.

Boolean IsEnabled(BSTR action, Variant data)

This method indicates whether the license 16 supports the requested action at the present time.

Boolean IsSunk(BSTR action, Variant data)

This method indicates whether the license 16 has been paid for. A license 16 that is paid for up front would return TRUE, while a license 16 that is not paid for up front, such as a license 16 that collects payments as it is used, would return FALSE.

Enabling Use Methods.

These methods are employed to enable a license 16 for use in decrypting content.

Boolean Validate (BSTR key)

This method is used to validate a license 16. The passed-in key is the black box 30 public key (PU-BB) encrypted by the decryption key (KD) for the corresponding digital content 12 (i.e., (KD(PU-BB))) for use in validation of the signature of the license 16. A return value of TRUE indicates that the license 16 is valid. A return value of FALSE indicates invalid.

int OpenLicense 16(BSTR action, BSTR key, Variant data)

This method is used to get ready to access the decrypted enabling bits. The passed-in key is (KD(PU-BB)) as described above. A return value of 0 indicates success. Other return values can be defined.

BSTR GetDecryptedEnablingBits (BSTR action, Variant data)

Variant GetDecryptedEnablingBitsAsBinary (BSTR action, Variant Data)

These methods are used to access the enabling bits in decrypted form. If this is not successful for any of a number of reasons, a null string or null variant is returned.

void CloseLicense (BSTR action, Variant data)

This method is used to unlock access to the enabling bits for performing the passed-in action. If this is not successful for any of a number of reasons, a null string is returned.

Heuristics

As was discussed above, if multiple licenses 16 are present for the same piece of digital content 12, one of the licenses 16 must be chosen for further use. Using the above methods, the following heuristics could be implemented to make such choice. In particular, to perform an action (say "PLAY") on a piece of digital content 12, the following steps could be performed:

1. Get all licenses 16 that apply to the particular piece of digital content 12.
2. Eliminate each license 16 that does not enable the action by calling the IsEnabled function on such license 16.
3. Eliminate each license 16 that is not active by calling IsActivated on such license 16.
4. Eliminate each license 16 that is not paid for up front by calling IsSunk on such license 16.
5. If any license 16 is left, use it. Use an unlimited-number-of-plays license 16 before using a limited-number-of-plays license 16, especially if the unlimited-number-of-plays license 16 has an expiration date. At any time, the user should be allowed to select a specific license 16 that has already been acquired, even if the choice is not cost-effective. Accordingly, the user can select a license 16 based on criteria that are perhaps not apparent to the DRM system 32.
6. If there are no licenses 16 left, return status so indicating. The user would then be given the option of:
    using a license 16 that is not paid for up front, if available;
    activating a license 16, if available; and/or
    performing license acquisition from a license server 24.

Further Concepts—Path Authentication

As was set forth above, when the rendering application 34 sends digital content 12 to the black box 30 for decryption, the black box 30 and/or the DRM system 32 preferably authenticates that such rendering application 34 is in fact the same rendering application 34 that initially requested the DRM system 32 to run (step 531 of FIG. 5) and that the rendering application 34 itself satisfies any relevant terms in the corresponding digital license 16. In addition, such authentication ensures that such rendering application 34 can be trusted to handle the decrypted or 'naked' digital content 12 in an appropriate manner, and also that the rendering application 34 can be trusted to handle other sensitive matter (i.e., keys, encrypted matter, and/or other trusted matter). However, and referring now to FIG. 13, it is to be recognized that the digital content 12 likely will 'flow' in a path 58 from the rendering application 34 to an ultimate destination 60 by way of one or more modules 62 that define such path 58.

As should be appreciated, the path 58 may be any path without departing from the spirit and scope of the present invention. For example, the path 58 may include multiple branches, junctions, loops, and the like. Likewise, the modules 62 may be any modules without departing from the spirit and scope of the present invention, and can include software modules and hardware modules including software. For example, for audio-based digital content 12, the modules 62 may include modules performing noise reduction, equalization, balance, and frequency filtering functions, among others. Correspondingly, for multimedia-based digital content 12, the modules 62 may include the aforementioned audio-function modules as well as various video-function modules, synchronization modules, and the like. Of course, the ultimate destination 60 will vary based on the digital content 12, but likely includes one or more audio output devices (a sound card, e.g.), one or more video output devices (a video card, e.g.), or the like.

It is to be recognized that the rendering application 34 itself may have many aspects of a path such as the path 58. In particular, and depending upon the particular rendering application 34, such application 34 may be instantiated in the form of several modules 62 defining the flow of digital content 12 therethrough. Therefore, it can at times be difficult to define where the rendering application 24 ends and where the path 58 begins. Nevertheless, for purposes of the present invention and the present disclosure, where the rendering application 24 ends and where the path 58 begins can be arbitrarily defined at any appropriate point if need be without departing from the spirit and scope of the present invention. In fact, the rendering application 34 can include at least a portion of the path 58, if not the entirety thereof, and the path 58 can include at least a portion of the rendering application 34, if not the entirety thereof, without departing from the spirit and scope of the present invention.

Thus, the black box 30 and/or the DRM system 32 also preferably authenticates such path 58 to ensure that each constituent module 62 in the path 58 is to be trusted by the DRM system 32. Otherwise, the potential exists that one or modules 62 in the path can be employed by a nefarious entity to obtain the naked digital content 12 as such naked digital content 12 leaves the rendering application 34. Assuming the path authentication is successful, the digital content 12 may then be decrypted by the black box 30 and forwarded to the rendering application 34 for further forwarding down the path 58 to the ultimate destination 60.

Figure 13:
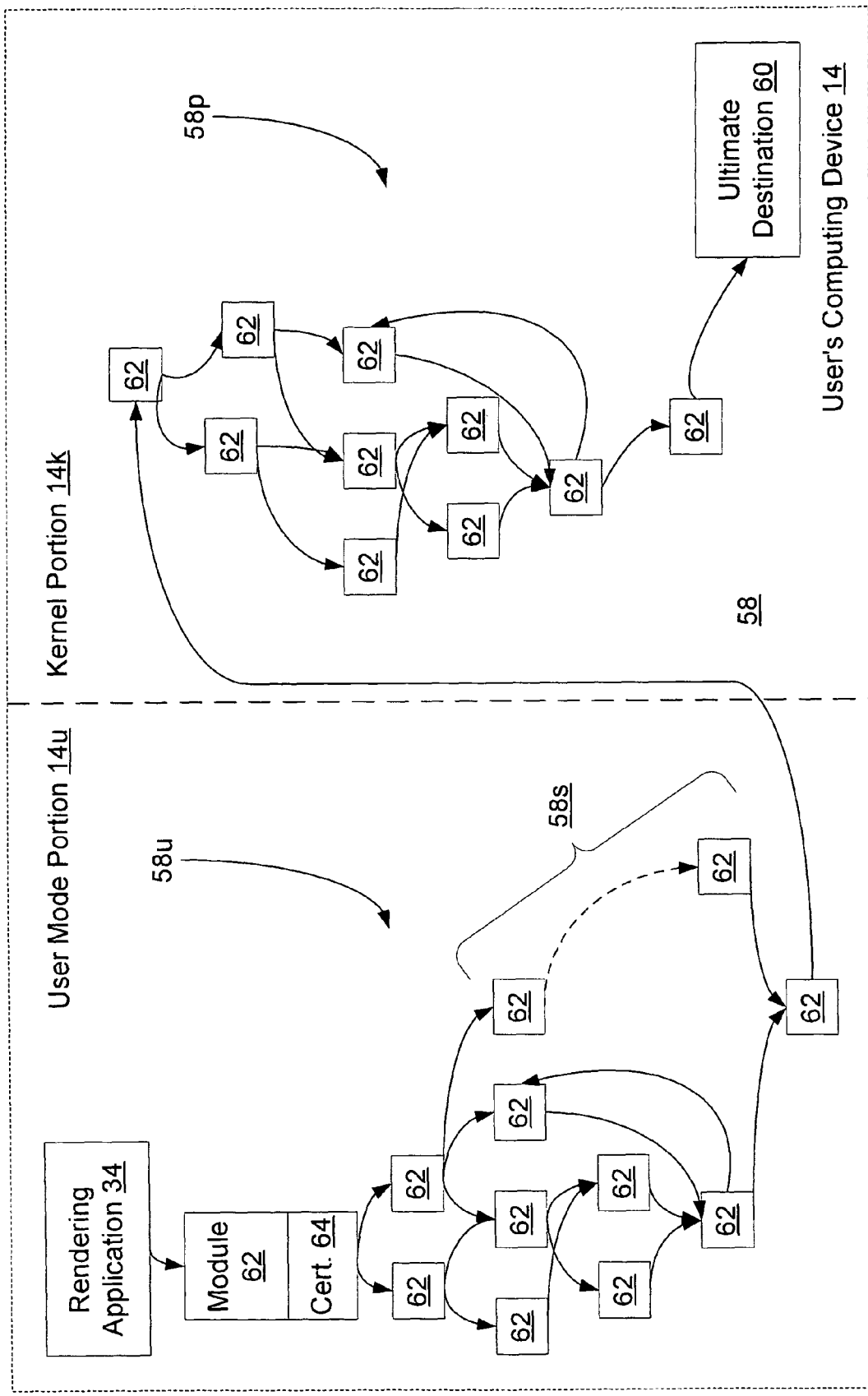
FIG. 13 is a block diagram showing a representative path between a rendering application and an ultimate destination.

As is to be understood, and as shown in FIG. 13, the path 58 typically includes a user mode portion 58u and a kernel portion 58k. The user mode portion 58u encompasses modules 62 that reside in a user portion 14u of the user's computing device 14, and includes functionality more specific to the user and the rendering application 34. Correspondingly, the kernel portion 58k encompasses modules 62 that reside in a kernel portion 14k of the user's computing device 14 and includes functionality more specific to the core operations of the user's computing device 14. As seen, each portion 58u, 58k may include branches, junctions, loops, and the like.

Figure 14:
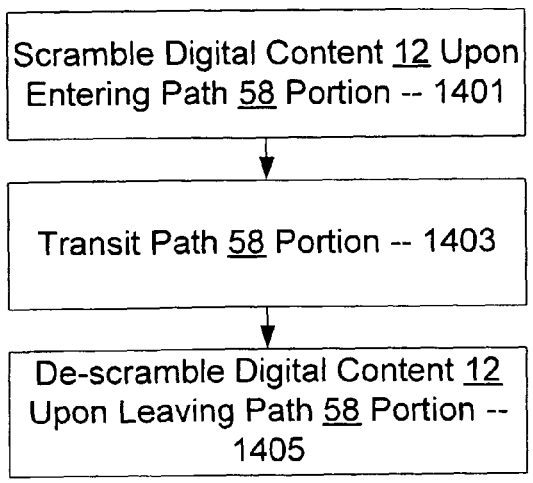
FIGS. 14-16 are flow diagrams showing various steps performed during authentication of the path of FIG. 13.

In one embodiment of the present invention, and referring now to FIG. 14, the DRM system 32 directs the rendering application 14 to output naked digital content 12 in a scrambled form such that the scrambled digital content 12 enters the user mode portion 58u of the path 58 (step 1401). Such scrambled digital content 12 is then acted upon and/or variously manipulated by the various modules 62 that define the user mode portion 58u of the path 58, and the resulting scrambled manipulated digital content 12 transits from the user mode portion 58u to the kernel portion 58k of the path 58 (step 1403). Importantly, the DRM system 32 also directs that upon leaving the user mode portion 58u/entering the kernel portion 58k, the scrambled manipulated digital content 12 is de-scrambled by an appropriate de-scrambling module 62, preferably in the kernel portion 58k of the path 58 (step 1405).

As may be appreciated, such scrambling and de-scrambling can take any appropriate form without departing from the spirit and scope of the present invention. Of course the scrambling and de-scrambling elements must agree beforehand on the form and all necessary protocols. For example, appropriate encryption and decryption techniques may be employed based on a symmetric or asymmetric key. As may also be appreciated, by presenting scrambled digital content 12 to each module 62 in the user mode portion 58u of the path 58, each such module 62 is essentially prevented from performing any operations on such scrambled digital content 12. Thus, the user mode portion 58u of the path 58 is essentially omitted or 'tunneled', whereby none of the modules 62 in such user mode portion 58u is allowed to manipulate the digital content 12 as it passes through such portion 58u of the path 58. Nevertheless, such tunneling is not considered to be especially problematic in that the kernel portion 58k of the path 58 typically replicates most of the functions performed in the user mode portion 58u.

In such embodiment, the digital content 12 is de-scrambled (i.e., again naked) in the kernel portion 58k of the path because each module in such kernel portion 58k that is in contact with/can manipulate/can 'touch' the naked digital content 12 has already authenticated itself to the DRM system 32. Specifically, prior to releasing the digital content 12 to the rendering application 34 and beyond, the DRM system 32 performs a traversal of the kernel portion 58k of the path 58 to in effect develop a map of each module in the path 58 and authenticate each path module 62. That is, recognizing that the kernel portion 14k of the user's computing device 14 comprises many modules 62, only a few of which actually define the kernel portion 58k of the path 58, the DRM system 32 seeks to discover and authenticate each such path-defining module 62. Correspondingly, the DRM system 32 does not bother to discover and authenticate other modules 62 that do not define the path 58 and therefore would not touch the naked digital content 12.

Figure 15:
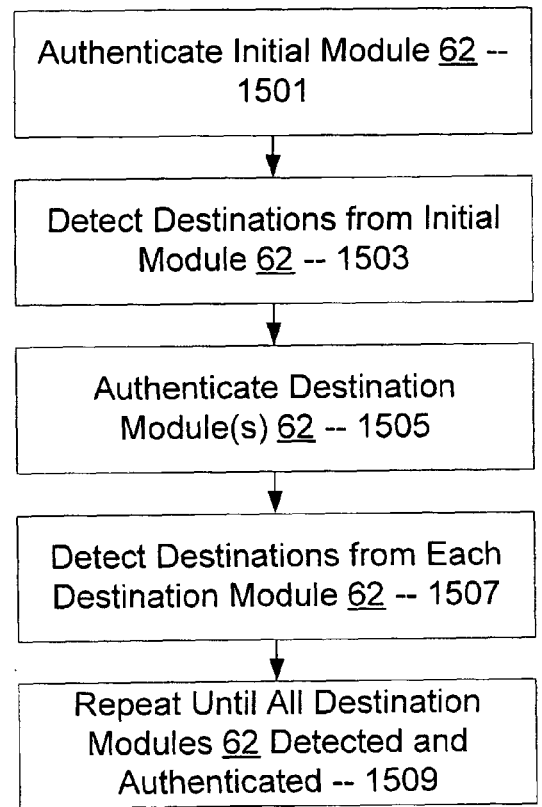

In one embodiment of the present invention, and referring now to FIG. 15 the DRM system 32 performs such traversal and authentication by starting at an initial module 62 in the kernel portion 58k of the path and authenticating such initial module 62 (step 1501), determining all possible destination modules 62 that receive data from such initial module 62 (step 1503), going to each possible destination module 62 and authenticating each such destination module 62 (step 1505), determining all possible destination modules 62 that receive data from such destination module 62 (step 1507), etc., and iteratively repeating such steps until the map of the kernel portion 58k of the path is fully defined and each module 62 in such kernel portion 58k has been authenticated (step 1509). Of course, determining all possible destinations from each module 62 may be done by appropriate examination of such module 62; such module may even include an explicit destination list.

In one embodiment of the present invention, the DRM system 32 authenticates each module 62 by querying the module 62 for the path and file name of the executable file from which such module 62 arose (i.e., on a hard drive, a server, etc.), and the memory address for the module 62 as it resides in dynamic memory (i.e., RAM or the like). The DRM system 32 then locates the executable file, finds therein a signature, and checks such signature to ensure the executable file was not tampered with, among other things. The DRM system 32 then locates the module 62 as it resides in dynamic memory and checks to ensure that such module 62 as it resides in dynamic memory does not materially differ from the executable file to ensure that the module 62 as it resides in dynamic memory was not tampered with, among other things. In addition, the DRM system 32 can look in the module 62 as it resides in dynamic memory to find all destination modules 62 arrived at from such module 62. As may be appreciated, such destination modules 62 may be explicitly stated or may be discerned relatively simply by looking for calls or the like.

The aforementioned initial module 62 should be the first module that sees the naked digital content 12 in the kernel portion 14k, and thus is likely to be the aforementioned descrambling module 62. However, other modules 62 may be the first module that sees the naked digital content 12 without departing from the spirit and scope of the present invention, and other modules 62 other than such first module may be the initial module 62, again without departing from the spirit and scope of the present invention. However, such initial module 62 should be chosen to be a module that will lead to fully discovering all other modules 62 that define the kernel portion 58k of the path 58.

The DRM system 32 may employ an appropriate database device to keep track of all modules 62 determined to be in the kernel portion 58k of the path 58, all modules 62 authenticated, etc. Accordingly, such DRM system 32 can for example recognize when a loop in such path 58 has been encountered, and can avoid endless re-authentication of each module 62 in the loop. The particular sequence of determining and authenticating modules 62 may vary without departing from the spirit and scope of the present invention. For example, modules 62 may be authenticated as determined in the manner set forth above, all modules 62 may be determined first and then authenticated, or a combination thereof.

In one embodiment of the present invention, each path module 62 authenticates itself by proffering to the DRM system 32 upon request a proper certificate 64 (FIG. 13) as received from a certifying authority. Such certificate 64 may be any appropriate certificate as received from an approved certifying authority without departing from the spirit and scope of the present invention. For example, the certificate 64 may include a hash of the module 62 as a verifying feature, or may include a public key for decrypting an attached verifying message. Of course, each module 62 in the kernel portion 58k of the path 58 must already have such a certificate 64, or else such module 62 cannot be authenticated. The DRM system 32 reviews the proffered certificate 64 upon receipt from the module 62 and determines if the received certificate 64 is acceptable for purposes of authenticating the module 62.

If even a single module 62 in the kernel portion 58k of the path 58 fails to authenticate itself to the satisfaction of the DRM system 32, and the corresponding license 16 is silent on the subject, such DRM system 32 declares the path 58 suspect and refuses to release the digital content 12 to the rendering application 34 and beyond (steps 1511, 1513). Correspondingly, if all modules 62 in the kernel portion 58k of the path 58 succeed in authenticating themselves to the satisfaction of the DRM system 32, such DRM system 32 declares the path 58 trustworthy and allows the digital content 12 to be released to the rendering application 34 and beyond, subject to any and all other requirements having been met (steps 1511, 1515). In the case where authentication is performed as each module 62 is determined and a module 62 fails to authenticate itself, the traversal may be completed if for example a need exists to fully define the map of the path 58, or the traversal may be stopped without further determination of modules 62 in the path 58.

As an alternative, and as was alluded to above, the corresponding license 16 may include explicit instructions as to what to do if a module 62 in the path 58 fails to authenticate itself. Of course, such instructions may vary in any manner without departing from the spirit and scope of the present invention. For example, the license 16 may allow a certain number of non-authenticating modules 62 in the path 58, or may include a function describing when to declare the path 58 suspect, or may even allow for any and all non-authenticating modules 62. As another alternative, in the absence of explicit instructions in the corresponding license 16, the DRM system 32 may include default instructions. Again, such instructions may vary in any manner without departing from the spirit and scope of the present invention.

As described above, the DRM system 32 performs the work of authenticating each module 62. However, in an alternate embodiment of the present invention, each module 62 in the path 58 performs the work of authenticating the next module(s) 62 in the path. Note that each module 62 authenticating the next module(s) 62 should be a relatively simple task inasmuch as each module 62 should already have intimate knowledge of exactly which module(s) 62 are in fact the next module(s) 62. Thus, the task of authentication is decentralized, and may be performed on an on-going basis as needed.

In one embodiment of the present invention, recognizing that some manipulating of the digital content 12 should be performed by modules in the user mode portion 58u of the path, certain types of scrambling may be performed that both protect the digital content 12 and allow such manipulation to take place. For example, if scrambling is performed on only a less significant portion of each piece of the digital content 12 (the less significant byte of each 2-byte piece of data, e.g.), certain types of manipulating could be performed on such digital content 12 even in the scrambled form.

In one embodiment of the present invention, recognizing that some situations require full manipulation of the digital content 12 by modules 62 in the user mode portion 58u of the path, i.e., that tunneling isn't always advisable, the user mode portion 58u of the path 58 is also traversed and authenticated in the manner shown in FIG. 15 and discussed above in connection with the kernel portion 58k of the path 58. To authenticate each module 62 in the user mode portion 58k of the path 58, such user mode module 62 should already have an appropriate certificate 64 as received from a certifying authority. Of course, if such a certificate 64 is required and not present, such user mode module 62 cannot be authenticated. Other authenticating measures aside from a certificate 64 may be employed without departing from the spirit and scope of the present invention.

Notably, traversal of the user mode portion 58u of the path 58 is likely more difficult than traversal of the kernel portion 58k of the path. Reasons for such difficulty include the likelihood that the user mode portion 58u is larger than the kernel portion 58k, the likelihood that the user mode portion 58u has more complex data branching, joining and looping structures than the kernel portion 58k, and the likelihood that at least some of the modules 62 in the user mode portion 58u do not have authenticating measures such as certificates 64, among other things. In an effort to mitigate such difficulty, and recognizing that some sub-portions 58s of the user mode portion 58k of the path 58 should not substantively change the naked digital content 12 or are otherwise non-essential, and yet are relatively long, each such sub-portion 58s is identified by the DRM system 32 and tunneled in the manner set forth above and shown in FIG. 14. That is, at a module 62 just before such sub-portion 58s, the digital content 12 is scrambled (step 1401), and at a module 62 just after such sub-portion 58s, the scrambled digital content 12 is de-scrambled (step 1405). Such tunneled sub-portion(s) 58s thus need not be authenticated by the DRM system 32.

The scramble/de-scramble functionality may be built into each module 62 so that the DRM system 32 can turn on/turn off such functionality as needed in any sub-portion 58s of the path 58. Alternatively, dedicated scramble/de-scramble modules 62 may be built into the path 58 in appropriate locations beforehand without departing from the spirit and scope of the present invention.

In an embodiment of the present invention as described above, if even a single module 62 in the user portion 58u or the kernel portion 58k of the path 58 fails to authenticate itself to the satisfaction of the DRM system 32, such DRM system 32 declares the path 58 suspect and refuses to release the digital content 12 to the rendering application 34 and beyond (steps 1511, 1513 of FIG. 15). However, in an alternate embodiment, for each non-authenticated module 62 (in the user mode portion 58u or the kernel portion 58k of the path 58), such DRM system 32 defines an appropriate sub-portion 58s including the non-authenticated module 62 and tunnels such sub-portion 58s in the manner described above in connection with FIG. 14 (step 1517 of FIG. 15). Thus, the DRM system 32 can then declare the altered path 58 trustworthy and thereby release the digital content 12 to the rendering application 34. Of course, tunneling a sub-portion 58s having a non-authenticated module 62 may degrade the path 58 somewhat, perhaps to an unacceptable level.

As is known, a certificate 64 provided by a certifying authority can and at times does become compromised in that the 'secret' of the compromised certificate 64 becomes discovered and/or public knowledge. Once compromised, a certificate 64 can be proffered by anyone, including a nefarious entity who wishes to do a non-trustworthy act. For example, such a nefarious entity can attach a compromised certificate 64 to a nefarious module in the path 58. Thus, the nefarious module 62 can proffer the compromised certificate 64 to the DRM system 32 to gain the trust of such DRM system 32, and nevertheless thereafter perform a non-trustworthy act such as storing digital content 12 in a naked and/or non-secure form.

When such a compromised certificate 64 comes to light, the certifying authority that issued such certificate 64 or another party hopefully is made aware of the compromised state thereof. Such certifying authority or other party therefore regularly issues a list of certificates 64 that are not to be trusted anymore (i.e., have been 'revoked'). In one embodiment of the present invention, a list 66 of revoked certificates 64 is regularly provided to the DRM system 32, and such DRM system 32 stores such revocation list 66 in a secure location such as the state store 40 (FIG. 4) to prevent tampering therewith.

Figure 16:
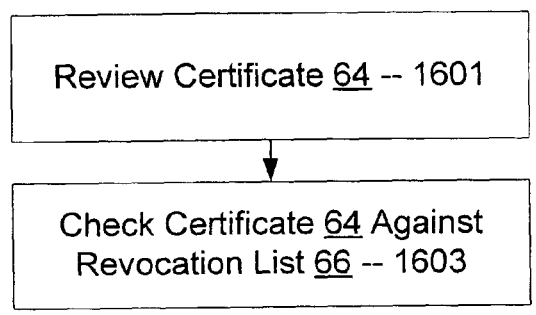

Accordingly, and referring now to FIG. 16, as part of authenticating each module 62, the DRM system 32 of the present invention reviews the proffered certificate 64 upon receipt from the module 62 and determines if the received certificate 64 is acceptable for purposes of authenticating the module 62 (step 1601); and also checks the revocation list 66 to ensure that a proffered certificate from a module 62 has not been revoked (step 1603). If revoked, the module is treated by the DRM system 32 as if non-authenticated. Preferably, the DRM system 32 regularly obtains/downloads a current revocation list 66 and/or regularly update a resident revocation list 66. Such objective can be fulfilled by for example obtaining/downloading of a current revocation list 66 prior to obtaining a new black box 30, a new license 16, new digital content 10, or the like. Alternatively such objective can be fulfilled by for example updating of a resident revocation list 66 prior to obtaining a new black box 30, a new license 16, new digital content 10, or the like. Such downloading/obtaining/updating may be performed as a requirement or may be performed automatically and/or transparently. Of course, other methods of fulfilling the objective may be employed without departing from the spirit and scope of the present invention.

Further Concepts—Security Approval by Way of Specified Security Values

As discussed above, the DRM system 32 and/or the black box 30 authenticates the rendering application 34 and the path 58 to ensure that such items can be trusted to handle the decrypted or 'naked' digital content 12 in an appropriate manner. In one embodiment of the present invention, the performed authentication of the rendering application 34 and/or the path 58 includes verifying that the rendering application 34 and/or each module 62 in the path 58 is of a type secure enough to be approved for use by the digital license 16.

Many different options are available for specifying types of security for a rendering application 34 or module 62 that is approved for use by a digital license 16. For example, the digital license 16 may appropriately specify that the rendering application 34 or module 62 must be from one or more particular sources/suppliers/developers, must be one or more particular products, must be one or more particular versions of a particular product, or the like. However, it is to be appreciated that such specifications are overly limiting in that they may unnecessarily exclude other (perhaps newer) sources/suppliers/developers, other (perhaps newer) particular products, other (perhaps newer) particular versions of a particular product, or the like.

In one embodiment of the present invention, then, a type of security of a rendering application 34 or module 62 that is to be approved for use by a digital license 16 is specified in such digital license 16 in a flexible and robust manner that is not overly limiting. In particular, such security type is specified in a scaled manner. One preferred security scale is a numerical scale, whereby each rendering application 34 or module 62 is assigned a number representative of the relative security thereof, and the digital license specifies a range within which the number must be if the rendering application 34 or module 62 is to be approved for use. However, other security scales may be employed without departing from the spirit and scope of the present invention. Such other scales may for example include letter scales (A, A−, B+, B, etc.; AAA, AA, A, BBB, BB, etc.; e.g.), plus/minus scales (+++, ++, +, −, − −, etc., e.g.) or the like.

With regard to a numerical security scale, in one embodiment of the present invention, each rendering application 34 or module 62 be assigned a security value based on a number scale from 0 to 100, where 0 is indicative of a rendering application 34 or module 62 that has been deemed not secure, and where 100 is indicative of a rendering application 34 or module 62 that has been deemed highly secure. Correspondingly, a digital license 16 may require that each rendering application 34 or module 62 have a pre-assigned security value of at least 50, greater than 40, 20 or higher, or the like. Such a security requirement 68 is shown in FIG. 8. Such digital license 16 may of course specify other ranges, and may also specify different types of ranges (between 20 and 70, no greater than 60, etc.), all without departing from the spirit and scope of the present invention.

In one embodiment of the present invention, the security value 70 of each rendering application 34 or module 62 is specified in the form of a certificate 72 attached to the rendering application 34 (as shown in FIG. 4) or module 62. Such certificate 72 is issued by a security value certifying authority that determines the security value 70 based on pre-determined parameters. Preferably, the certificate 72 is encrypted to prevent tampering therewith, and is tied to the rendering application 34 or module 62 in such a manner that the certificate 72 is inoperable with any other rendering application 34 or module 62. For example, the certificate 72 may include a hash based on the rendering application 34 or module 62, and the hash is verified when the certificate 72 is examined.

The security value certifying authority issuing the certificate 72 having the security value 70 may be any appropriate certifying authority. However, it is to be recognized that anyone can act as a certifying authority and issue a certificate. Thus, a nefarious entity could issue an improper certificate 72 on its own behalf, or a lax certifying authority could issue an improper certificate 72 to a nefarious entity. Accordingly, the security value certifying authority is preferably one trusted by the digital license 16. Such trust may for example be established by explicitly stating indicia of one or more such trusted security value certifying authorities 74 in the digital license 16 (FIG. 8), whereby a certificate 72 from a non-named security value certifying authority is not trusted. Such trust may alternately be established, for example, by stating indicia of such trusted security value certifying authorities in the black box 30 and/or the DRM system 32.

The method employed by the trusted security value certifying authority 74 to determine the security value 70 as specified in the certificate 72 may be any appropriate method without departing from the spirit and scope of the present invention. Such method may be objective, subjective, or a combination thereof, also without departing from the spirit and scope of the present invention. Factors going into a consideration of the security value 70 may include, for example, the particular source/supplier/developer of the rendering application 34 or module 62 at issue, the tamper-resistance of the rendering application 34 or module 62 at issue, whether any associated keys in the rendering application 34 or module 62 at issue are well-hidden, what kind of history of trust has been established with regard to the rendering application 34 or module 62 at issue, and the like, among other things.

In fact, in one embodiment of the present invention, based on such factors and others, the security value 70 as specified in the certificate 70 may instead or in addition comprise a plurality of security sub-values 70a, 70b, etc. (FIG. 4) As should be understood, each sub-value 70a, 70b, could be indicative of one factor, or a function of one or more factors. Correspondingly, the security requirement 74 of the digital license could specify required ranges for each sub-value 70a, 70b, etc., could specify required ranges for the result of functions of the sub-values 70a, 70b, etc., or the like.

In one embodiment of the present invention, and referring now to FIG. 17, the DRM system 32 and/or the license evaluator 36 (hereinafter 'the DRM system 32') approves a rendering application 34 or module 62 for use in accordance with the terms of a digital license 16 in the following manner. Preliminarily, the DRM system 32 examines the terms of the digital license 16 and extracts from such digital license 16 the security requirement 68 and any trusted security value certifying authority information 74, as was discussed above (step 1701). The DRM system 32 also obtains from the rendering application 34 or module 62 the attached certificate 72 having the security value information 70, 70a, 70b, etc. and indicia of the security value certifying authority 76 (FIG. 4) therein (step 1703). The DRM system 32 then examines the certificate 72 in an appropriate manner to verify that such certificate 72 is indeed for such rendering application 34 or module 62 (step 1705), and obtains from the certificate 72 the security value information 70, 70a, 70b, etc. therein and the indicia of the security value certifying authority 76 that issued such certificate 72 (step 1707).

With the security requirement 68 from the digital license 16 and the security value information 70, 70a, 70b, etc. from the rendering application 34 or module 62, the DRM system 32 compares the security value 70, 70a, 70b, etc. to the security requirement 68 to appropriately determine whether such the security value 70, 70a, 70b, etc satisfies such security requirement 68 of the digital license 16 (step 1709). Of course, such determination may involve an appropriate consideration of any ranges specified in the security requirement 68, appropriate calculations based on any functions specified by the security requirement 68, or the like. With the trusted security value certifying authority information 74 from the digital license 16 and the indicia of the security value certifying authority 76 from the rendering application 34 or module 62, the DRM system 32 compares the indicia of the security value certifying authority 76 to the trusted security value certifying authority information 74 to appropriately determine whether such security value certifying authority 76 satisfies such trusted security value certifying authority information 74 from the digital license 16 (step 1711).

Assuming that the security value 70, 70a, 70b, etc. does satisfy the security requirement 68 (a security value of 58 and a requirement of greater than 50, for example) and that the security value certifying authority 76 does satisfy the trusted security value certifying authority information 74, the DRM system 32 approves the rendering application 34 or module 62 and thus verifies that the rendering application 34 or module 62 meets the security criteria as set forth by the digital license 16 (steps 1713, 1715. Of course, if the security value 70, 70a, 70b, etc. does not satisfy the security requirement 68 (a security value of 58 and a requirement of greater than 60, for example) or if the security value certifying authority 76 does not satisfy the trusted security value certifying authority information 74, the DRM system 32 does not approve such rendering application 34 or module 62, and rendering of the corresponding digital content 10 is not permitted (step 1713, 1717).

Figure 17:
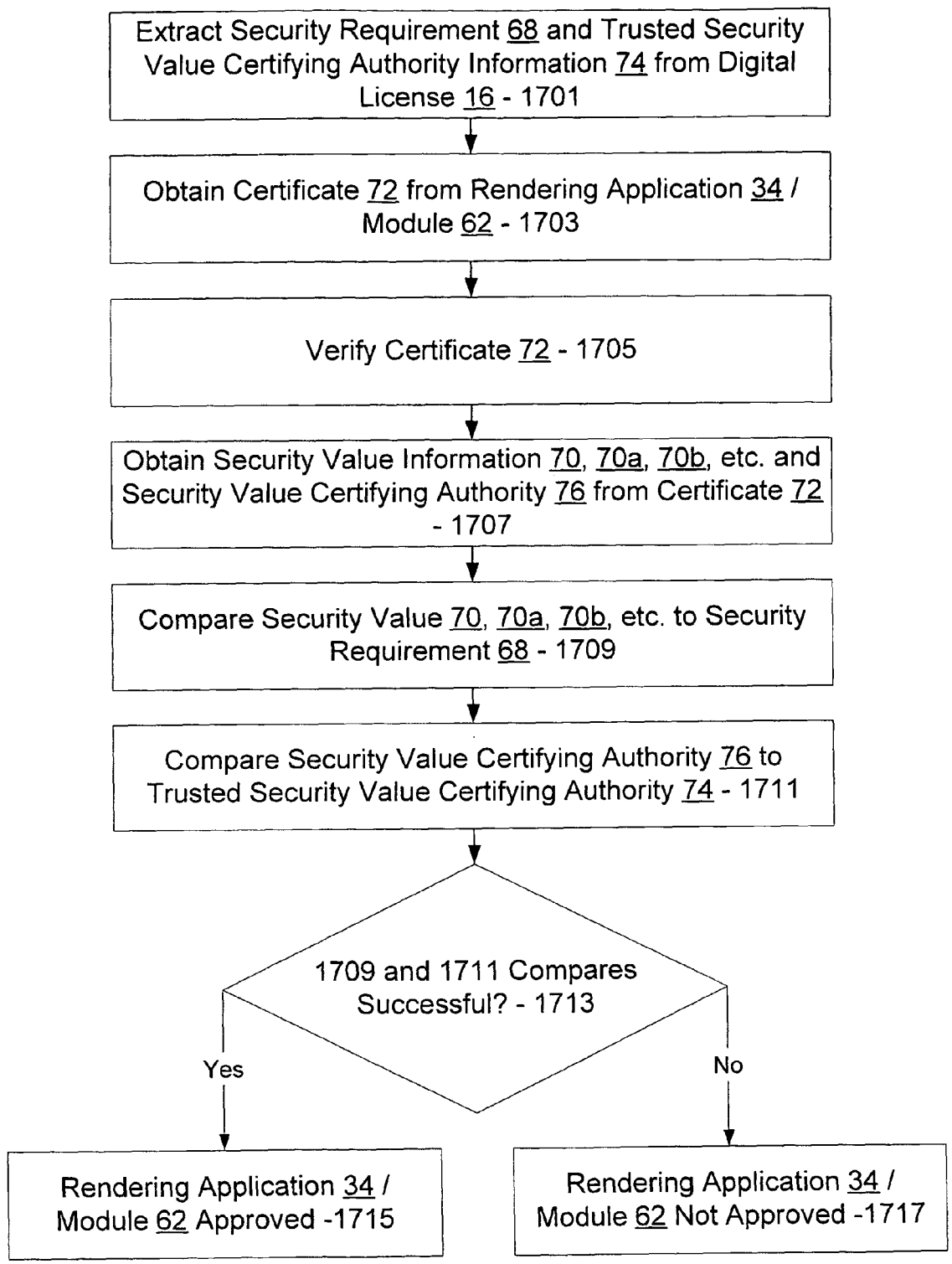
FIG. 17 is a flow diagrams showing various steps performed during security approval of the rendering application or a path module of FIG. 13.

The aforementioned process for approving a rendering application 34 or module 62 as is shown in FIG. 17 may be performed at any appropriate time without departing from the spirit and scope of the present invention. For example, the approval process may be performed during license evaluation as discussed above and shown in FIG. 6, or may be performed as part of path authentication as discussed above and shown in FIG. 15. Moreover, the approval process for the rendering application 34 may for example take place at a time different than for a module 62, if in fact any module is in fact to be approved in the manner shown in FIG. 17.

Further Concepts—Deriving the Content Key from the Key ID

As was discussed above, in one embodiment of the present invention, the decryption key (KD) and key ID (among other things) for each piece of digital content 12 (or each package 12p) is stored in the content-key database 20 (FIG. 1). Thus, based on information associated with a received license request, a license server 24 can interrogate the content-key database 20 and locate a record corresponding to the digital content 12 (or package 12p) that is the basis of the request.

However, it is to be appreciated that such content-key database 20 will likely become a mammoth size once such database 20 is loaded with information for each of a multitude of pieces of digital content 12. Such mammoth size of course increases the likelihood that the content-key database 20 will become corrupted, and accordingly a considerable amount of staff and/or resources must be dedicated to maintaining such database 20 and keeping such database 20 up and running. Moreover, such mammoth size likely will require that the database 20 reside on its own server (not shown), and will require high speed communications resources to communicate with one or more authoring tools 18, one or more content servers 22, one or more license servers 24, and the like in an efficient manner, especially if any such elements are remote from the database 20. Further, and as should be appreciated by now, the amount of communications between the one or more authoring tools 18, one or more content servers 22, one or more license servers 24, and the like will be considerable.

In one embodiment of the present invention, then, such content-key database 20 is avoided by deriving the content decryption key (KD) for a piece of digital content 12 directly from the key ID associated with such digital content 12. In particular, in such embodiment, a license server issuing a license 16 to a user's computing device 14 obtains the decryption key (KD) to be included with such license 16 from the key ID included with the license request for such license 16.

Figure 18:
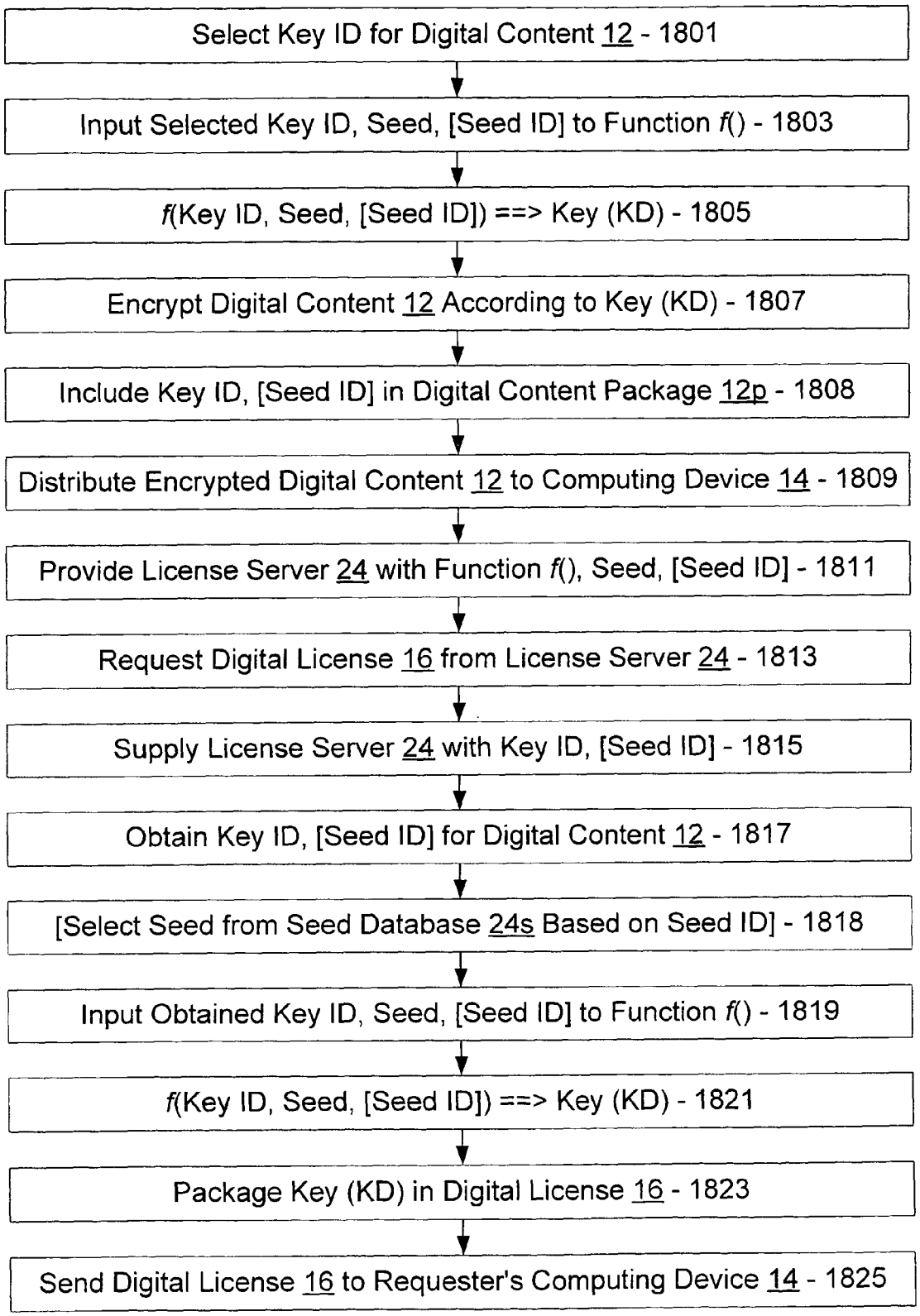
FIG. 18 is a flow diagram showing various steps performed during derivation of a decryption key (KD) from a key ID.

In such embodiment, then, and referring now to FIG. 18, the authoring tool 18 authoring such digital content 12 or the content server 22 serving such digital content 12 selects a key ID for the digital content 12 (step 1801), and the content server 22 then employs the selected key ID as an input to a function $f(\ )$, perhaps along with a secret 'seed' (step 1803). The output of such function $f(\ )$ is then employed as the symmetric encryption and decryption key (KD) for the digital content 12:

$f$(key ID, seed) $\Rightarrow$ key (KD), (step 1805) and such digital content 12 is therefore encrypted according to such key (KD) (step 1807). Such encrypted digital content 12 may thereafter be distributed to a user's computing device 14 (step 1809).

The selection of the key ID for the digital content 12 (step 1801) may be performed in any reasonable manner without departing from the spirit and scope of the present invention. For example, such selection may be done randomly, serially, or the like. Moreover, the key ID may be any particular length, have any particular base, be alphanumeric, or have other features, again without departing from the spirit and scope of the present invention.

Importantly, the function $f(\ )$ is a one-way function. As may be appreciated, in a one-way function, deriving the output from the input(s) and the secret seed is relatively easy, but deriving the seed from the input(s) and the output is extremely difficult. Accordingly, a nefarious entity with knowledge of the particular one-way function, a key ID inputted to the function, and the key (KD) derived from the function and the key ID cannot derive the secret seed without enormous effort. Of course, if such nefarious entity should be able to discover the seed, it can access any encrypted digital content 12 encrypted according to a key (KD) derived from the seed merely by knowing the key ID for such digital content 12.

Any particular one-way function may be employed without departing from the spirit and scope of the present invention. For example, a one-way hash function such as a secure hashing algorithm (SHA) or MD5 may be employed. The MD5 algorithm is marketed and/or distributed by RSA Security of Bedford, Mass. and/or a related entity. The details of one-way functions are known or are apparent to the relevant public and therefore need not be described herein in any further detail.

As was discussed above, one or more license servers 24 are authorized to issue a digital license 16 for the distributed digital content 12. Preferably, such authorized license servers 24 are provided with the function $f(\ )$ and the seed used to produce the key (KD) that was employed to encrypt such distributed digital content 12 (step 1811). Accordingly, when a digital license 16 is requested from one of such license servers 24 (step 1813), and assuming the request has been approved, the license server 24 can obtain the decryption key (KD) to include with the requested digital license 16.

For the license server 24 to obtain such decryption key (KD) in accordance with the embodiment presently discussed, such license server 24 must of course be supplied with the corresponding key ID (step 1815). Preferably, such key ID is supplied as part of the license request information provided in the course of a request for a digital license 16 (step 703 of FIG. 7). As may be recalled, and with reference to FIG. 3, such key ID is included with the digital content package 12p that contains the encrypted digital content 12 (step 1808), and is thus obtainable therefrom by the user's computing device 14. Once the license server 24 has approved the license request, such license server 16 obtains the key ID for the digital content 12 from the license request information (step 1817), and then employs the obtained key ID as an input to the function $f(\ )$ along with the secret seed employed by the content server 22 (step 1819). Preferably, the license server 24 and content server 22 agree on the secret seed beforehand. Based on such key ID and such seed, such function $f(\ )$ should of course output the appropriate decryption key (KD) for the digital content 12:

$f$(key ID, seed) $\Rightarrow$ key (KD)

(step 1821). The license server 24 therefore appropriately packages such key (KD) in the digital license 16 that is to be sent out in response to the license request (step 1823). Such digital license 16 with such key (KD) may thereafter be so sent out to the requester's computing device 14 (step 1825).

As may now be appreciated, in the embodiment of the present invention currently being discussed, the license server 24 can issue a digital license 16 for digital content 12 issued by the content server 22 because the license server 24 and the content server 22 share knowledge of the function $f(\ )$ and secret seed employed to produce a symmetric encryption/decryption key (KD) based on a selected key ID. Assuming that the function $f(\ )$ is known, then, if a nefarious entity somehow should discover the seed, such nefarious entity can access any encrypted digital content 12 encrypted according to a key (KD) derived from the seed merely by knowing the key ID for such digital content 12.

Unfortunately, it must be expected that such a nefarious entity will indeed discover the secret seed. Accordingly, in one embodiment of the present invention, the seed is changed frequently. The period of such change can of be any period without departing from the spirit and scope of the present invention. For example, such period may be weekly, daily, monthly, etc. In addition, such period may be irregular, again without departing from the spirit and scope of the present invention.

An additional reason for employing multiple seeds is to establish isolated pairings between content servers 22 and license server 24. Thus, a license server 24 would not be able to issue a license 16 for digital content 12 unless the issuing content server 22 thereof agreed beforehand on a seed with such license server 24.

Of course, if the seed changes regularly, and/or if multiple seeds are employed, a license server 24 issuing a digital license 16 for digital content 12 issued by a content server 22 must know which seed was employed to encrypt such digital content 12. Accordingly, in one embodiment of the present invention, the seed is identified by a seed ID, and such seed ID is included along with the key ID in the digital content package 12*p* that contains the encrypted digital content 12 (FIG. 3). Preferably, such seed ID is supplied along with the key ID as part of the license request information provided in the course of a request for a digital license 16 (step 703 of FIG. 7). Thus, once the license server 24 has approved the license request, such license server 16 obtains the key ID and seed ID for the digital content 12 from the license request information (step 1817), and then employs the obtained key ID as an input to the function $f(\ )$ along with the appropriate seed as previously provided to such license server 24 (step 1819). Of course, here, the appropriate seed is selected based on the obtained seed ID. Based on such key ID and such seed, such function $f(\ )$ should of course output the appropriate decryption key (KD) for the digital content 12, as was discussed above (step 1821).

In another embodiment of the present invention, the seed ID is employed as an input to the function $f(\ )$. In particular, in such embodiment, the authoring tool 18 authoring such digital content 12 or the content server 22 serving such digital content 12 selects a key ID for the digital content 12 (step 1801), and then employs the selected key ID as an input to a function $f(\ )$ along with a secret 'seed' and the seed ID for such seed (step 1803). The output of such function $f(\ )$ is then employed as the symmetric encryption and decryption key (KD) for the digital content 12:

$f$(key ID, seed, seed ID)$\Rightarrow$key (KD), (step 1805) and such digital content 12 is therefore encrypted according to such key (KD) (step 1807). Such encrypted digital content 12 may thereafter be distributed to a user's computing device 14 (step 1809).

As was discussed above, one or more license servers 24 are authorized to issue a digital license 16 for the distributed digital content 12. Preferably, such authorized license servers 24 are provided with the function $f(\ )$, each applicable seed used to produce a key (KD), and the seed ID for each applicable seed (step 1811). Also preferably, each license server 24 includes an appropriate seed database 24*s* (FIG. 1) for storing such seed and seed ID information. Accordingly, when a digital license 16 is requested from one of such license servers 24 (step 1813), and assuming the request has been approved, the license server 24 can obtain the decryption key (KD) to include with the requested digital license 16.

For the license server 24 to obtain such decryption key (KD), such license server 24 must of course be supplied with the corresponding key ID and seed ID (step 1815). Preferably, and as was discussed above, such key ID and seed ID are supplied as part of the license request information provided in the course of a request for a digital license 16 (step 703 of FIG. 7). As may again be recalled, and with reference to FIG. 3, such key ID and seed ID are included with the digital content package 12*p* that contains the encrypted digital content 12 (step 1808), and is thus obtainable therefrom by the user's computing device 14. Once the license server 24 has approved the license request, such license server 16 obtains the key ID and seed ID for the digital content 12 from the license request information (step 1817), and then employs the obtained key ID and seed ID as inputs to the function $f(\ )$ along with the appropriate seed as previously provided to such license server 24 and as selected based on the seed 11) from the seed database 24*s* (steps 1818, 1819). Based on such key ID, such seed, and such seed ID, such function $f(\ )$ should of course output the appropriate decryption key (KD) for the digital content 12:

$f$(key ID, seed, seed ID)$\Rightarrow$key (KD)

(step 1821). The license server 24 therefore appropriately packages such key (KD) in the digital license 16 that is to be sent out in response to the license request (step 1823). Such digital license 16 with such key (KD) may thereafter be so sent out to the requester's computing device 14 (step 1825).

By using multiple seeds and a seed ID for each seed, then, even if a nefarious entity somehow should discover one seed, such nefarious entity can only access encrypted digital content 12 encrypted according to a key (KD) derived from such seed. Correspondingly, such nefarious entity cannot access any encrypted digital content 12 encrypted according to a key (KD) derived from any other seed.

Further Concepts—Individualization of Black Box 30

As was discussed above, particularly with reference to FIG. 9, the DRM system 32 obtains a new and unique ('individualized') black box 30 from a black box server 26 or the like (FIG. 1), and such black box server 26 delivers the individualized black box 30 with a new public/private key pair (PU-BB, PR-BB) (and/or with other secrets and/or individualizing elements). In one embodiment of the present invention, the black box server 26 individualizes each black box 30 by individualizing an executable program file that is delivered to and is resident on the DRM system 32/the user's computing device 14. Such executable program file may be a .dll (dynamically linked library) file, such as 'bb.dll', although other types of files may be employed without departing from the spirit and scope of the present invention.

Preferably, the individualization of the bb.dll or the like is performed in a manner such that the bb.dll and DRM system 32 are BORE (Break Once Run Everywhere)—resistant in that a successful attack by a nefarious entity on one bb.dll/DRM system 32 cannot easily be replicated on any other bb.dll/DRM system 32. As may be appreciated, the bb.dll executable is individualized since such executable contains the 'secret' that is the goal of such attack.

One method for implementing BORE-resistance is disclosed in detail in U.S. patent application Ser. No. 09/525,206, entitled "BORE-Resistant Digital Goods Configuration and Distribution Methods And Arrangements" and filed Mar. 14, 2000, hereby incorporated by reference. Briefly, the method of BORE-resistance disclosed in such document is achieved in a manner akin to code optimization. As is known, code optimization is a process performed by a software and/or hardware tool such as a code optimizer or the like (not shown). The code optimizer receives a piece of executable code and optimizes such code based on predetermined optimization parameters. In essence, the code optimizer re-arranges portions of the code according to the optimization parameters to produce an optimized version that is functionally equivalent (i.e., performs the same functions) but operationally optimized. A plurality of identical copies of the optimized code may then be widely distributed.

Figure 19:
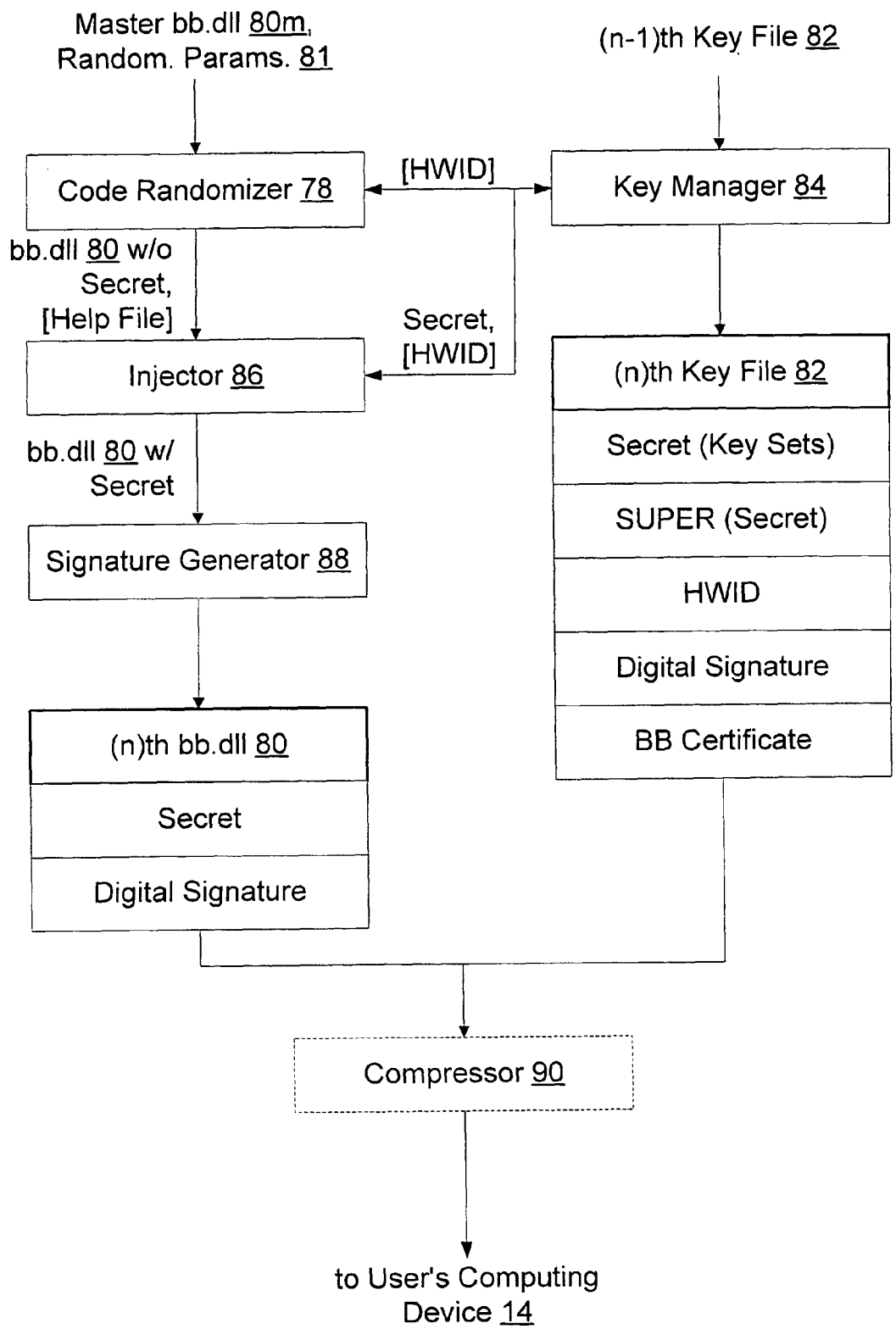
FIG. 19 is a block diagram showing apparatus employed to produce a new individualized bb.dll and a new key file for a black box in one embodiment of the present invention.

However, if the aforementioned code optimizer is run a plurality of times, each time based on randomized parameters, a corresponding plurality of versions of randomized code are produced, where each randomized version of code is functionally equivalent but operationally different. In effect, the code optimizer in such a situation is operated as a code randomizer 78 in connection with the black box server 26, as is seen in FIG. 19. Importantly, each operationally different version of code operates with a different program flow, among other things. Accordingly, a determination of the program flow of one version to find the secret in the one version is inapplicable to a determination of the program flow of another version to find the secret in the another version. Therefore, the 'breaking' of one version is not the breaking of any other version. Put simply, a piece of code randomized by such a code randomizer 78 is BORE-resistant. Accordingly, in one embodiment of the present invention, an individualized bb.dll 80 is produced by inputting a master bb.dll 80m and random parameters 81 to a code optimizer operating as the aforementioned code randomizer 78. Of course, other code randomizing agents may be employed without departing from the spirit and scope of the present invention.

Figure 20C:
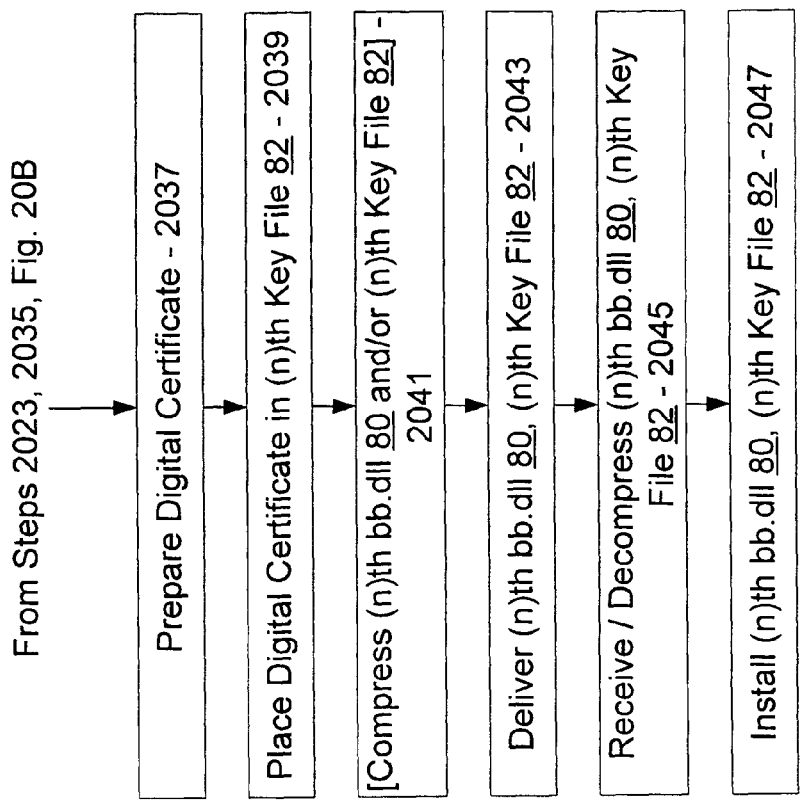
FIGS. 20A-20D are flow diagrams showing various steps performed in connection with the apparatus shown in FIG. 19.
Figure 20A:
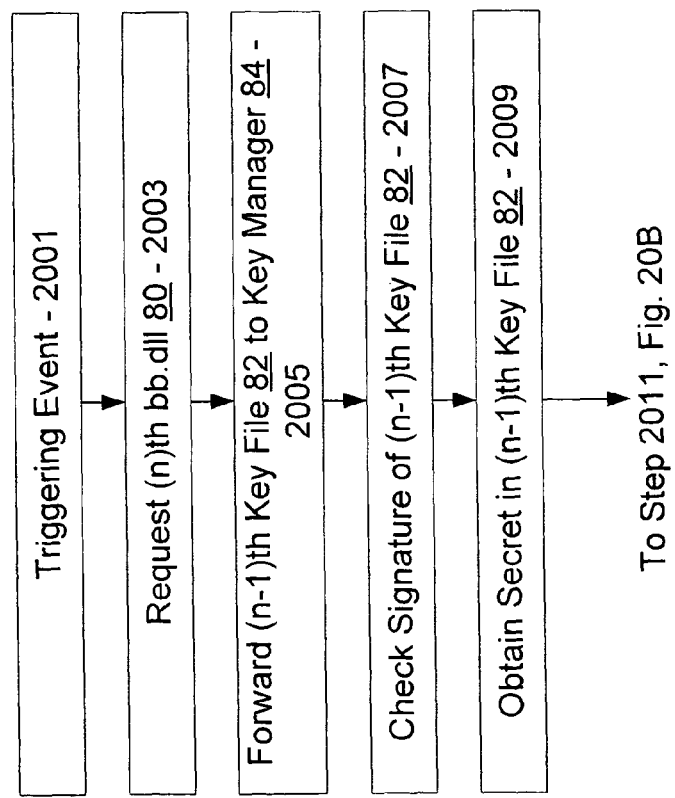
Figure 20B:
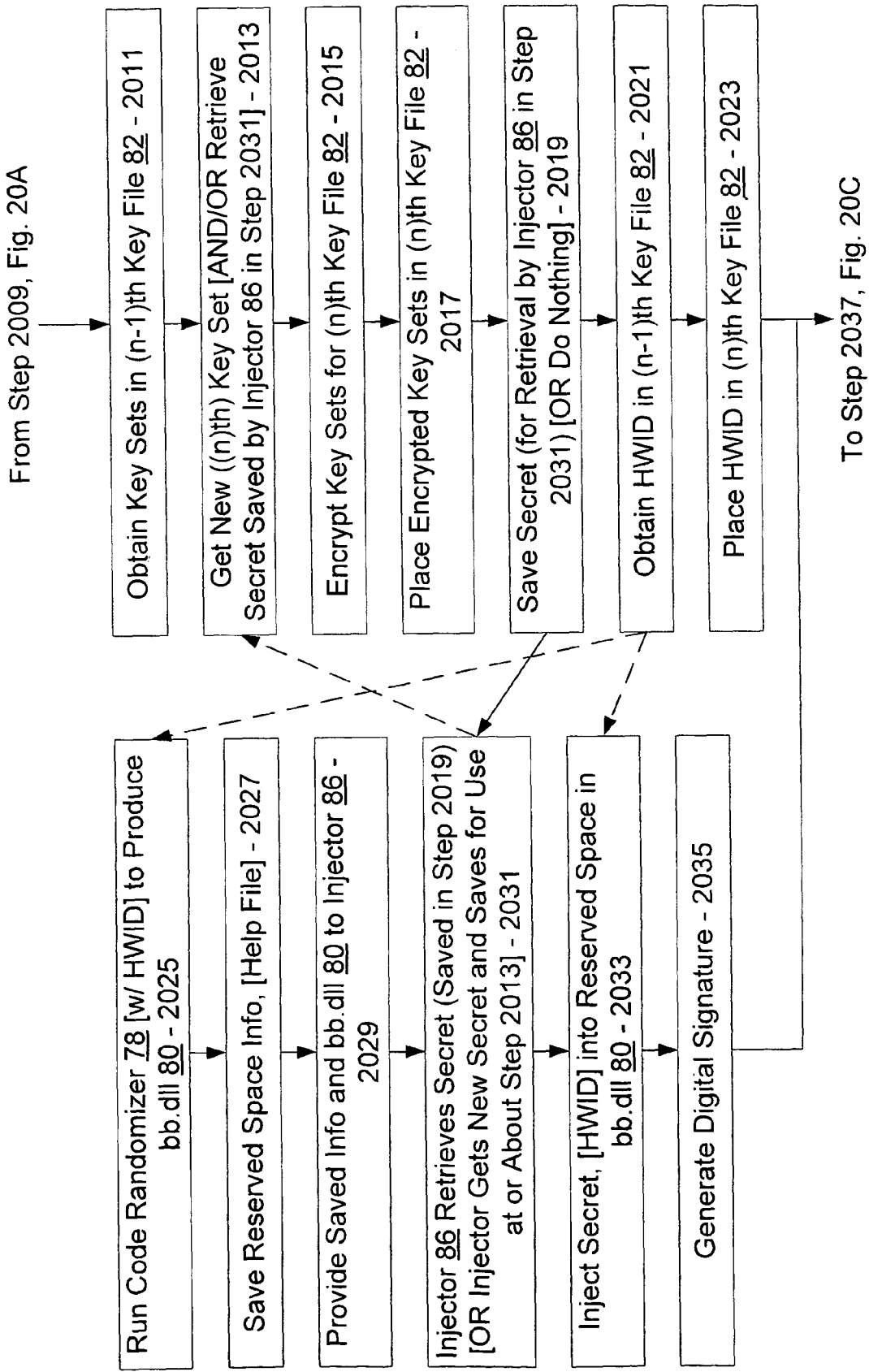

In one embodiment of the present invention, and referring now to FIGS. 20A-20C, a new individualized bb.dll 80 is requested from a black box server 26 or the like by a DRM system 32 each time a triggering event ('trigger') requires such new bb.dll (steps 2001, 2003 of FIG. 20A, step 901 of FIG. 9). As was discussed above, the triggering event may be a determination that the black box 30/individualized bb.dll 80 is not current, or may be some other event without departing from the spirit and scope of the present invention. Such determination may be made by the license server 24, as was discussed above, or by another device, again without departing from the spirit and scope of the present invention. In response, to the request, the black box server 26 prepares such a new individualized bb.dll 80 and forwards same to the requesting DRM system 32.

As was discussed above, the black box server 26 delivers the new individualized bb.dll 80 with a new public/private key pair (PU-BB, PR-BB), and perhaps other keys, as will be discussed below (collectively, a 'new key set'). Importantly, the new individualized bb.dll 80 should still be able to employ old key sets previously delivered to the DRM system 32 on the user's computing device 14 in connection with old bb.dlls 80. As may be appreciated, such old key sets are still necessary to access older digital content 12 and older corresponding licenses 16 that were generated according to such old key sets. Accordingly, such new individualized bb.dll 80 is provided with access to old key sets and old public/private key pairs. In particular, in one embodiment of the present invention, the black box server 26 includes a key manager 84 (FIG. 19) that prepares a corresponding new key file 82 along with the new individualized bb.dll 80, where the new key file 82 includes the old key sets and perhaps the new key set (PU-BB, PR-BB, etc.). Such key manager 84 of such black box server 26 then forwards the corresponding new key file 82 to the requesting DRM system 32 along with the new individualized bb.dll 80.

Note that if the new key set (PU-BB, PR-BB, etc.) is not included in the new key file 82, such new key set may instead be included with the new individualized bb.dll 80, preferably with at least (PR-BB) hidden. In any case, the key file 82 is encrypted and the bb.dll 80 includes a 'secret' that allows it to gain access to the encrypted key file 82. The secret may be the new black box private key (PR-BB) in which case the key file 82 is encrypted according to the new black box public key (PU-BB). Alternatively, the secret may be another key, such as a symmetric key, in which case the key file 82 is encrypted according to such symmetric key. Other types of secrets may of course be employed, and only the old key sets in the key file 82 may be encrypted, all without departing from the spirit and scope of the present invention.

Referring still to FIGS. 19 and 20, the process of preparing the new individualized bb.dll 80 (i.e., the '(n)th bb.dll 80') and the new key file 82 (i.e., the '(n)th key file 82') by the key manager 84 in response to a request from a DRM system 32 may take place in the following manner. Such process may be initiated by a request from the DRM system (step 2003), or by a user request, for example. As will be explained in more detail below, such request may be accompanied by one or more pieces of information, chief among which is the old key file 82 (i.e., the '(n−1)th key file 82') (step 2005). Preferably, the (n−1)th key file 82 is sent to the black box server 26 along with a digital signature verifying such (n−1)th key file 82. Alternatively, the digital signature could verify the entire request including such (n−1)th key file 82 and all other contents.

In response to the request, the key manager 84 checks the digital signature to verify same and proceeds if the verification is positive (step 2007). The key manager 84 then obtains the (n−1)th key file 82 from the request and the old/old and new key sets therein (step 2011). However, the (n−1)th key file 82 and/or the key sets therein are encrypted according to the secret of the old bb.dll 80 (i.e., the '(n−1)th bb.dll 80'), as was discussed above. Accordingly, to obtain the key sets in the (n−1)th key file 82, the DRM system 32 must include the secret of the (n−1)th bb.dll 80 with the request for the (n)th bb.dll 80. Of course, this runs counter to the notion that the secret should never be revealed to the world outside the bb.dll 80, especially if the secret is PR-BB. Nevertheless, such secret must somehow be supplied to the black box server 26 and key manager 84.

If the secret is embedded in the bb.dll 80, such secret may be supplied to the key manager 84 by including a copy of the entire bb.dll 80 in the request. However, doing so may be cumbersome, especially if such bb.dll 80 is relatively large. Alternatively, the key manager 84 may employ an appropriate database to remember the secret from when the bb.dll 80 was originally issued. However, such database could become exceedingly large and therefore unwieldy.

In one embodiment of the present invention, then, the secret is preferably already present in the key file 82 that has already been delivered such that the key manager 84 can obtain the secret from such key file 82 (step 2009). The key manager 84 can then employ the obtained secret to in turn obtain the (n−1)th key file 82 from the request and the old key sets therein (step 2011). Specifically, in such embodiment, when the key manager 84 prepared the (n−1)th bb.dll 80 (with an (n−1)th secret) and the (n−1)th key file 82, such key manager 84 included in such (n−1)th file 82 the (n−1)th secret, whether it be (PR-BB) or some other secret. Thus, when the key manager 84 needs the (n−1)th secret in order to access the (n−1)th key file 82 for purposes of preparing the (n)th key file 82, such (n−1)th secret is already available in such (n−1)th key file 82. Of course, such (n−1)th secret must be in the (n−1)th key file 82 in a form available to the key manager 84, but not available to the remainder of the world.

As an alternative, the secret is already present at the black box server 26/key manager 84, in that an appropriate database including such secret is maintained by such black box server 26/key manager 84. However, this is not especially advisable, based on security reasons, the size and complexity of such a database, and difficulties in sharing such database with multiple black box servers 26/key managers 84 if need be.

Preferably, then, the (n−1)th secret is encrypted according to a 'SUPER' key known only to the black box server 26/key manager 84 (SUPER(secret)), as is seen in FIG. 19. Parenthetically, then, it is to be noted that the key sets in such (n−1)th key file 82 are encrypted according to the (n−1)th secret (secret(key sets)), and the attached digital certificate is based on both (SUPER(secret)) and (secret(key sets)). Of course, alternate key file arrangements may be employed without departing from the spirit and scope of the present invention. For example, if the (n−1)th secret is embodied in the (n−1)th key set, the (n−1)th key file 82 may include (SUPER(key sets)), (secret(key sets)), and an appropriate attached digital certificate.

Note, though, that in some instances, an entity other than the black box server 26/key manager 84 may build the key file 82, in which case such other entity would not have access to the 'SUPER' key. Such an instance may for example occur on an initial build of a DRM system 32 on a computing device 14, where the DRM system 32 in essence builds an initial key file 82 itself. In such case, such other entity is provided with and uses a black box server public key (PU-BBS) instead of the 'SUPER' key to encrypt (key sets). Here, of course, only the black box server 26/key manager 84 has the corresponding black box server private key (PR-BBS) which it may use instead of the 'SUPER' key to decrypt (key sets).

Thus, based on the old key sets from the (n−1)th key file 82, the key manager 84 can place all appropriate key sets in the (n)th key file 82 (step 2017). Note that in doing so, the key manager 84 either selects or is provided with the new key set including the black box key pair (PU-BB, PR-BB, etc.) (step 2013), and uses the secret incumbent in such new key set to encrypt the key sets to be placed in such (n)th key file 82 (step 2015). As will be discussed below, such secret is then noted for later use (step 2019) in provided therein. As may be appreciated, any particular methods and structures may be employed to place such key sets in such (n)th key file 81 without departing from the spirit and scope of the present invention as long as such (n)th key file 82 is provided with all necessary key sets in a form readable by the (n)th bb.dll 80.

Moreover, to tie the (n)th key file 82 and by extension the (n)th bb.dll 80 to the user's computing device 14, the key manager 84 preferably obtains a hardware ID (HWID) from the (n−1)th key file 82 or from the initial black box request (step 2021), and then appropriately places such HWID in the (n)th key file 82 (as shown in FIG. 19), or in another file to be delivered to the user's computing device 14 (step 2023). As may be appreciated, the HWID is originally obtained from such computing device 14, and in fact may be any appropriate identification that can be obtained from an appropriate memory location on the user's computing device 14 and that in fact identifies such computing device 14. For example, the HWID may be a CPU ID on the computing device 14, an identifier hidden in a non-volatile memory on the computing device 14, an identifier developed from indicia of elements of the computing device (size of hard drive, size of RAM, etc.), or the like. The HWID may be placed in the (n)th key file 82 in an encrypted form, or may be left unencrypted if verifiable by way of a digital signature or the like.

Of course, the (n)th bb.dll 80 must still be prepared. To do so, the code randomizer 78 of the black box server 26 is run with randomized parameters 81 and the master bb.dll 80*m* as the inputs to produce an individualized bb.dll 80 with space reserved for additional information (step 2025, FIG. 20B). Such randomized parameters 81 may be selected in any appropriate manner without departing from the spirit and scope of the present invention. For example, such randomized parameters 81 may be truly random, or may include information as received in connection with the request, such as the HWID (step 2003). If the HWID is employed as a randomized parameter 81, such HWID may be obtained in connection with step 2021.

Preferably, the code optimizer 78 notes where the reserved spaces are located in the produced individualized bb.dll 80 (step 2027), and provides such information and such produced individualized bb.dll 80 to an injector 86 (step 2029), as seen in FIG. 19. As may be appreciated, the reserved spaces in the produced bb.dll 80 are for receiving the secret as saved by the key manager 84 (step 2019), and the injector 86 receives the information on the reserved spaces and the produced individualized bb.dll 80, retrieves the saved secret (step 2031), and thereafter 'injects' such secret into such received bb.dll 80 in the reserved spaces (step 2033). As maybe appreciated, the reserved space(s) in the bb.dll 80 may comprise any appropriate structure(s) at any appropriate location(s) without departing from the spirit and scope of the present invention, as long as the reserved space(s) are adequate for the purpose of holding the secret. Moreover, since the secret is in fact a secret, the secret is injected into the reserved spaces in such a manner and the reserved spaces are arranged in such a manner to hide the secret to a sufficient degree such that the secret cannot be found in any practical manner by a nefarious entity. Any appropriate manner of injection may be employed without departing from the spirit and scope of the present invention.

Preferably, the reserved spaces are varied with respect to each individualized bb.dll 80 as part of the individualization process performed by the code randomizer 78. Also preferably, the code for the individualized bb.dll 80 is written and/or the code randomizer 78 is operated such that the bb.dll 80 can locate the secret within itself during operation thereof. The injector 86 may encrypt the secret in some fashion as part of the injection process, perhaps according to the HWID of the requesting computing device 14, but appropriate decryption information must be provided to the bb.dll 80 by such injector 86 or another element to allow the bb.dll 80 to decrypt such encrypted secret. The injector 86 may also inject the HWID into the received bb.dll 80 in a portion of the reserved spaces (step 2033). If the HWID is employed in connection with the injector 86 and/or step 2033, such HWID may be obtained in connection with step 2021.

In one embodiment of the present invention, the information provided by the code randomizer 78 to the injector 86 includes a help file or the like appropriately specifying how the secret is to be injected into the bb.dll 80. In another embodiment, such a help file or the like is embedded in the bb.dll 80 in a manner readable by the injector 86.

Notably, the injector 86 may inject other information into already-reserved spaces in the bb.dll 80 without departing from the spirit and scope of the present invention. For example, to tie such bb.dll 80 more closely to the user's computing device, the injector 86 may appropriately inject the HWID received as part of the request (step 2003). Likewise, if there are multiple black box servers 26, the injector 86 may appropriately inject an identifier of the black box server 26 issuing such bb.dll 80 to tie such bb.dll 80 to such black box server 26.

Once the injector 86 has injected the secret and any other information into the (n)th bb.dll 80, such (n)th bb.dll 80 and the corresponding (n)th key file 82 are essentially ready for delivery to the requesting computing device 14. However, prior to delivery, such (n)th bb.dll 80 is preferably delivered to a signature generator 88 (FIG. 19) that generates a digital signature for the bb.dll and that couples the generated digital signature to the (n)th bb.dll 80 in an appropriate manner (step 2035). As may be appreciated, such digital signature is employed (for example) to assist the computing device 14 in checking such (n)th bb.dll 80 for the presence of computer viruses, but may also be employed by the DRM system 32 of the requesting computing device 14 as a tool to otherwise verify that such (n)th bb.dll 80 has not been altered.

Prior to delivering the (n)th bb.dll 80 and the (n)th key file 82 to the requesting DRM system 32, the black box server 26 preferably prepares a digital certificate for the (n)th black box 30 (which is instantiated based on the (n)th bb.dll 80) (step 2037). As is to be appreciated, such digital certificate may be based on the contents of the (n)th key file 82 and/or the (n)th bb.dll 80 and is to be proffered by the black box 30 and/or the DRM system 32 upon request to certify to an inquiring entity that the black box 30 is to be trusted. Such prepared digital certificate may then be added to the (n)th key file 82 (as shown in FIG. 19) (step 2039), may be added to the (n)th bb.dll 80, or may be placed in another file. It is to be noted that if the digital certificate is based at least in part on the HWID, such HWID need not be encrypted in the (n)th key file 82 since an alteration thereof will cause the digital certificate to fail to verify.

Such (n)th bb.dll 80, (n)th key file 82, and any other appropriate files may then be delivered to the requesting DRM system 32 (step 2043). If necessary and/or appropriate, a compressor 90 (FIG. 19) may be employed to compress the (n)th bb.dll 80 and/or the (n)th key file 82 prior to such delivery (step 2041). If so, the DRM system 32 must include an appropriate de-compressor (not shown) to de-compress the compressed data upon receipt (step 2045). Such DRM system may then appropriately install and use such (n)th bb.dll 80, (n)th key file 82, and any other appropriate received files (step 2047).

As should be apparent, the process as outlined in FIGS. 20A-20C is fairly involved, and therefore may require a relatively long time to be performed. That is, the period of time between the trigger and request (steps 2001, 2003 of FIG. 20A, step 901 of FIG. 9) and the receipt and installation of the new black box 30 (steps 2045, 2047 of FIG. 20C, steps 907, 909 of FIG. 9) can be considerable. Accordingly, it may be advisable to perform some of the steps in FIGS. 20A-20C beforehand.

In one embodiment of the present invention, then, the code randomizer 78 is operated beforehand to produce multiple randomized bb.dll's 80, and such multiple randomized bb.dll's 80 are stored or 'placed on the shelf' until needed in response to a request (step 2003). Of course, if such code optimizer 78 produces a help file for each bb.dll 80 as was discussed above, such help file should be stored or placed on the shelf with such bb.dll or stored in some other location. In response to a request (step 2003), then, one of the bb.dll's 80 is 'taken from the shelf' and employed as the (n)th bb.dll 80 to be delivered to the requesting user's computing device 14. Of course, such (n)th bb.dll 80 must be injected with the appropriate secret (step 2033), and all other appropriate steps as shown in FIGS. 20A-20C and discussed above must be performed. To perform the injection function (step 2033), the help file corresponding to the taken bb.dll 80 (if such a help file is indeed employed) must be located and appropriately employed. Since producing each randomized bb.dll 80 may be a time-intensive task, such code randomizer 78 may be operated on its own server if need be. Of course, if the code randomizer 78 is operated beforehand, such code randomizer cannot be operated based on any information that could be received as part of the request, such as the HWID. Nevertheless, none of such information is believed to be vital to the code randomization operation performed by the code randomizer 78.

In a variation on the aforementioned embodiment, the process line comprising steps 2025-2035 is performed beforehand to produce multiple completed randomized bb.dll's 80 with respective secrets already injected. However, in such variation, each secret is selected and employed by the injector 86 or the like and is then saved (a 1a step 2019) for later retrieval and use by the key manager 84 or the like (a 1a step 2031, but at or about step 2013). As before, such completed bb.dll's 80 are stored or 'placed on the shelf' until needed in response to a request (step 2003). In response to such request (step 2003), then, one of the bb.dll's 80 is 'taken from the shelf' and employed as the (n)th bb.dll 80 to be delivered to the requesting user's computing device 14. Here, the secret already pre-injected into such (n)th bb.dll 80 (step 2033) is appropriately retrieved by the key manager 84, and is then employed to produce the (n)th key file 82 in the manner discussed above. Here, too, if the process line comprising steps 2025-2035 is performed beforehand, the (n)th bb.dll 80 cannot be produced based on any information that could be received as part of the request, such as the HWID. Again, though, none of such information is believed to be vital to the aforementioned process line.

In particular, the bb.dll 80 need not absolutely have the HWID injected thereinto to tie such bb.dll 80 to the user's computing device 14. As may be appreciated, such bb.dll 80 is already tied to such computing device 14 because the (n)th key file 82 contains such HWID and is therefore tied to such computing device 14, and only the (n)th bb.dll 80 contains the secret that is used to access such (n)th key file 82. Thus, the upgraded black box 30 which includes such (n)th key file 82 and such (n)th bb.dll 80 is tightly tied to or associated with the user's computing device 14. Accordingly, such upgraded black box 30 cannot be operably transferred among multiple computing devices 14 for nefarious purposes or otherwise, except in the manner to be specified below. In particular, such upgraded black box 30 can only be employed on the requesting user's computing device 14. Preferably, if the upgraded black box 30 is somehow transferred to another computing device 14, the transferred black box 30 recognizes that it is not intended for such other computing device 14, and does not allow any requested rendering to proceed on such other computing device 14.

As was stated beforehand, each bb.dll 80 should be unique with a unique set of keys. However, in an alternate embodiment of the present invention, such bb.dll 80 is not in fact unique, but instead has a finite number of identical copies. Such number of copies should be relatively small, on the order of 2-100, for example, such that the likelihood that any two users share an identical bb.dll 80 is negligible. As may be appreciated, by using the same bb.dll 80 multiple times (with adding the HWID to the corresponding key file 82 during updating), throughput in producing such bb.dll's 80 by the black box server 36 is significantly increased, with little if any real reduction in overall security.

Further Concepts—Backup and Restore

As was just discussed, the black box 30 of the DRM system 32 includes the (n)th key file 82 and the (n)th bb.dll 80 and is tightly tied to or associated with the user's computing device 14 by including the HWID from such computing device 14. Thus, each license 16 containing a decryption key (KD) encrypted according to a black box public key (PU-BB) stored in the (n)th key file 82 is also tightly tied to the computing device 14, as is the DRM system 32 itself. If the DRM system 32 senses that the HWID of the computing device 14 is not the same HWID specified in the black box 30, such DRM system 32 concludes that it is not for the computing device 14 and prohibits some if not all rendering of digital content 12 by such DRM system 12. Accordingly, a license 16 issued to one DRM system 32 on a first user machine 14 is bound by a 'chain' to the HWID of the first user machine 14 by way of the key file 82 and cannot be employed in connection with a copied DRM client 32 on a second machine 14.

However, on occasion, the HWID of the computing device 14 changes through no fault of the user and without any deceptive or nefarious intent on the part of the user. As but one example, the user may have acquired a different computing device 14 with a different DRM system 32 thereon. As other examples, the HWID may have become corrupted, may have been re-assigned, or otherwise may have changed due to a change in the computing device 14 such as a new operating system or a new piece of hardware or software. In such a situation, then, it is preferable that a mechanism be available to re-establish the chain between each license 16 and the changed HWID.

Generally, in the present invention, any such mechanism essentially contacts a backup/restore server and sends one or more files or the like to such backup/restore server, where such files existed in connection with the prior HWID and were previously saved and include important tying information. Such backup/restore server then alters each file or creates new corresponding files and then returns such files to the DRM system 32, where such altered/new files appropriately re-establish the chain between each license 16 and the changed HWID of the computing device 14 upon which the DRM system 32 resides.

Remember now that a piece of digital content 12 is encrypted according to a decryption key (KD). Remember also that a corresponding license 16 issued for a DRM system 32 contains the decryption key (KD) encrypted according to a black box public key (PU-BB), Remember in addition that PU-BB (if old) is expected to be in the key file 82 of the black box 30 of such DRM system 32. Remember further that the key file 82 includes the HWID of the computing system 14 upon which the DRM system 32 resides. Now, if the HWID were to change, either because the computing device 14 has legitimately changed, or for some other legitimate reason, two scenarios can occur: the same DRM system 32 with the same black box 30 and the same key file 82 exists in connection with the new HWID, or a new DRM system 32 with a new black box 30 and a 'pristine' key file 82 exists is installed in connection with the new HWID.

In the former case, the new key file 82 has the wrong HWID, but has the old key sets having the old keys for the older licenses 16. Thus, the link in the chain between each license 16 and the computing device 14 that is missing is the correct HWID. In the latter case, the new key file 82 has the right HWID, but does not have the old key sets having the old keys for the older licenses 16. Thus, the link in the chain between each license 16 and the computing device 14 that is missing is the necessary old key sets in the old key file 82. It is necessary, then, at least in the latter case, to maintain a saved copy of the old key file 82. However, to adequately address either case with a single protocol, it is necessary to maintain a saved copy of the old key file 82, as will be explained in detail below. Any particular mechanism may be employed to save such copy of the old key file 82 without departing from the spirit and scope of the present invention.

In particular, in one embodiment of the present invention, each license 16 is re-tied to the computing device 14 by employing the aforementioned backup/restore server to appropriately alter the HWID in such old key file 82 to correspond to the current HWID of the computing device 14 upon which the DRM system 32 resides, and then by appropriately installing such old key file 82 in such DRM system 32. As should be appreciated, such protocol adequately addresses each of the aforementioned cases. Here, the black box server 26 may act as the aforementioned backup/restore server, although another server such as a dedicated server may be employed without departing from the spirit and scope of the present invention.

Figure 21:
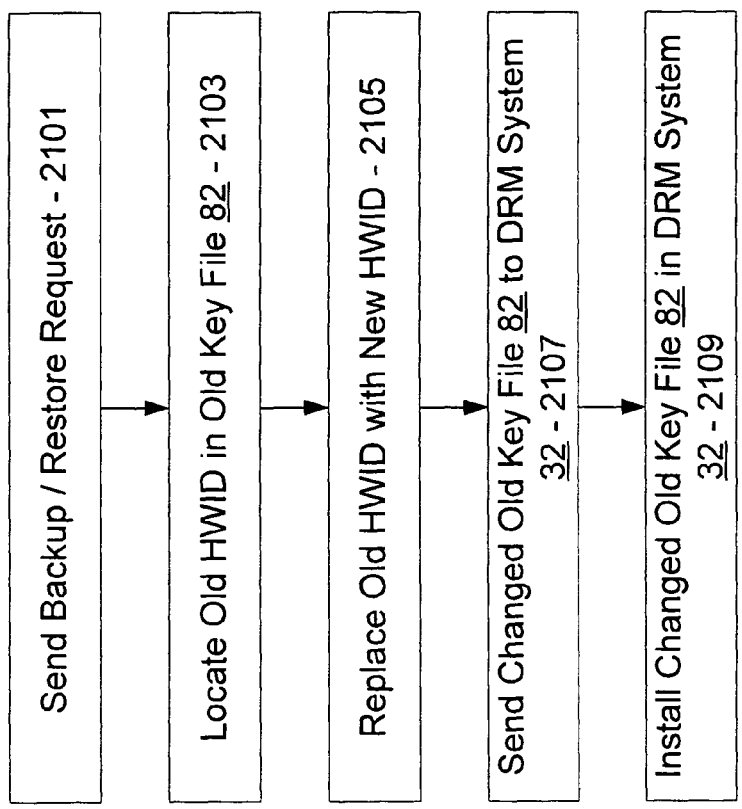
FIG. 21 is a flow diagram showing various steps performed during backup/restore of a black box.

Referring now to FIG. 21, in such embodiment, when a backup/restore function is necessary due to a changed HWID on a computing system 14 or due to a new HWID on a new computing system 14, the DRM system 32 sends a backup/restore request to the black box server 26 acting as the backup/restore server (step 2101). Such request may be sent automatically or upon approval by the user of the computing device 14. The user may also actively initiate the request without departing from the spirit and scope of the present invention. As was discussed above, the request includes the old key file 82 (i.e., the saved copy having the necessary old key sets) and the new/changed HWID (i.e., 'the new HWID'). Of course, the request may also include other information without departing from the spirit and scope of the present invention.

In response to the request, the backup/restore server (black box server 26) locates the HWID already present in the old key file 82 (i.e., 'the old HWID') and appropriately replaces such old HWID with the new HWID (steps 2103, 2105), and then sends the changed old key file 82 back to the DRM system 32 (step 2107). Preferably, the old key sets stored in such changed old key file 82 are not altered in the course of changing the HWID therein. Accordingly, such old key sets will be available to licenses 16 stored on the DRM system 32 when the changed old key file 82 is appropriately installed in the DRM system 32 residing on the computing device 14 at issue.

In one particular form of the present embodiment, the location and replacement of the old HWID (steps 2103, 2105) is performed essentially as a stand-alone operation so that the old key file 82 is not otherwise modified. Of course, even if only the old HWID in such old key file 82 is replaced with the new HWID, any items in the old key file 82 that rely on such old HWID must also be altered. For example, digital certificates and/or digital signatures in the old key file 82 that are based at least in part on the old HWID must be altered or re-written based on the new HWID. Moreover, the bb.dll 80 corresponding to the old key file 82 must also be altered if it relies on such old HWID. For example, and as was discussed above, the old HWID may have been injected into the corresponding bb.dll 80, and may be employed as another mechanism to tie the black box 30 containing such bb.dll 80 to the computing device 14 upon which the DRM system resides.

As should be appreciated, then, it may be exceedingly difficult to perform each and every necessary alteration with respect to the old HWID in both the old key file 82 and the corresponding bb.dll 80. Further, such alterations quickly become cumbersome if the bb.dll 80 must be delivered to the backup/restore server as part of the request (step 2101). In addition, it may very well be the case that such alterations are all but impossible to perform, such as for example if the old HWID was injected into the corresponding bb.dll 80 and now must be located without the assistance of any help file, or if the corresponding bb.dll 80 is not available.

Figure 20D:
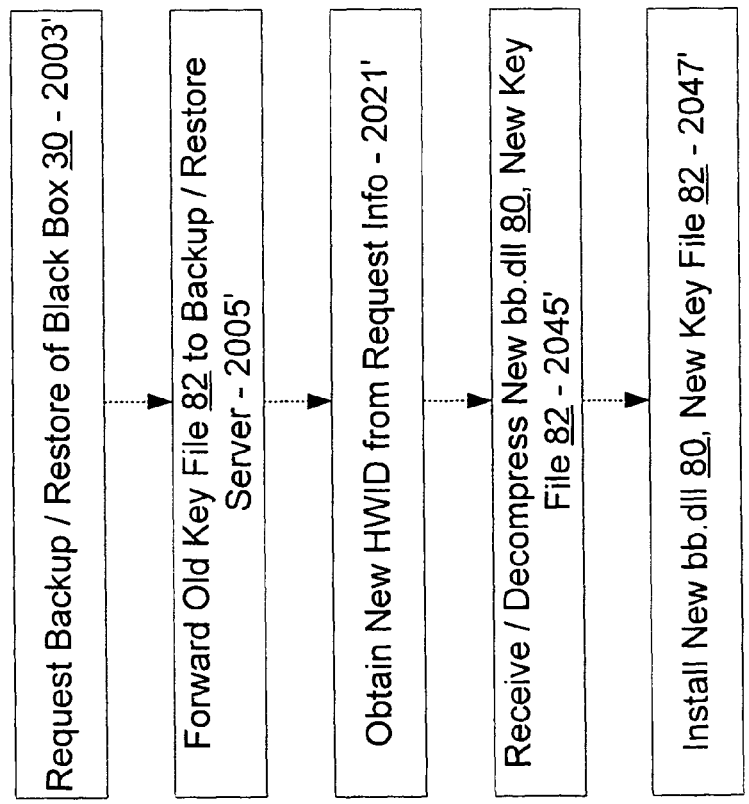

Accordingly, in a preferred embodiment of the present embodiment, the re-tying is performed as part of a black box upgrade by the structure of FIG. 19 and in the manner shown in FIGS. 20A-20C. As should be appreciated, though, such a 're-tie upgrade' differs from a 'regular upgrade' in that the (n−1)th key file 82 is not forwarded to the key manager 84, as in a regular upgrade (step 2005, FIG. 20A). Instead, and as seen in FIG. 20D, the aforementioned saved copy of the old key file 82 is forwarded (step 2005' of FIG. 20D). Also, such a 're-tie upgrade' differs from a 'regular upgrade' in that the HWID obtained is not the old HWID from the (n−1)th key file 92, as in a regular upgrade (step 2021, FIG. 20B). Instead, and as seen in FIG. 20D, such HWID obtained during a re-tie upgrade is the new HWID, and such new HWID is obtained from information received as part of the request (step 2021' of FIG. 20D). Otherwise, the re-tie upgrade in such embodiment is substantially the same as the regular upgrade. As should now be apparent, such re-tie upgrade is a relatively simple way to alter the HWID in the key file 82 since the structure of FIG. 19 and the steps of FIGS. 20A-20C (including of course the substitutions in FIG. 20D) generally take care of all details regarding the placement of the new HWID in the normal course of performing the upgrade. Moreover, a re-tie upgrade has the added benefit of providing the requesting DRM system 32 with an upgraded black box 30.

The changed key file 82 (or upgraded black box 30 with re-tied key file 82) is received by the DRM system 32 from the backup/restore server and appropriately installed in such DRM system 32 as part of the black box 30 (step 2109 of FIG. 21, steps 2045', 2047' of FIG. 20D). The chain between each license 16 and the new HWID of the computing device 14 upon which the DRM system 32 resides is now complete. In particular, each license 16 contains a decryption key (KD) encrypted according to a black box public key (PU-BB) stored in the changed key file 82 (or upgraded black box 30 with re-tied key file 82), and therefore is tied thereto. Correspondingly, the black box 30 of the DRM system 32 includes the changed key file 82 (or upgraded black box 30 with re-tied key file 82) which now includes the new HWID of the computing device 14, and therefore is tied to such computing device 14.

In one embodiment of the present invention, rather than altering or upgrading the key file 82/black box 30 to complete the chain between each license 16 and the new HWID of the computing device 14, each existing digital license 16 associated with the DRM system 32 is re-written to be tied to the black box 30. This of course assumes that such black box 30 of such DRM system 32 is tied to the proper HWID. In particular, the decryption key encrypted by an old PU-BB (PU-BB[old] (KD)) in the license is replaced by such decryption key encrypted by the PU-BB of the properly tied black box 30 of the DRM system 32 (PU-BB[new] (KD)). Here, again, the aforementioned copy of the old key file 82 must be saved, for reasons will be explained below.

Figure 22:
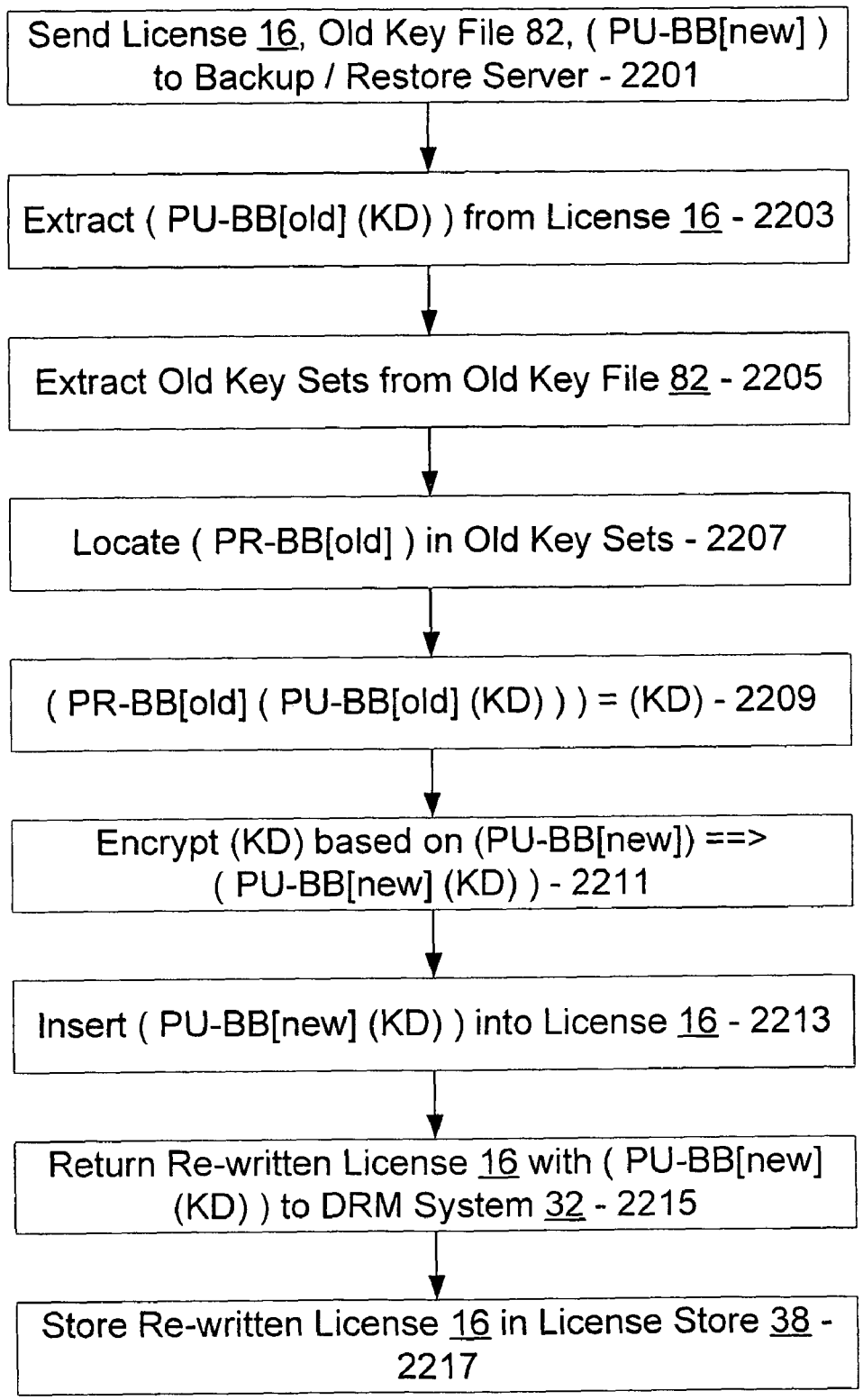
FIG. 22 is a flow diagram showing various steps performed during backup/restore of a digital license.

To re-write a license 16 in the present embodiment, then, and referring to FIG. 22, the DRM system 32 at issue sends the license 16 to a backup/restore server, along with the copy of the old key file 82, and a copy of (PU-BB[new]), perhaps in the form of an appropriate certificate (step 2201) (i.e., the same information that is normally sent to the license server 24 during a request for a license 16). Of course, multiple licenses 16 may be sent to the backup/restore server for re-writing without departing from the spirit and scope of the present invention. Here, the backup/restore server may be the license server 24, the black box server 26, or another server, such as for example a dedicated server, without departing from the spirit and scope of the present invention.

The backup/restore server here extracts (PU-BB[old] (KD)) from the license 16 (step 2203), extracts the old key sets from the old key file 82 in a manner akin to that discussed above in connection with step 2011 of FIG. 20B (step 2205), locates the (PR-BB[old]) corresponding to the (PU-BB[old]) of (PU-BB[old] (KD)) from the license 16 (step 2207), applies (PR-BB[old]) to (PU-BB[old] (KD)) to obtain (KD) (step 2209), encrypts (KD) based on (PU-BB[new]) to produce (PU-BB[new] (KD)) (step 2211), and then inserts such (PU-BB[new] (KD)) back into the license 16 (step 2213). Such re-written license 16 with (PU-BB[new] (KD)) may then be signed and returned to the DRM system 32 at issue (step 2215) and stored in the license store 38 (FIG. 4) (step 2217).

The chain between the re-written license 16 as received from the backup/restore server and the new HWID of the computing device 14 upon which the DRM system 32 resides is now complete. In particular, the license 16 contains a decryption key (KD) encrypted according to the black box public key (PU-BB[new]) of the black box 30 of the new DRM system 32, and therefore is tied thereto. Correspondingly, the black box 30 of the new DRM system 32 includes a key file 82 which includes the new HWID of the computing device 14, and therefore is tied to such computing device 14.

It is to be noted that the present embodiment requires that each license 16 be individually re-written. This of course can be quite cumbersome and time-consuming. However, the present embodiment does have a significant advantage in that each existing license 16 may include an option to prevent such re-writing. Of course, such option would be specified by the issuer of the license 16.

In another embodiment of the present invention, rather than re-writing each license 16, such license 16 is re-issued by the issuing license server 24 in the manner set forth above. As before, each existing license 16 may include an option to prevent such re-issuance. Of course, re-issuance cannot take place if the license server 24 no longer is able to re-issue the license 16 for any of a variety of reasons.

In a further embodiment of the present invention, rather than having a backup/restore server re-write each license 16, each license 16 is re-written by the DRM system 32 itself. As should be appreciated, such re-writing by the DRM system 32 is possible if a backup/restore server is employed to extract the old key sets from the old key file 82 in a manner akin to that discussed above in connection with step 2011 of FIG. 20B. Otherwise, the DRM system 32 and the black box 30 thereof has access to all keys necessary to perform such re-writing. Of course, providing the DRM system 32 with the functionality to re-write a license 16 in the manner disclosed herein must be done guardedly. Specifically a nefarious entity must not be allowed to employ such functionality to in effect issue new licenses 16.

As may be appreciated, a backup/restore server may be employed in any of the manners discussed above to legitimately copy a black box 30 of a DRM system 32 to other computing devices 14, or to legitimately re-write licenses 16 to work on other DRM systems 32. In the former instance, for example, a key file 82 from a first computing device 14 may be employed as the old key file 82 in connection with a backup/restore of a second device 14, thereby in effect allowing the second device 14 to employ licenses 16 written for the first device to render digital content 12 on such second device 14. Accordingly, a user can render digital content 12 on multiple machines 14 under his/her control.

Of course, a nefarious entity may use the backup/restore server and the same techniques to illegitimately copy a black box 30 of a DRM system 32 to other computing devices 14, or to illegitimately re-write licenses 16 to work on other DRM systems 32. Preferably, then, the backup/restore server includes an appropriate fraud detection mechanism to prevent or at least curtail such illegitimate activities. For example, the backup/restore server may access a fraud detection database in which it notes the key sets in each backup/restore request, and may be programmed to refuse a backup/restore request if the key sets in the request show up too often, such as for example more than three times in a six month period. Of course, other frequencies and periods may be employed without departing from the spirit and scope of the present invention.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful enforcement architecture 10 that allows the controlled rendering or playing of arbitrary forms of digital content 12, where such control is flexible and definable by the content owner of such digital content 12. Also, the present invention comprises a new useful controlled rendering environment that renders digital content 12 only as specified by the content owner, even though the digital content 12 is to be rendered on a computing device 14 which is not under the control of the content owner. Further, the present invention comprises a trusted component that enforces the rights of the content owner on such computing device 14 in connection with a piece of digital content 12, even against attempts by the user of such computing device 14 to access such digital content 12 in ways not permitted by the content owner.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computer-readable storage medium having computer-executable instructions for:
   accessing a digital license corresponding to digital content, wherein the digital license includes a minimum value, the minimum value specifies a minimum security requirement for releasing the digital content to an application;
   obtaining the minimum value of the security requirement from the digital license;
   obtaining from the application a scaled numerical value, wherein the scaled numerical value is representative of the relative security of the application, wherein applications associated with high scaled numerical values more securely handle decrypted digital content while the decrypted digital content is played than applications associated with lower scaled numerical values, wherein the scaled numerical value is attached to the application;
   comparing the scaled numerical value of the application to the minimum value of the security requirement of the digital license;
   determining that the scaled numerical value satisfies the security requirement; and
   releasing the digital content to the application.

2. The computer-readable storage medium of claim 1, wherein the scaled value is in a digital certificate associated with the application, the computer-executable instructions performing obtaining from the digital certificate the scaled value.

3. The computer-readable storage medium of claim 2, wherein the scaled value is assigned by a security value certifying authority, wherein the security value certifying authority issues the digital certificate associating the scaled value with the application, and wherein the digital license includes trusted security value certifying authority information regarding security value certifying authorities to be trusted, the computer-executable instructions performing:
   obtaining the trusted security value certifying authority information from the digital license;
   obtaining indicia of the security value certifying authority from the digital certificate associated with the application;
   comparing the indicia of the security value certifying authority to the trusted security value certifying authority information to determine whether the security value certifying authority satisfies the trusted security value certifying authority information, wherein the digital content is not released to the application if the security value certifying authority does not satisfy the trusted security value certifying authority information.

4. The computer-readable storage medium of claim 3, wherein the digital certificate includes a hash based on the application, the computer-executable instructions performing verifying the hash against the application to verify the digital certificate.

5. The computer-readable storage medium of claim 1, wherein the scaled value is located in a digital certificate that includes a hash based on the application, the computer-executable instructions performing verifying the hash against the application to verify the digital certificate.

6. The computer-readable storage medium of claim 1, wherein a plurality of scaled values representative of the relative security of the application are associated therewith, the computer-executable instructions performing:
   obtaining from the application the plurality of scaled values;
   comparing the plurality of scaled values of the application to the security requirement of the digital license to determine whether the plurality of scaled values satisfies the security requirement, wherein the digital content is not released to the application if the plurality of scaled values do not satisfy the security requirement.

7. The computer-readable storage medium of claim 6, wherein the corresponding digital license sets forth a plurality of security requirements respectively corresponding to the plurality of scaled values, the computer-executable instructions performing:
   obtaining the plurality of security requirements from the digital license; and
   comparing each scaled value to the respective security requirement to determine whether such scaled value satisfies such security requirement, wherein the digital content is not released to the application if the plurality of scaled values do not satisfy the plurality of security requirements.

8. The computer-readable storage medium of claim 6, wherein the corresponding digital license sets forth a security requirement comprising a function of the plurality of scaled values and a range of acceptable results from the function, the computer-executable instructions performing:
   obtaining the security requirement from the digital license;
   applying the plurality of scaled values to the security requirement to produce a result; and
   comparing the result to the range of acceptable results to determine whether such result satisfies such range, wherein the digital content is not released to the application if the result does not satisfy the range.

9. A system for determining whether digital content can be released to a computer-type operational application, comprising:
   a computer system effecting a Digital Right Management (DRM) system;
   the DRM system configured to obtain a scaled numerical value representative of the relative security of the application being associated therewith;
   the DRM system configured to obtain a digital license corresponding to the digital content;
   the DRM system configured to access the digital license, wherein the digital license sets forth a security requirement specifying a minimum value for releasing digital content to an application, wherein applications associated with high scaled numerical values more securely handle decrypted digital content while the decrypted digital content is played than applications associated with lower scaled numerical values, wherein the scaled numerical value is attached to the application; and
   wherein the scaled numerical value of the application is compared to the minimum value of the security requirement of the digital license to determine whether the scaled numerical value satisfies the security requirement, and wherein the digital content is not released to the application if the scaled numerical value does not satisfy the minimum value of the security requirement.

10. The system of claim 9, wherein the scaled value is in a digital certificate associated with the application, and wherein the scaled value is obtained from the digital certificate.

11. The system of claim 10, wherein the scaled value is assigned by a security value certifying authority, and wherein the security value certifying authority issues the digital certificate associating the scaled value with the application, and wherein the digital license includes trusted security value certifying authority information regarding security value certifying authorities to be trusted, and wherein the trusted security value certifying authority information is obtained from the digital license, and wherein indicia of the security value certifying authority is obtained from the digital certificate associated with the application, and wherein the indicia of the security value certifying authority is compared to the trusted security value certifying authority information to determine whether the security value certifying authority satisfies the trusted security value certifying authority information, wherein the digital content is not released to the application if the security value certifying authority does not satisfy the trusted security value certifying authority information.

12. The system of claim 11, wherein the digital certificate includes a hash based on the application, the hash is verified against the application to verify the digital certificate.

13. The system of claim 9, wherein the scaled value is located in a digital certificate that includes a hash based on the application, the hash is verified against the application to verify the digital certificate.

14. The system of claim 9, wherein a plurality of scaled values representative of the relative security of the application are associated therewith, and wherein the application is obtained from the plurality of scaled values, and wherein the plurality of scaled values of the application is compared to the security requirement of the digital license to determine whether the plurality of scaled values satisfies the security requirement, wherein the digital content is not released to the application if the plurality of scaled values do not satisfy the security requirement.

15. The system of claim 14, wherein the corresponding digital license sets forth a plurality of security requirements respectively corresponding to the plurality of scaled values, and wherein the plurality of security requirements is obtained from the digital license, and wherein each scaled value is compared to the respective security requirement to determine whether such scaled value satisfies such security requirement, and wherein the digital content is not released to the application if the plurality of scaled values do not satisfy the plurality of security requirements.

16. The system of claim 14, wherein the corresponding digital license sets forth a security requirement comprising a function of the plurality of scaled values and a range of acceptable results from the function, and wherein the security requirement is obtained from the digital license, and wherein the plurality of scaled values is applied to the security requirement to produce a result, and wherein the result is compared to the range of acceptable results to determine whether such result satisfies such range, and wherein the digital content is not released to the application if the result does not satisfy the range.

* * * * *